(12) United States Patent
Katsuyama

(10) Patent No.: US 6,990,235 B2
(45) Date of Patent: Jan. 24, 2006

(54) COLOR IMAGE PROCESSING APPARATUS AND PATTERN EXTRACTING APPARATUS

(75) Inventor: Yutaka Katsuyama, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/664,959

(22) Filed: Sep. 22, 2003

(65) Prior Publication Data

US 2004/0165773 A1  Aug. 26, 2004

Related U.S. Application Data

(62) Division of application No. 09/228,427, filed on Jan. 12, 1999, now Pat. No. 6,701,010.

(30) Foreign Application Priority Data

Feb. 6, 1998 (JP) ............................................. 10-025419
May 27, 1998 (JP) ........................................... 10-146420

(51) Int. Cl.
    *G06K 9/34*         (2006.01)

(52) U.S. Cl. ...................................... 382/173; 382/165
(58) Field of Classification Search ......... 382/162–165, 382/170, 199, 173, 181, 282–283, 224–225, 382/200–205, 176, 141; 358/464–465, 453, 358/3.12, 1.9, 1.2, 538, 296, 323; 345/589; 347/40–41
See application file for complete search history.

(56) References Cited

U.S. PATENT DOCUMENTS

| 4,958,217 A |   | 9/1990 | Kimurai et al. ............. 358/538 |
| 5,454,070 A | * | 9/1995 | Donelly et al. ............. 345/589 |
| 5,647,021 A |   | 7/1997 | Baird et al. ................. 382/176 |
| 5,767,978 A |   | 6/1998 | Revankar et al. ........... 358/296 |
| 5,982,919 A |   | 11/1999 | Maruo ........................ 382/141 |
| 6,021,221 A | * | 2/2000 | Takaha ........................ 382/199 |
| 6,115,498 A |   | 9/2000 | Tachikawa et al. .......... 382/200 |
| 6,317,220 B1 | * | 11/2001 | Fujita et al. ............... 358/3.12 |

FOREIGN PATENT DOCUMENTS

| EP | 0 730 248 | 9/1996 |
| JP | 5-298443 | 11/1993 |
| JP | 6-103371 | 4/1994 |
| JP | 6-162180 | 6/1994 |
| JP | 7-021379 | 1/1995 |
| JP | 8-167028 | 6/1996 |
| JP | 8-336040 | 12/1996 |
| JP | 8-339421 | 12/1996 |
| WO | WO96/23278 | 1/1996 |

OTHER PUBLICATIONS

S. Shuji, et al., "A Method of Extraction of Character Patterns from a Color Image Based on the Uniformity of the Character Color of a String", *Technical Report of IEICE*, pp. 17–24.

K. Matsuo, et al., "Extraction of Character Region from Color Document Images", *The Institute of Electronics*, D–12–19, 1997.

K. Matsuo, et al., "Extraction of Characters String from Scene Image by Grayscale and Color Information," *Technical Report of IEICE*, Jan. 1993.

(Continued)

*Primary Examiner*—Amelia M. Au
*Assistant Examiner*—Ishrat Sherali
(74) *Attorney, Agent, or Firm*—Staas & Halsey LLP

(57) ABSTRACT

A threshold value assigning unit assigns a threshold value corresponding to color information of a considered pixel. A labeling unit compares color information of adjacent pixels and assigns the pixels the same label when the distance between the color information of the pixels is less than a threshold value assigned by the threshold value assigning unit.

7 Claims, 45 Drawing Sheets

OTHER PUBLICATIONS

A. Ueba, et al., "The Extraction of Character Images from Color Images based on Processing of Color Contour Line", *Technical Report of IEICE*, Sep. 1994.

Rafael C. Gonzalez, Paul Wintz, Digital Image Processing, 1987, pp. 368–373, Addison–Wesley Publishing Company.

Dr. Kansei Iwata, Dr. Gabriel Marcu, A Color Classification Algorithm, 1993, pp. 726–729, Graphic Computer Corporation.

Korean Patent Office, Korean Office Action, Sep. 28, 2002, pp. 1–2, (with partial translation).

Moghaddamzadeh A. et al., A Fuzzy Region Growing Approach For Segmentation of Color Images, Jun. 1, 1997, pp. 867–881.

Song Chun Zhu, et al., Region Competition: Unifying Snakes, Region Growing, and Bayes/MDL for Multiband Image Segmentation, Sep. 1996, pp. 884–900.

M. Kapfer, et al., Detection of Human Faces in color Image Sequences With Arbitrary Motions For Very Low Bit–Rate Videophone Coding, Sep. 24, 1997, pp. 1503–1518.

Nagarajan Prabhakaran, et al., Neural Network Based Auto Tag Identification System, Oct. 12, 1997, pp. 3582–3584.

Klette, R., Hand Book of Image Processing Operators, 1996, pp. 258–261.

N.H. Kroupnova, Method for Multi–spectral Images Segmentation Based On The Shape Of The Color Clusters, Oct. 1996, pp. 444–453.

R.C., Gonzalex, Digitl Image Processing, 1992, pp. 458–461.

U.S. Appl. No. 09/228,427, filed Jan. 12, 1999, Yutaka Katsuyama, Fujitsu Limited.

Wahl, F.M., "Digitale Bildsignalverarbeitung", Springer–Verlag, Berlin, 1984, pp. 129–133.

Copy of European Search report for corresponding application No. 99 300 472.0 dated Mar. 30, 2005.

* cited by examiner (1) P1 (R1, G1, B1)
P2 (R2, G2, B2)

(2) P1' (R1/max1, G1/max1, B1/max1)
P2' (R2/max2, G2/max2, B2/max2)

(3) = (R1/max1 − R2/max2)² + (G1/max1 − G2/max2)² + (B1/max1 − B2/max2)³

FIG. 2

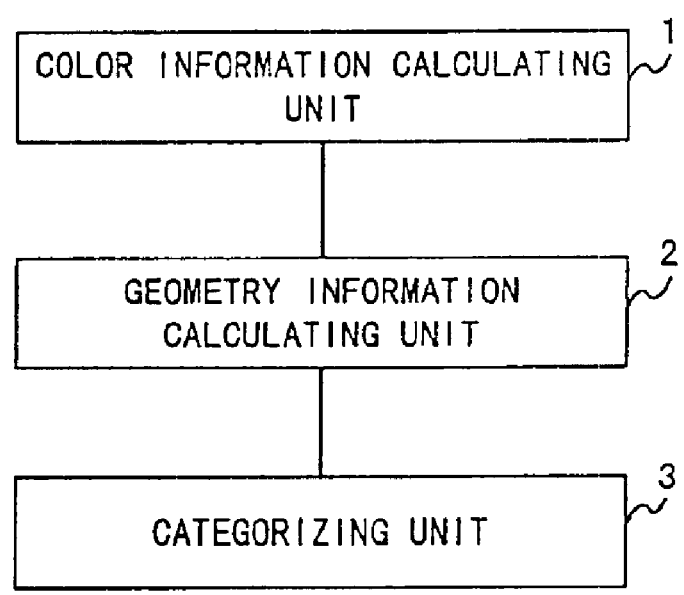
F I G. 3

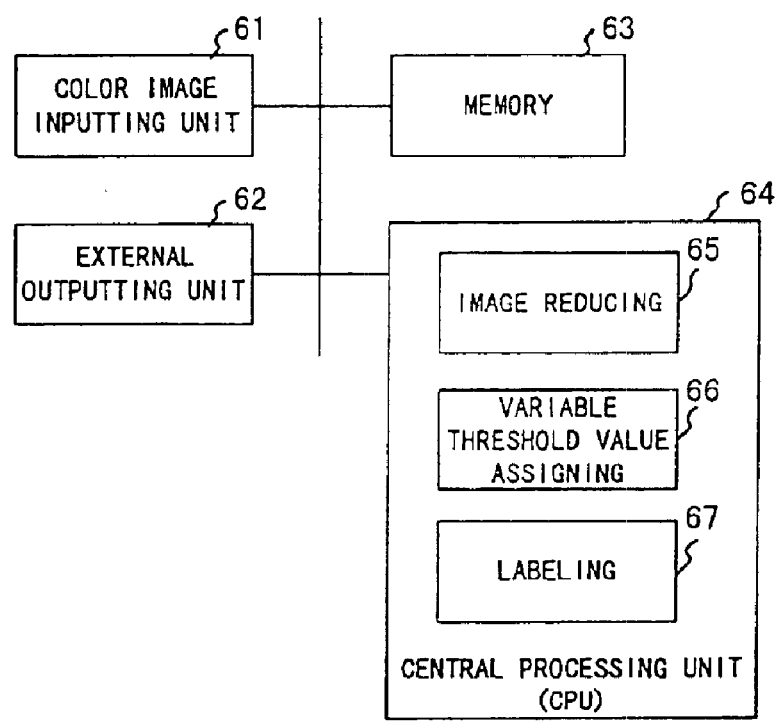
F I G. 8

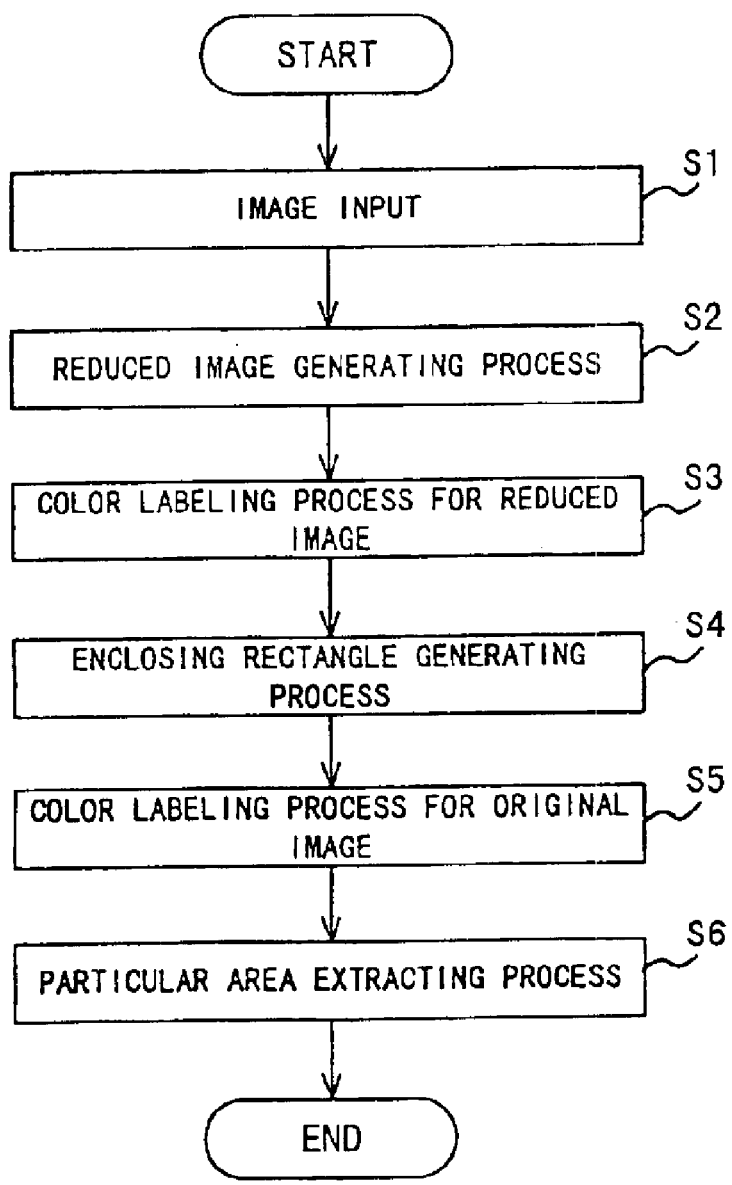
F I G. 1 0

REDUCTION RATIO 1/3

AREA (3×3) OF
ORIGINAL IMAGE

| 1 | 2 | 3 |
|---|---|---|
| 8 | C | 4 |
| 7 | 6 | 5 |

C : CONSIDERED PIXEL. COLOR VALUE (Rc, Gc, Bc)

1~8 : EIGHT PIXELS ADJACENT TO CONSIDERED PIXEL

COLOR VALUE (Ri, Gi, Bi) i = 1~8

FIG. 12A $$do\ i = \begin{cases} 0 \text{ if } |Rc-Ri| \cdot Rth \text{ and} \\ \quad\quad |Gc-Gi| \cdot Gth \text{ and} \\ \quad\quad |Bc-Bi| \cdot Bth \\ \text{LARGE VALUE SUCH AS} \\ 1000 : \text{OTHERWISE} \\ \text{(ANY VALUE LARGER THAN} \\ \text{THRESHOLD VALUE th)} \end{cases}$$

FIG. 12B

| ENTRY | THRESHOLD VALUE |
|---|---|
| (R1, G1, B1) | (Rth1, Gth1, Bth1) |
| (R2, G2, B2) | (Rth2, Gth2, Bth2) |
| ⋮ | ⋮ |
| (Ri, Gi, Bi) | (Rthi, Gthi, Bthi) |
| ⋮ | ⋮ |
| (RN, GN, BN) | (RthN, GthN, BthN) |

F I G.  1 3 A

| ENTRY | THRESHOLD VALUE | |
|---|---|---|
| R1 ~ R4 | Rt1 | R |
| R5 ~ R8 | Rt2 | |
| ⋮ | ⋮ | |
| RN-3 ~ RN | RtM | |

| ENTRY | THRESHOLD VALUE | |
|---|---|---|
| G1 ~ G4 | Gt1 | G |
| RG ~ G8 | Gt2 | |
| ⋮ | ⋮ | |
| GN-3 ~ GN | GtM | |

| ENTRY | THRESHOLD VALUE | |
|---|---|---|
| B1 ~ B4 | Bt1 | B |
| B5 ~ B8 | Bt2 | |
| ⋮ | ⋮ | |
| BN-3 ~ BN | BtM | |

F I G.  1 3 B

| ENTRY | THRESHOLD VALUE |
|---|---|
| R1 ~ R4 | Rt1 |
| R5 ~ R8 | Rt2 |
| ⋮ | ⋮ |
| RN-3 ~ RN | RtM |

R'

| ENTRY | THRESHOLD VALUE |
|---|---|
| G1 ~ G4 | Gt1 |
| RG ~ G8 | Gt2 |
| ⋮ | ⋮ |
| GN-3 ~ GN | GtM |

G'

| ENTRY | THRESHOLD VALUE |
|---|---|
| B1 ~ B4 | Bt1 |
| B5 ~ B8 | Bt2 |
| ⋮ | ⋮ |
| BN-3 ~ BN | BtM |

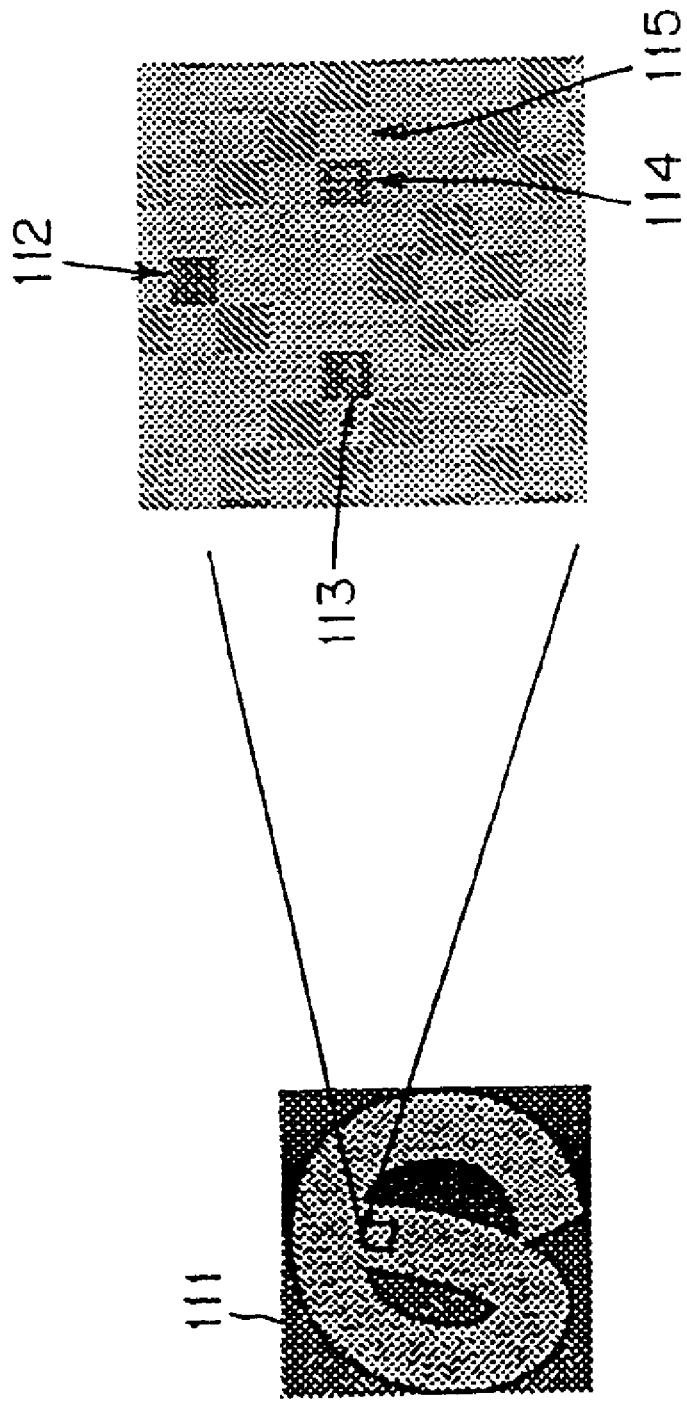

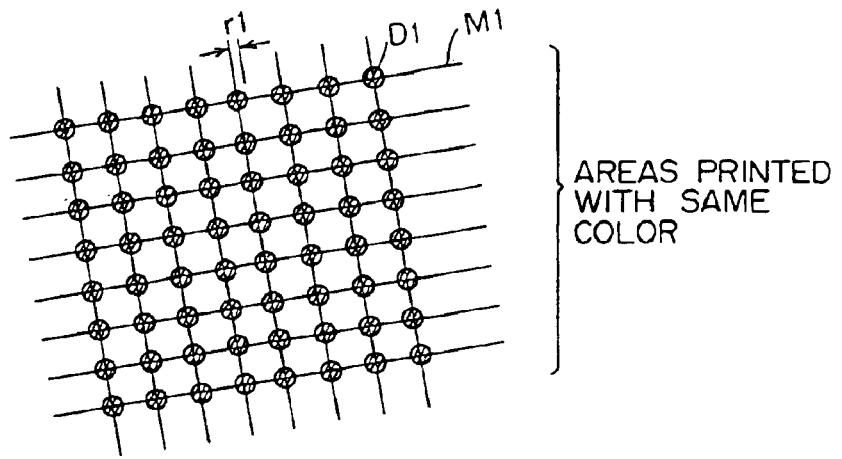
FIG. 18A — AREAS PRINTED WITH SAME COLOR
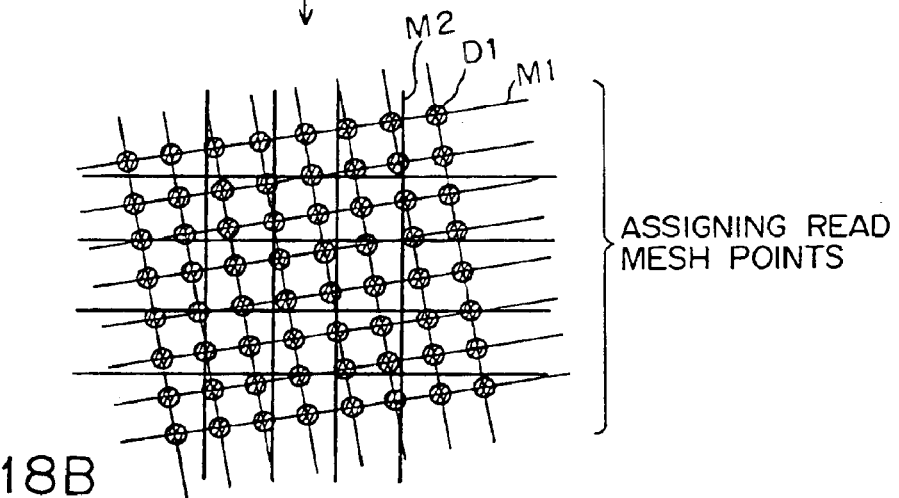
FIG. 18B — ASSIGNING READ MESH POINTS
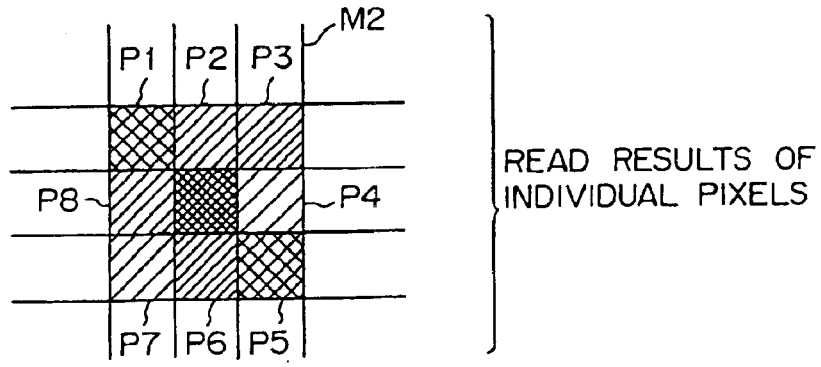
FIG. 18C — READ RESULTS OF INDIVIDUAL PIXELS

EXAMPLE OF TABLE FOR R (THIS TABLE APPLIES TO TABLES FOR G AND B)

| R LUMINANCE VALUE | MAXIMUM VALUE OF LUMINANCE DIFFERENCE WITH ADJACENT PIXELS | RESOLUTION |
|---|---|---|
| 0 | 2 | 14 |
| 0 | 2 | 15 |
| 0 | 1 | 16 |
| ⋮ | ⋮ | ⋮ |
| 0 | 1 | 35 |
| 3 | 10 | 14 |
| 3 | 8 | 15 |
| 3 | 7 | 16 |
| ⋮ | ⋮ | ⋮ |
| 3 | 2 | 35 |
| ⋮ | ⋮ | ⋮ |
| ⋮ | ⋮ | ⋮ |
| 255 | 0 | 14 |
| 255 | 0 | 15 |
| ⋮ | ⋮ | ⋮ |
| 255 | 0 | 35 |

FIG. 20

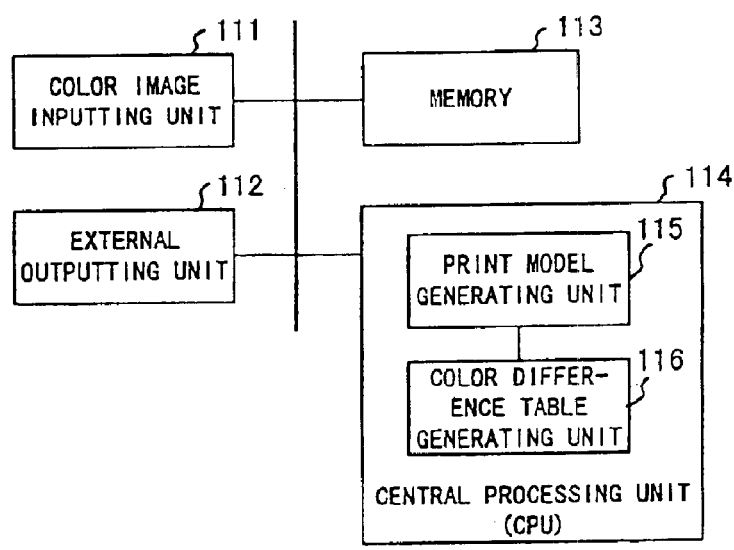
F I G. 2 1

RED ←——— BLACK ———→ RED
GRADUALLY        GRADUALLY
VARYING          VARYING

|   |   |   |
|---|---|---|
| 5 | 6 | 7 |
| 4 | C | 0 |
| 3 | 2 | 1 |

C : CURRENT PIXEL

0~7 : PIXELS ADJACENT TO CURRENT PIXEL, DIRECTION CODE VIEWED FROM PIXEL C IS DC, PIXELS ARE SEARCHED IN DIRECTION OF DC

FIG. 32

MOVING SUM

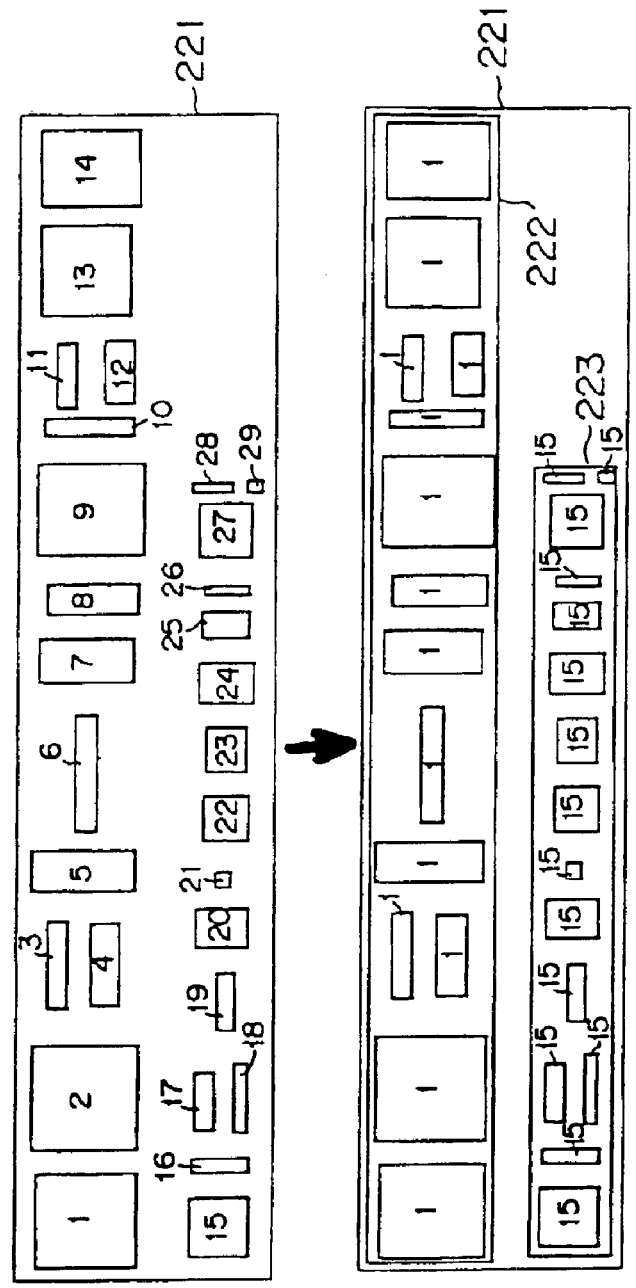

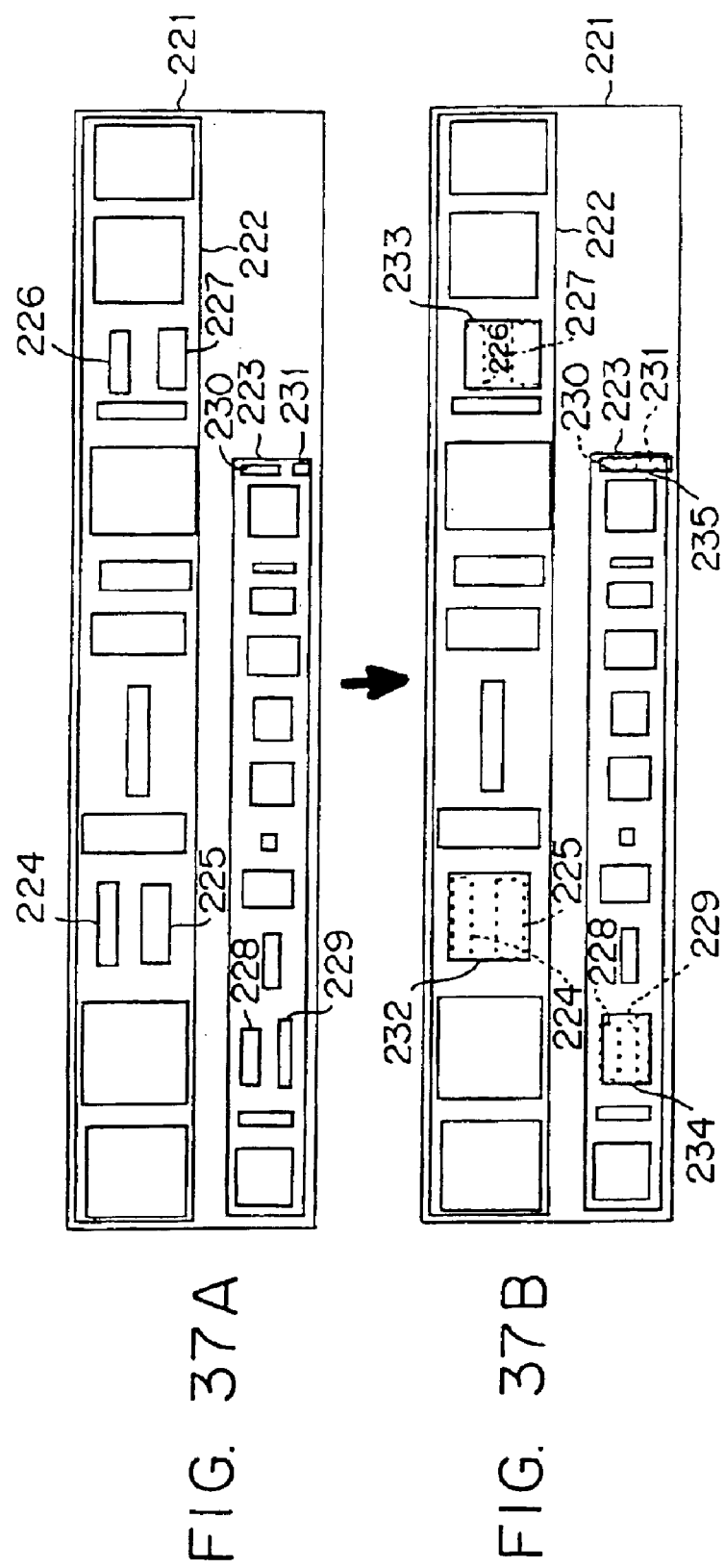

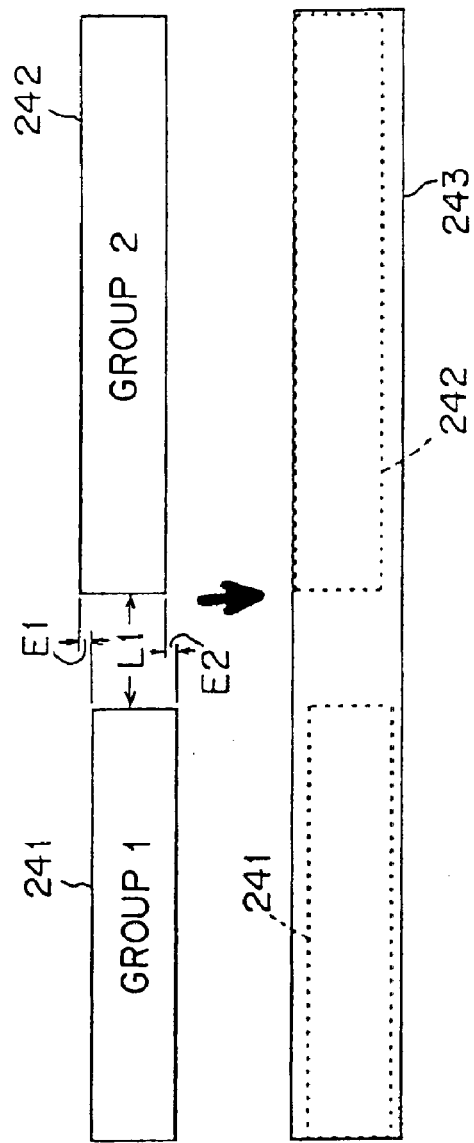

1 : HORIZONTAL ARRANGEMENT FLAG

2 : VERTICAL ARRANGEMENT FLAG

COLOR IMAGE PROCESSING APPARATUS AND PATTERN EXTRACTING APPARATUS

This application is a divisional of application Ser. No. 09/228,427, filed Jan. 12, 1999 now U.S. Pat. No. 6,701,010.

BACKGROUND OF THE INVENTION

1. Field of the Invention

The present invention relates to a color image processing apparatus and a pattern extracting apparatus, in particular, to those suitable for extracting a title or the like from a color image.

2. Description of the Related Art

In recent years, as computers and their peripheral units such as printers have become common and their costs have been decreased, color images have been used in a variety of fields. Thus, a technology for dividing a color image into several areas and extracting only a particular area has been desired. For example, a technology for extracting areas with the same color from a color image has been desired. When a color scenery image photographed by a CCD camera is used for an input image to be process, such a technology has been widely desired in many applications for selecting fruit and watching cars and people for securities.

When a color document image is used as an input image, such a technology is expected to automatically extract a document name and a keyword from the image. Examples of such a technology are data retrieval systems such as book categorizing systems in libraries and automatic management systems. In addition, such a technology is used for automatically assigning keywords and file names in groupware for storing and sharing image data as a database. Such information can be used for retrieving desired data from a large number of color document images.

As technologies for extracting a particular area from a color image, the following methods have been proposed.

(1) RGB Color Space Clustering Method

In the RGB color space clustering method, a color separated image is generated. In other words, pixels of an RGB image photographed by a CCD camera are clustered in the RGB space. With pixels in one cluster, an image of each color is generated. Thus, areas with the same color are extracted. Areas generated in such a method are combined so as to extract a new area.

FIG. 1 is a schematic diagram for explaining the conventional RGB color space clustering method.

In FIG. 1, assuming that a color document image 501 is input, patterns with similar colors are extracted and clustered. For example, assuming that patterns 502 and 507 are blue group colors, a pattern 503 is a green group color, and patterns 504 to 506 are red group colors, a cluster 508 that includes the blue group color patterns 502 and 507, a cluster 509 that includes the green group color pattern 503, and a cluster 510 that includes the red group color patterns 504 to 506 are generated in the RGB space.

When the clusters 508 to 510 are generated, images of the clusters 508 to 510 are generated with pixels that are included therein. Thus, for the cluster 508, a color separated image 501a composed of patterns 502' and 507' is generated. For the cluster 509, a color separated image 501b composed of a pattern 503' is generated. For the cluster 510, a color separated image 501c composed of patterns 504' to 506' is generated.

(2) Non-RGB Color Space Clustering Method

All pixels of an RGB image represented in the RGB space are converted into another color space such as HSV. The pixels are clustered in the color space in a particular manner. Images are generated with pixels that are included in each cluster so as to extract areas with the same colors. The obtained areas are combined so as to extract a new area.

The following technical papers that describe technologies for extracting character areas from color document images are known.

Senda et. al., "Method for extracting a character pattern from a color image due to a single color of characters (translated title)", The Institute of Electronics, Information and Communication Engineers, Japan, PRU 94-04, pp 17–24, Uehane et. al., "Extracting a character area from a color image using iso-color line process (translated title)", The Institute of Electronics, Information and Communication Engineers, Japan, PRU 94-09, pp 9–16, Matsuo et. al., "Extracting a single color character area from a color document image (translated title)", 1997 Annual Convention, The Institute of Electronics, Information and Communication Engineers, Japan, D-12-19, Matsuo et. al., "Extracting a character string from a scenery image with gradation and color information (translated title)", The Institute of Electronics, Information and Communication Engineers, Japan, PRU 92-121, pp 25–32.

(3) Area Expanding Method

In the area expanding method, adjacent pixels are assigned labels corresponding to only similarities of colors. In other words, the maximum value (max) of each color element of (R, G, B) of pixels represented with RGB is obtained and normalized as (R/max, G/max, B/max). Thus, a normalized image is generated.

FIG. 2 is a schematic diagram showing the conventional area expanding method.

In FIG. 2, pixels P1, P2, and so forth in an image are represented with color elements RGB as P1(R1, G1, B), P2(R2, G2, B2), and so forth [1].

Next, the maximum value of each color element is obtained. For example, the maximum value of R1, G1, and B1 of a pixel P1 is denoted by max1. Likewise, the maximum value of R2, G2, and B2 of a pixel P2 is denoted by max2. With the maximum values, each color element is normalized. Thus, normalized pixels P1'(R1/max1, G1/max1, B1/max1) and P2'(R2/max2, G2/max2, B2/max2) are obtained [2].

The square of the difference of each color element of the normalized pixels P1' and P2' is obtained. The results are cumulated so as to obtain the distance between the adjacent pixels P1' and P2' as $d=(R1/max1-R2/max2)^2+(G1/max1-G2/max2)^2+(B1/max1-B2/max2)^2$ [3].

Thus, when the distance d is smaller than a predetermined fixed threshold value TH0, the pixels P1 and P2 are treated as those with the same color and assigned the same label. After all the image is assigned labels, the same color areas with the same labels are extracted.

In the area expanding method, since only adjacent pixels are processed, the process time of this method is shorter than that of the RGB color space clustering method.

For details of the area expanding method, refer to Japanese Patent Laid-Open Publication No. 5-298443.

In addition, as a method for extracting a character area from a color separated image, the above-mentioned method (by Uehane et. al, "Extracting a character area from a color image using iso-color line process", The Institute of Electronics, Information and Communication Engineers, Japan, PRU 94-09, pp 9–16) is known. In this method, a character area is extracted from a color image with the following steps.

Enclosing rectangles in connected areas are obtained from a single-color separated image.

Enclosing rectangles are limited in a predetermined range of the sizes and shapes thereof.

An adjacent rectangle search range of each rectangle is assigned. Rectangles are searched as a group in each search range.

Rectangles with a high linearity of center of gravity are kept in each group.

An enclosing rectangle of each group is obtained and a pattern with a color similar to a color of the area that composed the group is extracted.

However, the conventional clustering method for clustering the same color area of a color image has the following problems.

In the RGB color space clustering method or another color space clustering method (for example, HSV space clustering method), all pixels of the image are clustered. Thus, even if the color of the pattern 502 is different from the color of the pattern 507, when their colors are similar to each other, the patterns 502 and 507 may be categorized as the same cluster 508. In this case, due to the color of the pattern 507, the shape of the cluster of the color of the pattern 502 is varied. Thus, the color range of the cluster of the color of the pattern 502 is distorted. Consequently, the pattern 502 cannot be accurately extracted. For example, when the pattern 502 to be extracted is apart from the pattern 507 with a similar color thereto, if they are extracted as one cluster 508, the color of the cluster 508 becomes a mixed color of the color of the pattern 502 and the color of the pattern 507. The color of the cluster 508 cannot cover the color range of the pattern 502 and the color range of the pattern 508. Thus, holes 511 and 512 may take place in the patterns 502' and 507' as the extracted results. Alternatively, contours of the patterns 502' and 507' may not be clearly extracted.

In the RGB color space clustering method or another color space clustering method (for example, HSV color space clustering method), since many pixels of all the image are clustered, the calculating time for the clustering process becomes long.

On the other hand, in the area expanding method, to normalize pixels as shown in FIG. 2, since divisions should be performed for each pixel, the number of calculations becomes large. The results of the divisions should be stored as floating-point data for all the pixels. Thus, the memory resource necessary for the process becomes large. Moreover, after the pixels are normalized, adjacent pixels that are equally viewed by the observer may largely deviate from a fixed threshold value depending on the definition of similarities of colors of these pixels. Thus, holes may take place in an area. Alternatively, the contour of an area may not be correctly extracted. In addition, since only the relation of adjacent pixels is considered, when the color gradually varies at the boundary of the character area and the background area, the character area and the background area are assigned the same label.

In the conventional character area extracting method, color separated images are generated corresponding to the number of colors of the entire image. Thus, it takes a long time to generate the color separated images. For example, when a title is extracted from the image, the title tends to be adversely affected by other colors. Thus, the extracting accuracy of the title deteriorates. When an enclosing rectangle of connected areas is obtained, the entire image should be processed for each of the extracted color separated images. Consequently, a plurality of images with the same size (corresponding to the number of extracted colors) are required for a color image. Thus, it takes a long time to process the color image.

In addition, since enclosing rectangles are grouped corresponding to the individual color separated images of the entire color image, it takes a long time to process the color image. When characters to be extracted are clustered to different color separated images, they cannot be properly extracted.

When patterns are grouped, only rectangles in relevant search ranges are extracted. Thus, small portions tend to be dropped from relevant groups. To restore dropped portions, patterns with similar colors are extracted at last. However, at this point, noise with a similar color tends to be extracted.

SUMMARY OF THE INVENTION

A first object of the present invention is to provide a color image processing apparatus that performs a distance calculating process for a part of an image area without need to perform a normalizing process.

A second object of the present invention is to provide a pattern extracting apparatus that extracts a pattern at high speed while suppressing the pattern from being dropped.

A third object of the present invention is to provide a pattern extracting apparatus that allows a pattern to be accurately extracted even if the boundary thereof is not clear.

To solve the above described problem, an aspect of the present invention is a color image processing apparatus having a color image inputting unit for inputting a color image and outputting a color image signal, a holding unit for holing the color image signal, and a calculating unit for processing the color image signal, comprising a threshold value assigning unit for assigning a threshold value corresponding to color information of a considered pixel, and a labeling unit for comparing color information of adjacent pixels and assigning the same label to the pixels when the distance thereof is the threshold value or less.

Thus, the threshold value of the distance for determining whether or not to assign the same label to the adjacent pixels can be assigned corresponding to color information of the considered pixel, not a fixed value. Thus, it can be accurately determined whether or not the pixels are in the same range. Consequently, pixels can be accurately extracted from a desired area.

An aspect of the present invention is a color image processing apparatus further comprising an average color calculating unit for obtaining the average color of pixels assigned the same label, and an average color comparing unit for comparing the color of a pixel adjacent to the considered pixel and the average color, wherein the labeling unit assigns the same label to a pixel only when the compared result is in a predetermined range.

Thus, even if the color of an area to be extracted gradually varies and the boundary thereof is not clear, the area to be extracted and an area of a background thereof can be distinguished. Consequently, the extracting accuracy of the area can be improved.

An aspect of the present invention is a color image processing apparatus having a color image inputting unit for inputting a color image and outputting a color image signal, a holding unit for holing the color image signal, and a calculating unit for processing the color image signal, comprising an image reducing unit for reducing the color image signal and generating a reduced image, wherein areas with the same color are obtained from the reduced image and areas corresponding to the obtained areas are extracted corresponding to only a color extracted from the reduced image.

Thus, areas regarded as the same color can be obtained with a reduced image. Consequently, a process for extracting areas regarded as the same color can be performed at high speed.

An aspect of the present invention is a color image processing apparatus, wherein the labeling unit obtains enclosing rectangles of label images and label areas of the reduced image, representative colors thereof, the number of colors in each label area, and colors from the reduced image, obtains rectangles of the original image corresponding thereto, searches a pixel with a color similar to the representative color in the rectangle, and performs a labeling process starting from the searched pixel.

Thus, enclosing rectangles of label images and labels, representative colors thereof, the number of colors in the same label area, and colors are obtained from a reduced image. Corresponding to the obtained results, a rectangle of the original image is obtained. The labeling process can be performed in the rectangle. Thus, the labeling process can be performed at high speed.

An aspect of the present invention is a color image processing apparatus, wherein the labeling unit determines all colors and similarities of areas of the reduced image and assigns the same label to areas when the similarities of the colors of the areas are smaller than the threshold value.

Thus, all colors and their similarities of obtained from a reduced image and similarities of areas of the reduced image are determined. When the similarity of colors of the areas is smaller than the predetermined threshold value, the same label can be assigned to the areas. Thus, a desired area can be extracted as viewed by the naked eye.

An aspect of the present invention is a color image processing apparatus, wherein the threshold value assigning unit determines the similarities of colors of areas with a variable threshold value of three color elements, determines that the similarities of colors of the areas are 0 when the color difference distance of the three color elements of the areas is smaller than the variable threshold value, and determines that the similarities of colors of the areas are larger than the threshold value when the color difference distance of the three color elements of the areas is equal to or larger than the threshold value.

Thus, threshold value elements are assigned three color elements, respectively. When all the three color elements of two colors are less than the respective threshold value (elements), these colors can be treated as the same color. Consequently, the capacity of the table of the threshold values can be decreased. In addition, the labeling process can be very accurately performed.

An aspect of the present invention is a pattern extracting unit, comprising a categorizing unit for categorizing a pattern of an input image corresponding to color information and geometry information of the pattern of the input image.

Thus, when a headline area with the same color is extracted from a color input image, a part of the color input image is limited as the headline area. Patterns are categorized corresponding to color information. A pattern apart from the headline area is removed from an object to be categorized. In addition, a small pattern and a large pattern that are not headline characters can be removed from an object to be categorized corresponding to color information. Thus, the speed of the extracting process of the headline area can be improved.

An aspect of the present invention is a pattern extracting apparatus, comprising a clustering unit for clustering pixels of an input image corresponding to color information of adjacent pixels, and a grouping unit for categorizing the clusters as groups corresponding to color information and geometry information of the clusters obtained by the clustering unit.

Thus, to cluster pixels of an input image, color information of a considered pixel and color information of a pixel adjacent thereto are compared. When all pixels of the input image are compared, the number of times of the comparing process of color information of adjacent pixels becomes the square of the number of pixels of the input image. In contrast, when the color information of a considered pixel is compared with the color information of a pixel adjacent thereto, the number of times of the comparing process becomes the number of pixels of the input image. Thus, the clustering process can be performed at high speed.

Since clusters are categorized as groups, pixels in the same cluster can be integrally handled. Thus, it is not necessary to process individual pixels. Consequently, the grouping process can be performed at high speed. In addition, in a limited range of the input area, clusters with similar colors can be categorized as the same group. Thus, the grouping process can be performed at further higher speed.

An aspect of the present invention is a pattern extracting apparatus for extracting areas in the range of the variation of colors determined in a second resolution as areas with the same color in the case that the areas are determined as the same color in a first resolution and as different colors in the second resolution.

Thus, since the color of a pattern of an input image is represented in a combination of sizes of dots of basic colors, even if an area represented as the same color in the input image is detected as a set of different colors depending on a read resolution, when the input image is read, the range of the same color of the area can be accurately extracted. Consequently, a part of a pattern represented as the same color in the input image can be prevented from being dropped or lost.

An aspect of the present invention is a pattern extracting apparatus, comprising a unit for generating an enclosing rectangle of a label image, a unit for extracting an enclosing rectangle with a size in a predetermined range from the extracted enclosing rectangle, a unit for assigning a search area in a predetermined area of the extracted enclosing rectangle, and a unit for assigning an enclosing rectangle in the search area, or partially disposed in the search area as an alternative to be categorized as a group with respect to the extracted enclosing rectangle.

Thus, among enclosing rectangles generated with label images, an enclosing rectangle that becomes a reference for assigning a search area can be limited to an enclosing rectangle with a predetermined size. Thus, when a character area is extracted from an input image, enclosing rectangles of a small pattern such as noise and a large pattern such as a background or a frame can be prevented from being selected as a reference of a search area for searching a character string. Consequently, a pattern that is not a character string can be suppressed from being categorized as a group. Thus, only a character string can be effectively extracted.

Since a search area for searching a character string is assigned in a predetermined range of a considered enclosing rectangle, only characters in the vicinity of a considered enclosing rectangle can be searched. When a title or the like is extracted from the input image, a character that is apart from the title and that does not compose the title can be prevented from being extracted as the group of the title. Thus, only characters of the title can be effectively extracted.

An aspect of the present invention is a pattern extracting apparatus, comprising a first color information comparing unit for comparing color information of adjacent pixels of an input image, a second color information comparing unit for comparing the color information of the pixels compared by the first color information comparing unit and color information of a label image adjacent thereto, and a labeling unit for assigning labels to pixels corresponding to the compared result of the first color information comparing unit and the compared result of the second color information comparing unit.

Thus, in the case that a color gradually varies, only when color information of adjacent pixels is compared, since the colors of the adjacent pixels are similar, these pixels are assigned the same label. When these pixels are traced, the difference of colors cumulates. Thus, pixels with different colors may be assigned the same label. However, according to the present invention, since color information of a pattern that has been assigned a label can be compared, the labeling process can be performed corresponding to the cumulated value of the difference of colors. Thus, when an area whose color gradually varies is assigned a label corresponding to the compared result of the color information of the adjacent pixels, pixels with different colors can be prevented from being assigned the same label.

An aspect of the present invention is a pattern extracting apparatus, comprising a color difference calculating unit for calculating the color difference between adjacent pixels of an area represented with a particular color, a threshold value assigning unit for assigning a threshold value corresponding to the color difference, and a labeling unit for assigning a label to a pixel adjacent to a pixel represented with the predetermined color corresponding to the threshold value.

Thus, since an input image is printed by halftone printing method, even if the input image is represented in the same color, it may be detected as a set of different colors depending on a read resolution. In this case, an area with the same color can be accurately extracted. Thus, a part of a pattern can be prevented from being dropped or lost from an area represented as the same color in the input image.

An aspect of the present invention is a pattern extracting apparatus further comprising a print model generating unit having meshes of basic colors, basic color dots being disposed at mesh points of the meshes, the meshes being rotated and superimposed each other, the sizes of the basic color dots being varied, so as to generate a color as a print model.

Thus, a color generated by the halftone printing method is virtually generated on a computer. The variation of a color by the halftone printing method can be distinguished without need to analyze the variation of the color by the halftone printing method using a real printed document.

An aspect of the present invention is a pattern extracting apparatus further comprising a color difference table generating unit for generating a color difference table that stores luminance values of colors generated by the print model generating unit and the color difference between adjacent pixels corresponding to the luminance values in each read resolution of the print model.

Thus, regardless of a resolution of a device that reads data from a real printed document, a threshold value for determining whether or not colors that are read from a real printed document are the same can be easily obtained.

An aspect of the present invention is a pattern extracting apparatus further comprising a model resolution estimation processing unit for estimating the read resolution of the print mode for an input image.

Thus, a real printed document that is read by a device can be handled with a print model virtually generated on a computer. The labeling process can be performed with a threshold value generated with a print model to the real printed document that is read by the device.

An aspect of the present invention is a pattern extracting apparatus, wherein the model resolution estimating processing unit estimates a resolution of which a luminance value of a color and a color difference registered in the color difference table optimally confirms to the entire input image as a read resolution of the print model of the input image.

Thus, for a real printed document that is read by a device, an optimum threshold value generated by a print model is applied to the entire input image so as to perform the labeling process.

An aspect of the present invention is a pattern extracting apparatus, wherein the model resolution estimating processing unit estimates a resolution of which a luminance value of a color and a color difference registered in the color difference table optimally confirms to a local area of the input image as a read resolution of the print model of the local area of the input image.

Thus, in an input image that is read by a device from a real printed document, for an area that exceeds a predetermined threshold value of the entire input image, the labeling process can be performed for the area with a threshold value optimum for the area. Consequently, the accuracy of the labeling process can be improved.

An aspect of the present invention is a pattern extracting apparatus, wherein the model resolution estimation processing unit causes a read resolution of the print model to be a fixed value.

Thus, the model resolution estimating process of a real printed document can be omitted. Consequently, the process can be performed at high speed.

An aspect of the present invention is a pattern extracting apparatus, further comprising a grouping unit for categorizing label images labeled by the labeling unit as a group.

Thus, a character area extracted by the labeling process can be categorized as a character string area. Consequently, a title can be effectively extracted.

An aspect of the present invention is a pattern extracting apparatus, wherein the grouping unit determines whether or not to categorize a label image as the same group corresponding to color information and geometry information of an enclosing rectangle of the label image.

Thus, when a headline area with the same color is extracted from an input color image, a pattern is extracted from a limited area of the input color image. A pattern that is apart from a headline area can be removed from an object to be categorized. In addition, a small pattern such as noise and a large pattern such as a background that is not the headline characters can be omitted from an object to be processed. Consequently, the speed of the extracting process for the headline area can be improved. Since a labeled pattern is represented by an enclosing rectangle, a complicated pattern composing a character or the like can be represented in a simple shape. Thus, the storage capacity for the pattern can be decreased. In addition, when the relation of positions of patterns is obtained, the process can be simplified.

An aspect of the present invention is a pattern extracting apparatus, wherein the color information is the representative color of the pattern included in the enclosing rectangle.

Thus, patterns labeled can be compared as enclosing rectangles. When patterns are categorized as a group corresponding to color information, it is not necessary to compare each pixel that composes the patterns. Thus, since the number of elements to be compared can be decreased, the process can be performed at high speed.

An aspect of the present invention is a pattern extracting apparatus, wherein the geometry information is another enclosing rectangle present in a predetermined range of a considered enclosing rectangle.

Thus, when a title area or the like is extracted from an input image, the range of an enclosing rectangle to be categorized as a group can be limited to a range suitable for the title area. The grouping process can be omitted for an area that protrudes from the title area. Thus, the process can be preformed at high speed.

An aspect of the present invention is a pattern extracting apparatus, wherein the geometry information calculating unit has a rectangle number storing unit for storing a rectangle number corresponding to vertical and horizontal coordinates of each enclosing rectangle, a rectangle number extracting unit for extracting a rectangle number included in each of vertical and horizontal coordinates in a predetermined range of a considered enclosing rectangle, and an adjacent rectangle extracting unit for extracting a rectangle number included in both the vertical and horizontal coordinates as another enclosing rectangle in a predetermined range of a considered enclosing rectangle.

Thus, another enclosing rectangle in the predetermined range of the considered enclosing rectangle can be effectively searched.

An aspect of the present invention is a pattern extracting apparatus, wherein the rectangle number storing unit stores rectangle numbers of enclosing rectangles in the order of coordinate values, and wherein the rectangle number extracting unit searches rectangle numbers in the ascending order of the coordinate values and extracts rectangle numbers in each coordinate value.

Thus, when an area for storing a rectangle number of an enclosing rectangle is prepared for each coordinate value, the storage capacity corresponding to enclosing rectangles that are expectedly present in a predetermined range of a considered enclosing rectangle is required. In contrast, according to the present invention, since coordinate values corresponding to real enclosing rectangles are stored, the storage capacity can be decreased.

An aspect of the present invention is a pattern extracting apparatus, wherein the determining unit categorizes two enclosing rectangles as the same group when the two enclosing rectangles are present in a predetermined range of a considered enclosing rectangle and the color difference of the representative colors of the two enclosing rectangles is smaller than a color difference obtained from the color difference table.

Thus, when a title area or the like is extracted from an input image, a range of enclosing rectangles to be categorized can be limited to a range suitable for the title area. When enclosing rectangles are compared and patterns are categorized as a group with color information, the variation of a color in the reading operation of a real printed document can be considered. Thus, the process can be preformed at high speed. In addition, the reading accuracy is improved.

An aspect of the present invention is a pattern extracting apparatus, wherein the grouping unit categorizes a label image as a group corresponding to the thickness of a pattern of the label image. Thus, since characters with different thicknesses can be categorized as different groups, when a title or the like is extracted from an input image, only a character string composed of characters with the same thickness can be extracted as a title. Thus, the extracting accuracy of the title can be improved.

An aspect of the present invention is a pattern extracting apparatus, wherein the grouping unit has a contour tracing unit for obtaining the contour length of the pattern, an area calculating unit for obtaining the area of the pattern, and a thickness calculating unit for obtaining the thickness of the pattern corresponding to the ratio of the area of the pattern and the contour length of the pattern.

Thus, the thickness of the pattern can be accurately obtained.

An aspect of the present invention is a pattern extracting apparatus, wherein the contour tracing unit searches a second pixel that is the contour of a pattern with a first pixel that is the contour of the pattern in such a manner that the second pixel is searched from eight pixels that are adjacent to the first pixel and that are adjacent to a source pixel of the first pixel.

Thus, to search a second pixel that becomes the contour of a pattern from a first pixel that becomes the contour of the pattern, eight pixels adjacent to the first pixel are searched in a predetermined direction. When a point of which the level of a pixel is changed from the level of a background to the level of the pattern is the second pixel, the first pixel that has already been extracted can be prevented from being extracted again as a point of the contour of the pattern. Thus, the speed of the contour tracing process can be improved.

An aspect of the present invention is a pattern extracting apparatus, further comprising a character size estimating unit for estimating the character size corresponding to the size of an enclosing rectangle categorized as a group, and a rectangle deleting unit for deleting an enclosing rectangle that exceeds a predetermined range of the character size from the group of the enclosing rectangles.

Thus, even if a pattern of a picture or the like is present in the vicinity of a title and the pattern of the picture is categorized as a group of characters that composes the title, the pattern of the picture can be removed from the group. Thus, the accuracy for extracting the title can be improved.

An aspect of the present invention is a pattern extracting apparatus, further comprising a character string direction estimating unit for estimating the direction of a character string corresponding to the arrangement of enclosing rectangles categorized as a group by the grouping unit, and a character string extracting unit for extracting a character string corresponding to the arrangement of enclosing rectangles categorized as a group by the grouping unit.

Thus, an area of which enclosing rectangles are irregularly disposed and an area of which enclosing rectangles are regularly disposed can be distinguished. Consequently, an area of which enclosing rectangles are regularly disposed can be treated as a title area. Thus, only the title area can be effectively extracted.

An aspect of the present invention is a pattern extracting apparatus, further comprising a re-grouping unit for re-categorizing enclosing rectangles in a group corresponding to the size of the enclosing rectangles categorized as a group.

Thus, characters with different sizes can be categorized as different groups. Consequently, when a title or the like is extracted from an input image, only a character string composed of characters with the same size can be treated as a title. Thus, the extracting accuracy for a title can be improved.

An aspect of the present invention is a pattern extracting apparatus, further comprising an enclosing rectangle extracting unit for extracting an enclosing rectangle with a predetermined size from enclosing rectangles categorized as a group by the grouping unit, a horizontal arrangement flag assigning unit for assigning a horizontal arrangement flag to enclosing rectangles that are extracted as adjacent enclosing rectangles and whose upper edges or lower edges are close, a vertical arrangement flag assigning unit for assigning a vertical arrangement flag to enclosing rectangles that are extracted as adjacent enclosing rectangles and whose left edges or right edges are close, a character string direction determining unit for determining the direction of a character string of the group corresponding to the number of the horizontal arrangement flags and the vertical arrangement flags, and a character string determining unit for determining whether the enclosing rectangles of the group are enclosing rectangles of a character string corresponding to the ratio of the enclosing rectangles of the group with the flags corresponding to the determined direction of the character string.

Thus, it can be determined whether or not enclosing rectangles in a group are arranged in a row. A group of enclosing rectangles arranged in a row can be treated as a title area. Thus, a title can be effectively extracted from an input image.

An aspect of the present invention is a pattern extracting apparatus, further comprising an enclosing rectangle generating unit for generating an enclosing rectangle categorized as a group by the grouping unit, and a representative color calculating unit for calculating the representative color of the group corresponding to the representative color of the pattern of the group categorized by the grouping unit.

Thus, corresponding to all colors of a title area, the color of a title can be calculated. The influence of color difference in a local area of the title area can be alleviated. Consequently, the extracting accuracy for the title area can be improved.

An aspect of the present invention is a pattern extracting apparatus, further comprising a group combining unit for combining adjacent enclosing rectangles of the group corresponding to the representative color of the group.

Thus, even if characters composing the same title are categorized as different groups due to a slight color difference, these characters can be categorized as the same group. Thus, a title area can be effectively extracted.

An aspect of the present invention is a pattern extracting apparatus, wherein the group combining unit combines adjacent enclosing rectangles of a group when the difference of the sizes of the adjacent enclosing rectangles is in a predetermined range and the difference of representative colors of the group is in a predetermined range.

Thus, when enclosing rectangles of a group are combined, only characters that compose the same title can be effectively combined.

An aspect of the present invention is a pattern extracting apparatus, further comprising a re-extracting unit for re-extracting a pixel of an original image in the range of enclosing rectangles of the group corresponding to the representative color of the group.

Thus, even if characters composing a title include a sonant letter or a semi-sonant letter and the sonant letter or the semi-sonant is dropped from the group of the title due to a local color difference of the title area, the color of the sonant letter or the semi-sonant letter can be compared with the entire color of the title area so as to re-extract the sonant letter or the semi-sonant letter. Consequently, the extracting accuracy for the title can be improved.

An aspect of the present invention is a pattern extracting apparatus, further comprising a digitizing unit for digitizing a pixel that has been re-extracted, a second labeling unit for assigning a label to the digitized image, and an adding unit for adding an enclosing rectangle that has been assigned a label by the second labeling unit and that is larger than a predetermined threshold value to the group.

Thus, when a sonant letter or a semi-sonant letter is re-extracted from the title area, even if a thin noise with the same color as the title is present in the title area, only the noise can be deleted. Consequently, the extracting accuracy for the title can be improved.

An aspect of the present invention is a pattern extracting apparatus, further comprising an output order determining unit for determining the output order of patterns in a group corresponding to the areas of enclosing rectangles categorized as the group, the positions thereof, and the relation of the positions thereof.

Thus, even if a plurality of title alternatives are extracted from an input image, the likelihood of a title can be evaluated. Consequently, title alternatives can be output in the order of the maximum likelihood of the title.

An aspect of the present invention is a pattern extracting apparatus, further comprising a binary pattern generating unit for generating a binary pattern of which a label image of enclosing rectangles categorized as a group is assigned level 1.

Thus, a binary image can be generated with a label image labeled with color information. Consequently, a pattern extracted from a color image can be effectively recognized.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 2 is a schematic diagram showing a conventional area expanding method;

FIG. 3 is a block diagram showing the structure of a pattern extracting apparatus according to a first embodiment of the present invention;

FIG. 8 is a block diagram showing the structure of a pattern extracting apparatus according to a firth embodiment of the present invention;

FIG. 10 is a flowchart showing the operation of the pattern extracting apparatus shown in FIG. 9;

FIGS. 12A and 12B are schematic diagrams for explaining a labeling method according to an embodiment of the present invention;

FIGS. 13A and 13B are schematic diagrams showing an example of the structure of a threshold value reference table according to an embodiment of the present invention;

FIG. 14 is a schematic diagram showing another example of the structure of the threshold value reference table according to an embodiment of the present invention;

FIGS. 16A and 16B are schematic diagrams for explaining a representing method of a color image in halftone printing method;

FIG. 18A is a schematic diagram showing an area printed with one color by the halftone printing method;

FIG. 18B is a schematic diagram showing read meshes in the area shown in FIG. 18A;

FIG. 18C is a schematic diagram showing read results of individual pixels;

FIG. 20 is a schematic diagram showing the structure of a color difference table according to an embodiment of the present invention;

FIG. 21 is a block diagram showing the structure of a color difference table generating apparatus according to an embodiment of the present invention;

FIG. 32 is a schematic diagram showing a direction code viewed from a current pixel according to an embodiment of the present invention;

FIGS. 36A and 36B are schematic diagrams for explaining a process for extracting a character string from a group according to an embodiment of the present invention;

FIGS. 37A and 37B are schematic diagrams for explaining a process for combining separated characters of a character string according to an embodiment of the present invention;

FIGS. 39A and 39B are schematic diagrams for explaining a group combining process according to an embodiment of the present invention;

FIG. 45A is a schematic diagram showing a first alternative pattern of a title extracted from the image shown in FIG. 43A; and FIG. 45B is a schematic diagram showing a second alternative pattern of the title extracted from the image shown in FIG. 43A.

DESCRIPTION OF PREFERRED EMBODIMENTS

Next, with reference to the accompanying drawings, a pattern extracting apparatus according to an embodiment of the present invention will be described.

FIG. 3 is a block diagram showing the structure of a pattern extracting apparatus according to a first embodiment of the present invention.

In FIG. 3, a color information calculating unit 1 calculates color information of a pattern of an input image. A geometry information calculating unit 2 calculates geometry information of a pattern of an input image. A categorizing unit 3 categorizes a pattern of an input image corresponding to the color information calculated by the color information calculating unit 1 and the geometry information calculated by the geometry information calculating unit 2. The color information is for example a color of a pattern in color space. The geometry information is for example the size of a particular pattern, the position of a particular pattern in an input image, or the relation between positions of a particular pattern and another pattern.

When a pattern of an input image is categorized, the geometry information of the pattern is also used along with the color information thereof. Thus, in the case that a title area with the same color is extracted from a color input image, in a limited range of the color input image, patterns with the same color and different labels can be categorized as one group. Patterns at particular positions or patterns with a particular size can be categorized as one group even if they are assigned different labels.

Thus, only in a range that a title area is present with a high probability, the labeling process can be performed. In addition, a small pattern that is not a title character such as noise and a large pattern such as a background can be removed from an object to be processed. Thus, the speed of the extracting process for a title area can be improved. In addition, the influence of colors of the non-title areas can be alleviated. Consequently, the extracting accuracy of the title area can be improved.

Figure 1:
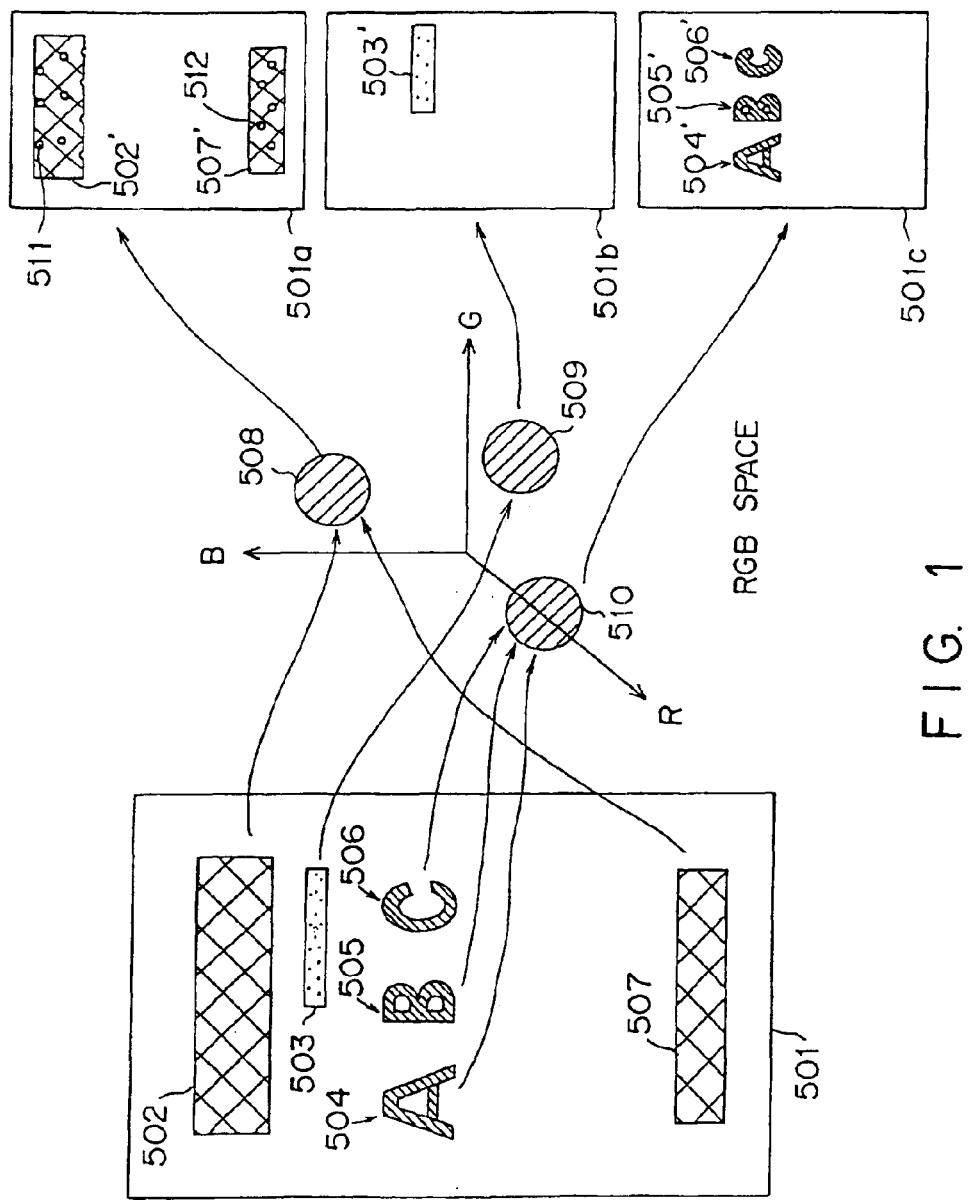
FIG. 1 is a schematic diagram showing a method for generating a conventional color separated image.
Figure 4:
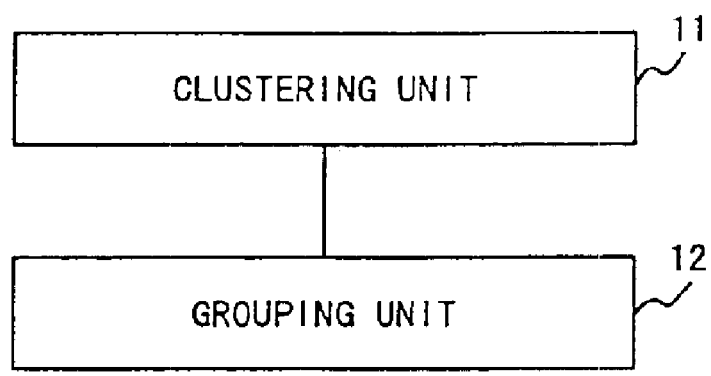
FIG. 4 is a block diagram showing the structure of a pattern extracting apparatus according to a second embodiment of the present invention.

FIG. 4 is a block diagram showing the structure of a pattern extracting apparatus according to a second embodiment of the present invention.

In FIG. 4, a clustering unit 11 clusters pixels of an input image corresponding to color information of adjacent pixels. A grouping unit 12 groups clusters corresponding to the color information and geometry information of each cluster obtained by the clustering unit 11.

Thus, when pixels of an input image are clustered, color information of a considered pixel is compared with color information of each of adjacent pixels. Thus, it is not necessary to compare color information of all pixels of the input image.

When all the pixels of the input image are compared with each other, the number of times of the comparing process of color information of each pixel amounts to the square of the number of pixels of the input image. In contrast, when the color information of a particular pixel is compared with the color information of each of adjacent pixels, the number of times of the comparing process of color information of each pixel becomes the number of pixels of the input image. Thus, the clustering process can be performed at high speed.

When clustered pixels are grouped, pixels in the same cluster can be integrally handled. Thus, it is not necessary to process individual pixels. Consequently, the grouping process can be performed at high speed.

In addition, clustered pixels can be grouped in a limited range of the input image. Moreover, a small cluster that is noise can be excluded in the grouping process. Thus, the grouping process can be performed at much higher speed. In particular, when the number of labels is large as with a color image, a remarkable effect can be obtained.

Figure 5:
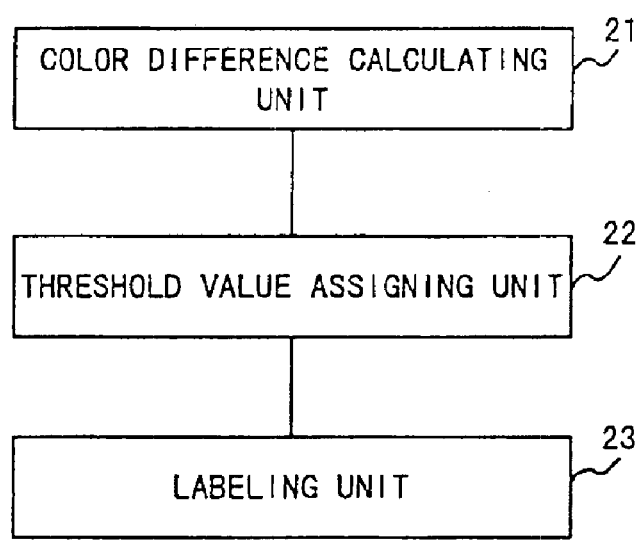
FIG. 5 is a block diagram showing the structure of a pattern extracting apparatus according to a third embodiment of the present invention.

FIG. 5 is a block diagram showing the structure of a pattern extracting apparatus according to a third embodiment of the present invention.

In FIG. 5, a color difference calculating unit 21 calculates the color difference of adjacent pixels in an area represented by a predetermined color. A threshold value assigning unit 22 assigns a threshold value corresponding to the color difference calculated by the color difference calculating unit 21. A labeling unit 23 labels pixels adjacent to a pixel represented by a predetermined color corresponding to the threshold value assigned by the threshold value assigning unit 22.

It is assumed that an input image is obtained from a document printed by the halftone printing method and that the colors of patterns of the input image are represented in a combination of the sizes of dots of basic colors. Since the sizes of dots of the basic colors are small, when one color is represented in a combination of the sizes of dots of the basic colors, even if the difference of colors of the dots cannot be distinguished by the naked eye, and viewed as a single color, when the read resolution of a device is as high as the color of each dot can be distinguished, an area viewed as a single color by the naked eye may be determined as a non-single color area by the device.

Thus, when the read results of the device are labeled, one pattern viewed as a single color by the naked eye is assigned different labels. When patterns extracted corresponding to the different labels are viewed by the naked eye, a hole or a brake takes place in an area recognized as one pattern with the naked eye. Thus, the extracting accuracy of the pattern deteriorates.

To prevent such a problem, for an area that is viewed as a single color by the naked eye, the color variation read by the device is obtained. Pixels in the range of the color variation are assigned the same label. Thus, one pattern viewed as a single color by the naked eye can be assigned the same label. Consequently, a hole or a break can be prevented from taking place in an area viewed as one pattern by the naked eye.

Figure 6:
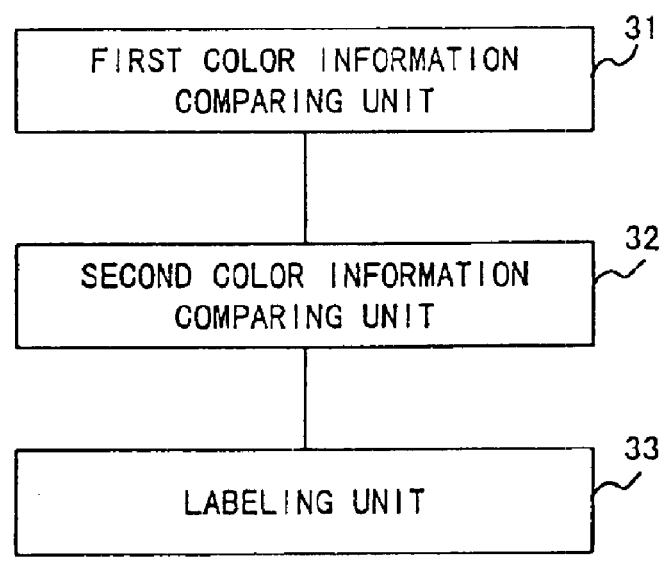
FIG. 6 is a block diagram showing the structure of a pattern extracting apparatus according to a fourth embodiment of the present invention.

FIG. 6 is a block diagram showing the structure of a pattern extracting apparatus according to a forth embodiment of the present invention.

In FIG. 6, a first color information comparing unit 31 compares color information of adjacent pixels of an input image. A second color information comparing unit 32 compares color information of pixels compared by the first color information comparing unit 31 and color information of a label image adjacent to the pixels. A labeling unit 33 labels pixels corresponding to the compared results of the first color information comparing unit 31 and the compared results of the second color information comparing unit 32. Color information of the label image is for example the average value of color information of pixels with the same label.

It is assumed that the color of a title area of an input image gradually varies and thereby the boundary of a character string of a title and a background thereof is not clear. In this case, if color information of adjacent pixels is compared, since colors of the adjacent pixels are similar, these pixels are assigned the same label. When these pixels are successively traced, a pattern of the background is read in the title area. Thus, pixels with different colors from the title may be assigned the same label.

Rather than comparing color information of adjacent pixels, color information of labeled patterns is compared with color information of each pixel. In addition, the pixel is assigned a label. Thus, even if the color gradually varies, the boundary between the title area and the background can be detected.

Figure 7:
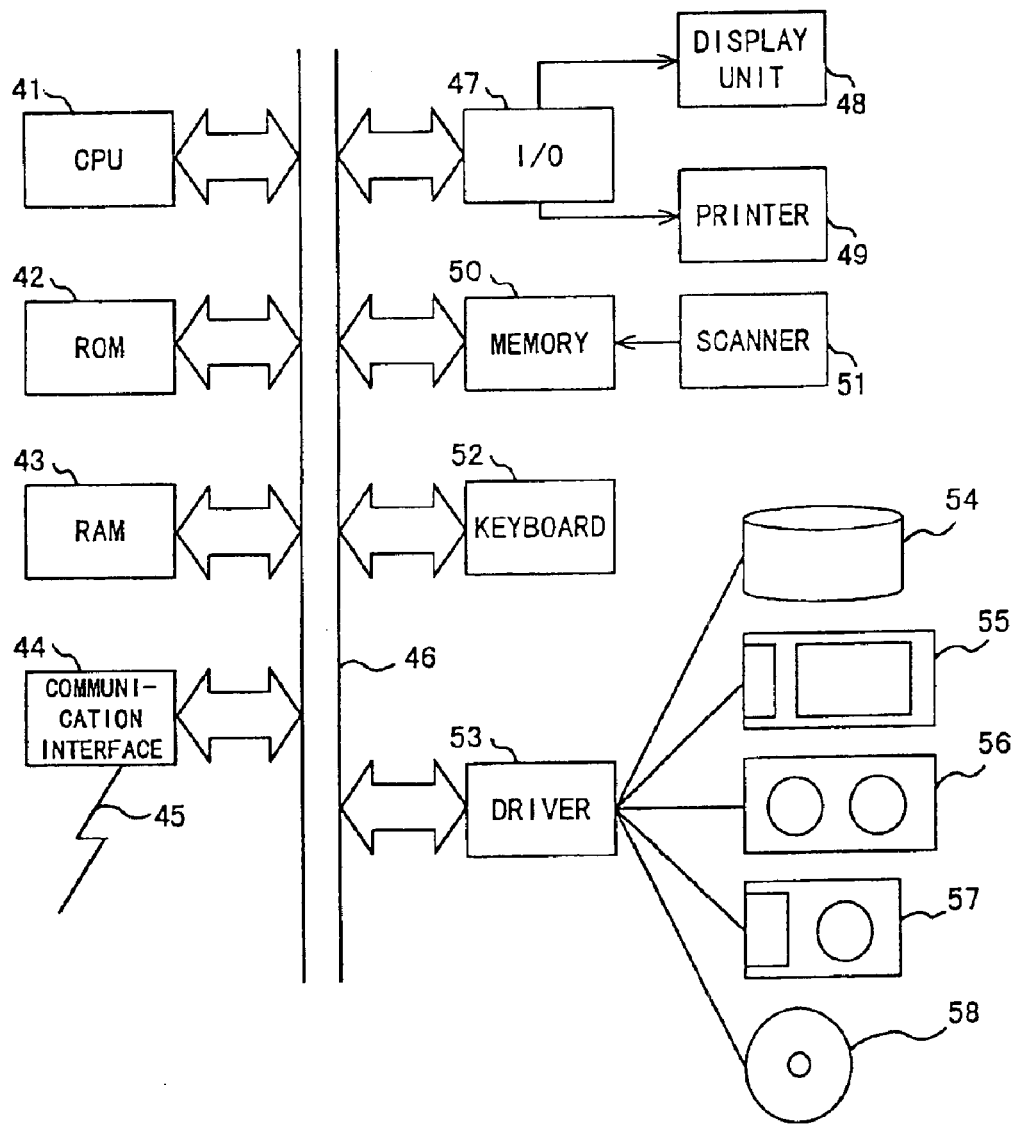
FIG. 7 is a block diagram showing the system structure of a pattern extracting apparatus according to an embodiment of the present invention.

FIG. 7 is a block diagram showing the system structure of a pattern extracting apparatus according to an embodiment of the present invention.

In FIG. 7, the pattern extracting apparatus comprises a central processing unit (CPU) 41, a read-only memory (ROM) 42, a random-access memory (RAM) 43, a communication interface 44, a communication network 45, a bus 46, an input/output interface 47, a display unit 48 that displays recognized results such as a character string of a title or the like, a printer 49 that prints recognized results such as a character string of a title or the like, a memory 50 that temporarily stores data that is read by a scanner 51 or the like, a scanner 51 that reads an input image or the like, a keyboard 52, a driver 53 that drives a storage medium, a hard disk 54, an IC memory card 55, a magnetic tape 56, a floppy disk 57, and an optical disc 58 (such as a CD-ROM or a DVD-ROM).

A program that causes the system to perform a pattern extracting process is stored in a storage medium such as the hard disk 54, the IC memory card 55, the magnetic tape 56, the floppy disk 57, or the optical disc 58. When the system reads the program for the pattern extracting process from such a storage medium to the RAM 43, the system performs the pattern extracting process. The program for the pattern extracting process may be stored in the ROM 42.

The program for the pattern extracting process can be obtained from the communication network 45 through the communication interface 44. Examples of the communication network 45 connected to the communication interface 44 are LAN (Local Area Network), WAN (Wide Area Network), Internet, analog telephone network, digital telephone network (ISDN: Integral Service Digital Network), PHS (Personal Handy System), and a radio communication network (such as satellite communication).

When the program for the pattern extracting process gets started, the CPU 41 assigns a threshold value with which an input image that is read by the scanner 51 is labeled and generates a label image corresponding to the input image that is read by the scanner 51. After generating the label image, the CPU 51 generates enclosing rectangles of the pattern of the input image corresponding to the labels thereof. The CPU 41 groups the enclosing rectangles corresponding to color information of areas therein and geometry information thereof. The CPU 41 extracts a title area or the like corresponding to the arrangement state and sizes of the grouped enclosing rectangles. When the CPU 41 extracts the title area, it outputs a pattern in the title area as a title extracted from the input image to the display unit 48 and the printer 49. The CPU 41 recognizes characters of the pattern in the title area and automatically retrieves a document corresponding to the recognized results.

FIG. 8 is a block diagram showing the structure of a pattern extracting apparatus according to a fifth embodiment of the present invention.

In FIG. 8, the pattern extracting apparatus comprises a color image inputting unit 61, an external outputting unit 62, a memory 63, a central processing unit (CPU) 64, an image reducing unit 65, a variable threshold value assigning unit 66, and a labeling unit 67.

When the image reducing unit 65 inputs a color image signal from the color image inputting unit 61, the image reducing unit 65 generates a reduced image of which the number of pixels of the original image is decreased 1/9 times. The labeling unit 67 labels the reduced image with a color difference to some extent using a technique such as the area expanding method and obtains a label image that represents the same label area and an enclosing rectangle that surrounds the same label area.

At this point, the threshold value of the difference of color values with the same label as adjacent pixels is not fixed (unlike with the area expanding method), but variable depending on a relevant color. The threshold value is obtained corresponding to the relevant color by the variable threshold value assigning unit 66. The variable threshold value assigning unit 66 references a particular table corresponding to the relevant color.

All numeric strings such as (R, G, B) that represent colors of areas with the same label are searched from the reduced image. The obtained numeric strings are stored as attributes of the label. In addition, the representative color of the label is obtained corresponding to the colors.

Next, the enclosing rectangle obtained from the reduced image is reflected to the original image. Only the inside of the rectangle is scanned so as to detect a color similar to the representative color. Pixels adjacent to the relevant pixel are assigned labels. In this case, colors treated as the same color are colors that have been treated as the same color by the above-described process.

A predetermined area is extracted from a label image obtained from the original image. When a character area such as a title composed of large characters or a keyword is extracted from a color document, only a relevant character string area is extracted using character string extracting technique corresponding to information of the sizes and arrangement of enclosing rectangles.

Figure 9:
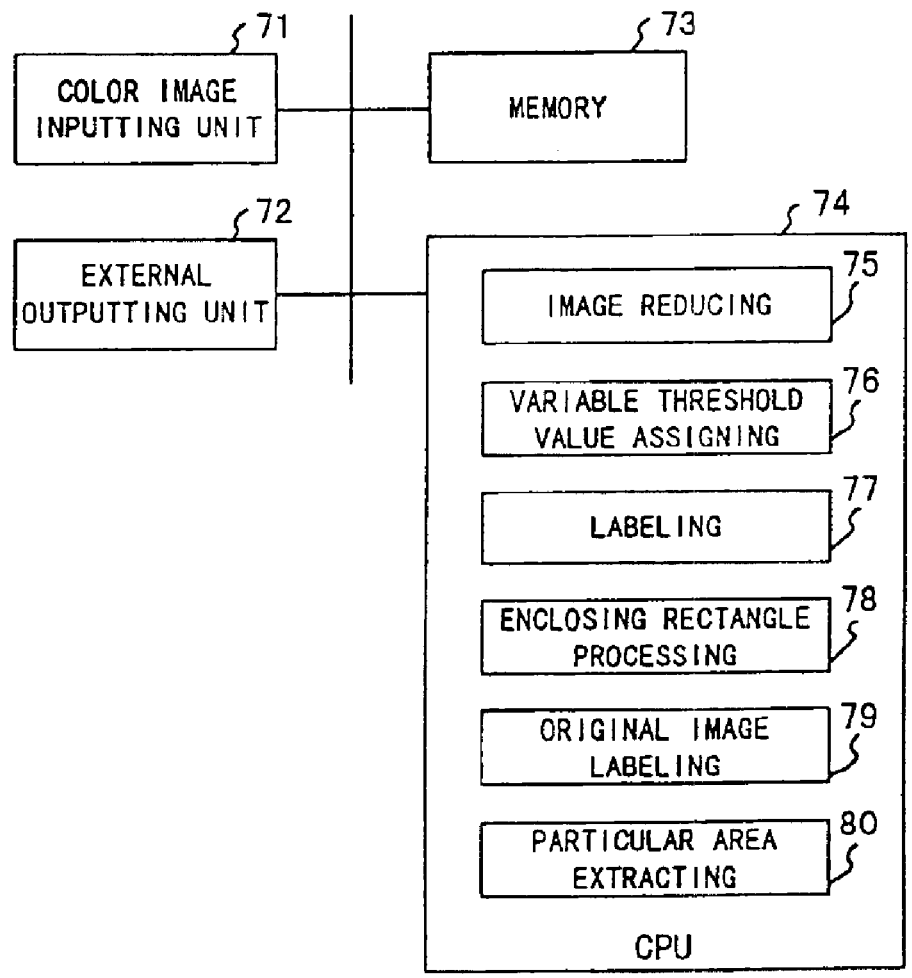
FIG. 9 is a block diagram showing the structure of a pattern extracting apparatus according to a sixth embodiment of the present invention.

FIG. 9 is a block diagram showing the structure of a pattern extracting apparatus according to a sixth embodiment of the present invention.

In FIG. 9, the pattern extracting apparatus comprises a color image inputting unit 71, an external outputting unit 72, a memory 73, and a central processing unit 74.

The color image inputting unit 71 inputs an external color image as an RGB signal. Examples of the color image inputting unit 71 are a CCD camera or a scanner.

The external outputting unit 72 outputs various results processed by the central processing unit 74. An example of the external outputting unit 72 is a display unit.

The memory 73 stores image information and threshold value information. For example, the memory 73 stores a color image signal that is input from the color image inputting unit 71 and results that are processed by the central processing unit 74 for a stored color image signal.

The central processing unit 74 generates a reduced image corresponding to a color image signal that is input from the color image inputting unit 71 and performs various processes such as a labeling process and a particular area extracting process. The central processing unit 74 comprises an image reducing unit 75, a variable threshold value assigning unit 76, a labeling unit 77, an enclosing rectangle process 78, an original image labeling unit 79, and a particular area extracting unit 80.

FIG. 10 is a flowchart showing the operation of the color image processing apparatus shown in FIG. 7.

In FIG. 10, an object such as a color document is input by the color image unit 71 that is a photographing unit such as a CCD camera or a scanner. The photographed color image is stored in the memory 73 (at step S1).

Figure 11A:
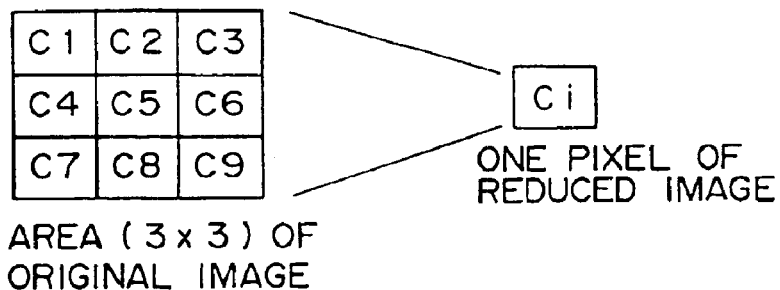
FIGS. 11A and 11B are schematic diagrams for explaining a reduced image generating method according to an embodiment of the present invention.
Figure 11B:
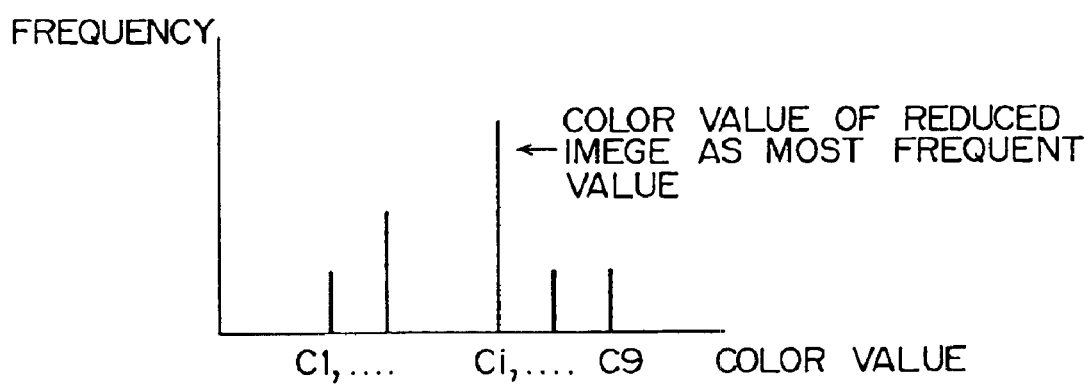

Next, the image reducing unit 75 reduces the color image stored in the memory 73 with a fixed reduction ratio or a particular reduction ratio of which the desired size of an image is obtained. The reduced image is stored in the memory 73 (at step S2). The reduction ratio is also stored. As the reducing method, as shown in FIG. 11A, when a color image is reduced 1/3 times, an area (3×3) of the original image represented by (R, G, B) is assigned to a reduced image (1×1). In this case, with (R, G, B) of colors of nine pixels of the area (3×3) of the original image, a histogram as shown in FIG. 11B is generated. The most frequent value is assigned as the value of the relevant pixel of the reduced image.

If there are a plurality of values as the most frequent value, one of the plurality of values is selected as the value of the relevant pixel of the reduced image corresponding to a predetermined algorithm.

Generally, when an area (n×n) of an original image is assigned to a reduced image (1×1) (namely, the original image is reduced 1/n times), with (R, G, B) of colors of pixels of the area (n×n) of the original image, a histogram is generated. For example, an intermediate value or the most frequency value of the histogram is used as the value of the relevant pixel of the reduced image.

A value assigned to a reduced image is not a created value such as the average value of colors of pixels of the area (n×n) of the original image, but a value of the original image.

Thereafter, the labeling unit 77 performs a labeling process for the reduced image. Namely, the labeling unit 77 assigns the same label to adjacent pixels with similar colors of the reduced image (at step S3). In other words, the labeling unit 77 raster-scans the reduced image from the upper left position and assigns a non-labeled pixel a label value of the maximum label value plus 1.

For example, as shown in FIG. 12A, assuming that a color value of a considered pixel C is (Rc, Gc, Bc), that eight adjacent pixels of the considered pixels C are denoted by 1 to 8, and that color values of the eight adjacent pixels are denoted by (Ri, Gi, Bi) (where i=1 to 8), the color values (Ri, Gi, Bi) of these pixels are obtained. In other words, the color values (R1, G1, B1), (R2, G2, B2), . . . (R8, G8, B8) of the pixels 1, 2, . . . 8 are obtained.

The distances dci (where i=1 to 8) between the color value (Rc, Gc, Bc) of the considered pixel and the color value (Ri, Gi, Bi) of each of the eight adjacent pixels are obtained. When the distance dci is smaller than a threshold value (Rth, Gth, Bth) with respect to R, G, B, the relevant pixel is assigned the same label as the considered pixel. For example, when the distance dc1 between the pixel 1 and the considered pixel C is obtained, it is determined whether or not R, G, B of the pixel 1 are smaller than Rth, Gth, and Bth, respectively. When the value of the three colors is smaller than the threshold value of the three colors (namely, the color of the pixel 1 is similar to the color of the considered pixel C), a small value is assigned to the distance dci so as to assign the same level as C to the pixel i. However, when at least one of three colors of the pixel 1 is larger than the threshold value of the three colors, a large value (larger than the threshold value th) is assigned to the distance dc1 so as to assign a label different from the considered pixel C. The distance dc1 is obtained as follows.

$$dc1 = |Rc-R1| < Rth$$

$$\text{and } |Gc-G1| < Gth$$

$$\text{and } |Bc-B1| < Bth \tag{1}$$

When the formula (1) is satisfied, the same label is assigned as dc1=0. When the formula (1) is not satisfied, a value larger than the threshold value is assigned as dc1=1000. Generally, as shown in FIG. 12B, the distances dci (where i=1 to 8) can be represented by the following formula.

$$0 \text{ if } |Rc-Ri| < Rth \text{ and}$$

$$|Gc-Gi| < Gth \text{and}$$

$$|Bc-Bi| < Bth$$

$$1000 \text{ otherwise}$$

Note that the assigned value is not limited to 1000. Instead, any value larger than the threshold value can be used.

The threshold value (Rth, Gth, Bth) of three colors are obtained from a table that has been obtained from samples that depend on both an inputting unit (such as a CCD camera or a scanner) and an object. In addition, with a key of the color value (R, G, B) of the considered pixel, the threshold value is pre-assigned corresponding thereto.

For example, as shown in FIG. 13A, with reference to a table having entries of all combinations of color values (R, G, B) of predictable considered pixels of input images, a threshold value (Rth, Gth, Bth) of three colors is obtained. In the table shown in FIG. 13A, when the color value of a considered pixel is (R1, G1, B1), the threshold value of G, G, B is (Rth1, Gth1, Bth1). When the color value of a considered pixel is (R2, G2, B2), the threshold value thereof is (Rth2, Gth2, Bth2).

In the case shown in FIG. 13A, a threshold value reference table is used. The threshold value reference table has key entries of combinations of all color values of a considered pixel predicted from a distribution of a sample. With a combination of the color of the considered pixel, the threshold value reference table is referenced. Thus, the size of the table depends on the number of combinations of individual colors. In other words, the size of the table becomes very large.

To prevent the threshold value reference table from becoming large, a table having only representative entries clustered with (R, G, B) can be used. In this case, the distance value between the color value (R, G, B) of a considered pixel and color value of a representative entry is obtained (in other words, the similarity between the considered pixel and the representative entry is obtained). The closest representative entry is extracted. With a key of the closest representative entry, the threshold value (Rth, Gth, Bth) of three colors can be obtained.

Alternatively, to prevent the threshold value reference table from becoming large, values of individual colors are represented in N levels (for example, N=256). Threshold value reference tables are prepared for individual colors. Threshold values for individual colors are obtained from respective threshold value reference tables. In this case, the size of the threshold value reference tables becomes as small as 256×3 entries. For example, when the color value of a considered pixel is (R1, G2, B2), as shown in FIG. 13B, as a threshold value for R1, a threshold value table R is referenced and thereby Rth1 is obtained. As a threshold value for G2, a threshold value table G is referenced and thereby Gth2 is obtained. As a threshold value for B2, a threshold value table B is referenced and thereby Bth2 is obtained.

As a format of a threshold value reference table for obtaining a threshold value, as shown in FIG. 14, color values are categorized as a plurality of groups and threshold values are obtained for each group unlike with all combinations of (R, G, B) shown in FIG. 13A. In FIG. 14, one threshold value is assigned every four values of each color. R1 to R4 are assigned the same threshold value Rt1. R5 to R8 are assigned the same threshold value Rt2. Likewise, G1 to G4 are assigned the same threshold value Gt1. BN−3 to BN are assigned the same threshold value BtM.

When an object is a printed document and input by a scanner, such a threshold value reference table can be automatically generated with a model of the printed document.

Next, the enclosing rectangle processing unit 78 performs an enclosing rectangle processing process for the labeled reduced image (namely, the label image) (at step S4). In other words, at step S3, as the results of the labeling process for the reduced image, the same area is assigned the same label value. For the same area, an enclosing rectangle is obtained.

Figure 15A:
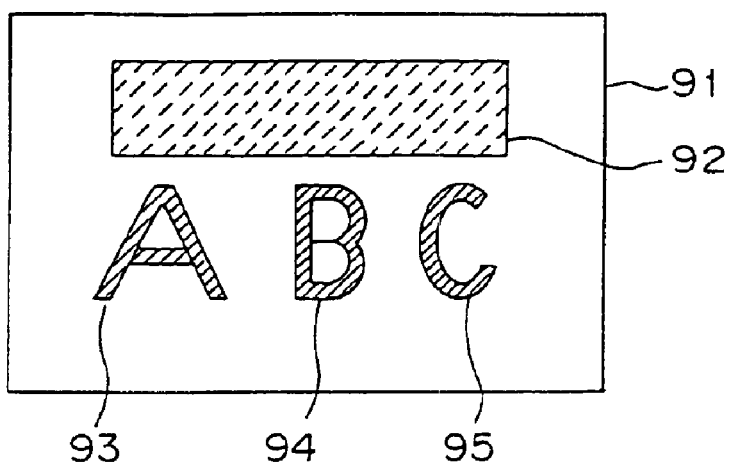
FIGS. 15A, 15B, and 15C are schematic diagrams for explaining an enclosing rectangle generating process and an original image label assigning process according to an embodiment of the present invention.
Figure 15B:
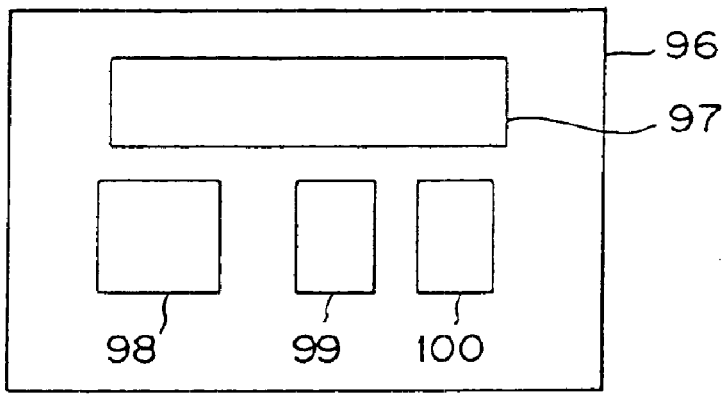

For example, as shown in FIG. 15A, when a color image 91 with character areas 93 to. 95 and another area 92 (the color of the character areas 93 to 95 is different from the color of the area 92), a reduced label image 96 as shown in FIG. 15B is generated. Thus, enclosing rectangles 98 to 100 can be obtained with the reduced label image 96.

In FIG. 15B, the rectangle area 97 corresponds to the background area 92 shown in FIG. 15A. The rectangle areas 98 to 100 correspond to the character areas 93 to 95 shown in FIG. 15A, respectively.

In the label image, pixels recorded with the same labels are scanned. All the colors of the pixels are recorded as attribute information of individual enclosing rectangles. One representative color of each label is obtained from all the pixels recorded with the same labels in the label image. The representative color can be obtained in the following manner. The frequency distribution of each color is obtained. A color with the highest frequency is treated as the representative color. The representative color information is recorded as attribute information of the relevant enclosing rectangle.

The labeling unit 77 generates the following output information as results of the labeling process.

As the label image that is two-byte information per pixel, the height, width, and reduction ratio of the reduced image area are represented. In addition, the number of rectangles (nr) in the reduced image area and rectangle information are represented. As the rectangle information, the number of rectangles (nr) in the area, a rectangle number, a label number of a label image in the rectangle, rectangle upper left coordinates (x1, y1), rectangle lower right coordinates (x2, y2), the representative color (Rs, Gs, Bs) in the rectangle, the number of colors (nc), colors (R0, G0, B0), (R1, G1, B1), . . . (Rn−1, Gn−1, Bn−1) are output.

The original image labeling unit 79 receives the output information, divides the upper left coordinate value and the lower right coordinate value of the rectangle information by the reduction ratio, and obtains the relevant coordinates in the original image. When the reduction ratio is 1/n, the upper left coordinates and the lower right coordinates of the rectangle of the original image are (x1*n, y1*n) and {(x2*n)−1, (y2*n)−1}, respectively (where * represents a multiplication and "−1" is subtracted from each of the x axis and the y axis of the lower right coordinates).

The original image labeling unit 79 raster-scans the inside of the rectangle represented by the coordinates and searches a non-labeled pixel with a color similar to the representative color (Rs, Gs, Bs). When the color of a particular pixel is similar to the representative color, the following conditions are satisfied.

$|Rs-Ri|<Rth$ and $|Gs-Gi|<Gth$ and $|Bs-Bi|<Bth$

In this case, the threshold value Rth, Gth, and Bth is fixed.

When the original image labeling unit 79 detects a pixel that satisfies the above-described conditions, it assigns the pixel a label value of the maximum label value plus 1.

Thereafter, the original image labeling unit 79 scans eight pixels adjacent to the considered pixel and obtains the color value (Ri, Gi, Bi) of each of the adjacent pixels. When the color value (Ri, Gi, Bi) of each adjacent pixel and the color value (Rc, Gc, Bc) of the considered pixel satisfy the following conditions, the original image labeling unit 79 assign the relevant pixel the same label as the considered pixel (at step S5).

$|Rc-Ri|<Rth$ and $|Gc-Gi|<Gth$ and $|Bc-Bi|<Bth$

When the original image labeling unit 79 does not assign the relevant pixel the same label, it compares the color of the relevant pixel with all colors as the attribute information of the considered rectangle and obtains the distance thereof. When the distance is smaller than the threshold value, the original image labeling unit 79 assigns the relevant pixel the same label as the considered pixel.

Figure 15C:
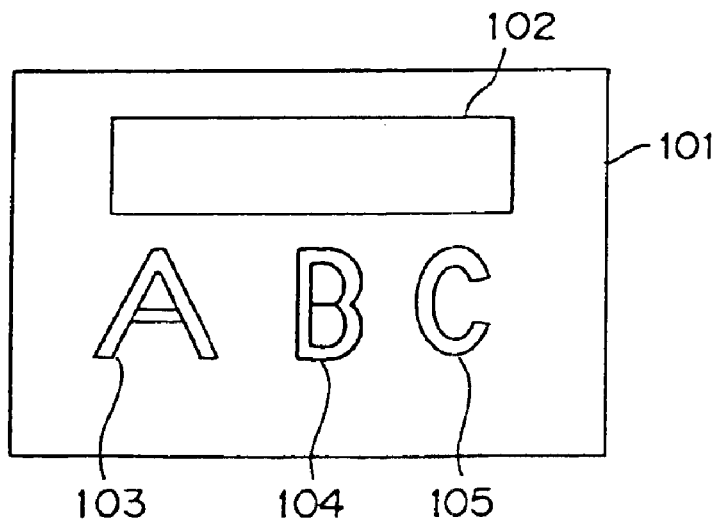

In such a manner, as shown in FIG. 15C, the original image labeling unit 79 assigns labels to pixels with colors similar to the representative colors in the rectangles 97 to 100 and extracts areas 102 to 105 with the same color value as the rectangle areas 97 to 100. In a real color document, when an image area is not coarse unlike with the case shown in FIG. 15A (namely, the image area has a background and color characters with various sizes), the same label area becomes complicated unlike with the case shown in FIG. 15C.

The particular area extracting unit 80 extracts a particular area from the label area 101 obtained from the original image (at step S6). When a character area that is a keyword such as a headline or a title is extracted from a color document, the particular area extracting unit 80 can extract a relevant character string area corresponding to a conventional character string extracting method using given information of the size and arrangement of an enclosing rectangle.

For example, the particular area extracting unit 80 obtains the relation of adjacent rectangles with the extracted rectangle information and extracts adjacent rectangles whose coordinate values are close to each other (namely, the difference between the coordinate values is smaller than the threshold value) and whose color difference of (R, G, B) is smaller than the threshold value as a character string. The external outputting unit 72 displays the extracted character string.

When one object is extracted from a color scenery image, the representative colors of adjacent areas of the label image are converted into information of such as HSV (Hue, Saturation, Visibility). Areas with similar hues are combined. Thus, separated areas due to a shadow can be combined to one area. An area with a particular size can be output as an alternative area of an object.

Thus, according to the sixth embodiment of the present invention, areas with similar colors are obtained from a reduced image. The obtained areas are precisely extracted from the original image. Consequently, the process time can be remarkably reduced. In addition, only adjacent pixels are labeled with a threshold value corresponding to colors of the pixels. Consequently, pixels can be locally and precisely color-clustered. Thus, even if the color of an area to be extracted is similar to the color of a background thereof, they can be distinguished. Thus, an area can be accurately extracted.

When a threshold value corresponding to the color of a considered pixel is obtained, a table with a key of three color elements of a considered pixel is referenced. Thus, the number of calculations for obtaining the threshold value is decreased.

When a threshold value corresponding to the color of a considered pixel is obtained, the similarity of the distance between three color elements of the considered pixel and three color elements of a particular color of an entry of the table is obtained. With an entry most similar to the color of the considered pixel, the threshold value of the entry of the table is obtained. Thus, the size of the table that stores the threshold values can be decreased.

In addition, a threshold value of three color elements is obtained from a table that stores a distribution of a sample that depends on both an inputting unit such as a CCD camera or a scanner and an object. Thus, since the table stores a threshold value that depends on an inputting unit, an input image is accurately labeled.

Next, a method for assigning a threshold value in the labeling process according to an embodiment of the present invention will be described.

Color documents are printed in various printing methods such as gravure printing method. However, most color documents are printed in halftone printing method. When a document printed by the halftone printing method is enlarged, a color moire pattern takes place in an area seen as an equal color by the naked eye.

FIGS. 16A and 16B are schematic diagrams showing a color moire pattern that takes place in a document printed by the halftone printing method.

In FIG. 16A, an area "の" ("no" in Japanese) of an original image 111 is printed with a single color of orange. However, as shown in FIG. 16B, when a part of the area "の" is enlarged, it is clear that the area is composed of various colors.

Thus, when the color difference (the luminance difference of RGB) of adjacent pixels is compared with a fixed threshold value and it is determined whether or not these pixels are assigned the same label, a particular area may not be extracted. For example, pixels 112 to 115 in the area "の" shown in FIG. 16B are assigned a label different from labels of the other pixels. Thus, when a character "の" is extracted from the original image 111, since the pixels 112 to 114 are dropped, the extracting accuracy deteriorates.

With a print model, the average luminance value of RGB and the luminance difference of RGB of adjacent pixels for the read resolution of each scanner are obtained and stored in a color difference table. With reference to the color difference table, the threshold value of each color is controlled so as to perform the labeling process.

For example, when the color difference between the pixels 114 and 115 in the area "の" is the maximum, the color difference thereof is assigned for a threshold value for extracting an area in orange. Thus, when the character "の" is extracted from the original image 111, the pixels 112 to 114 can be assigned the same label as other pixels in the area "の". Consequently, the pixels 112 to 114 can be prevented from being dropped.

Next, a method for creating a color difference table that stores the average value of colors, color differences of adjacent pixels, and read resolutions of scanners will be described. The color difference table is created with color print models and scanner read models according to an embodiment of the present invention.

Figure 17:
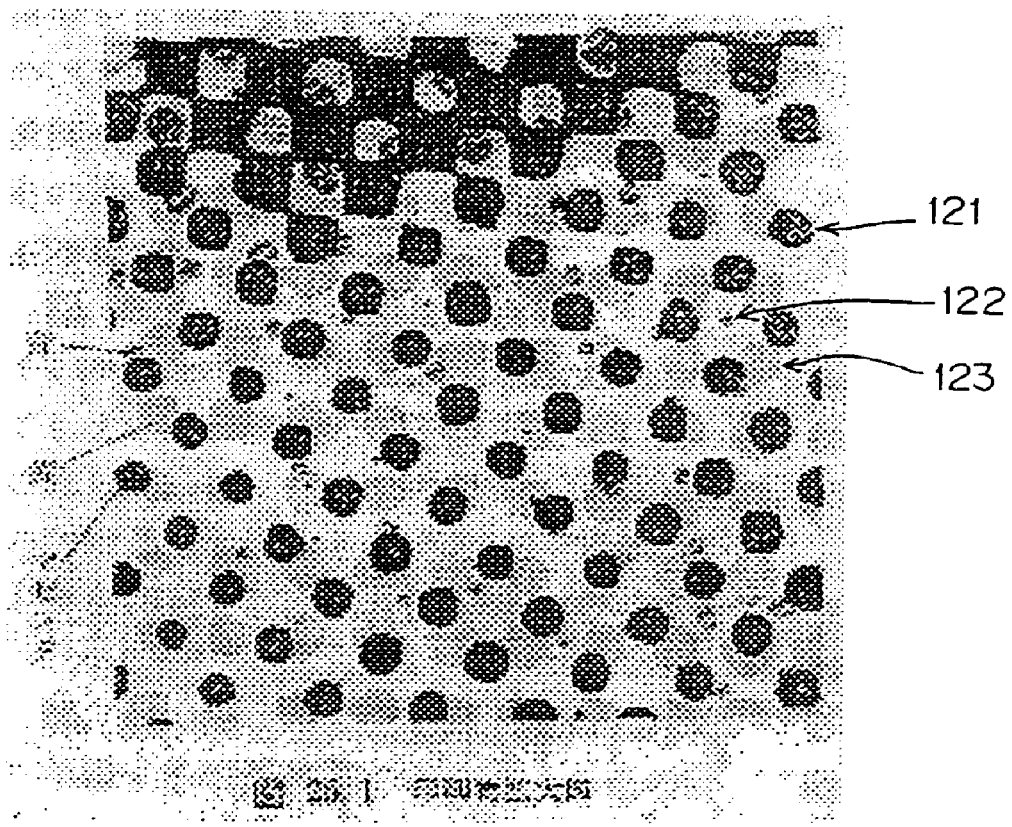
FIG. 17 is an enlarged view showing a color image in the halftone printing method.
Figure 19A:
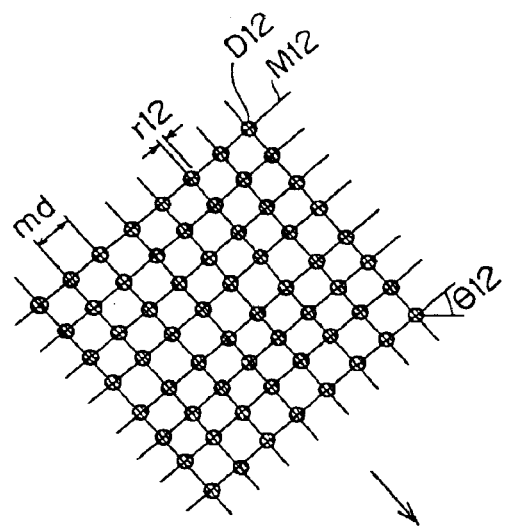
FIGS. 19A to 19D are schematic diagrams showing a print model generating method according to an embodiment of the present invention.
Figure 19B:
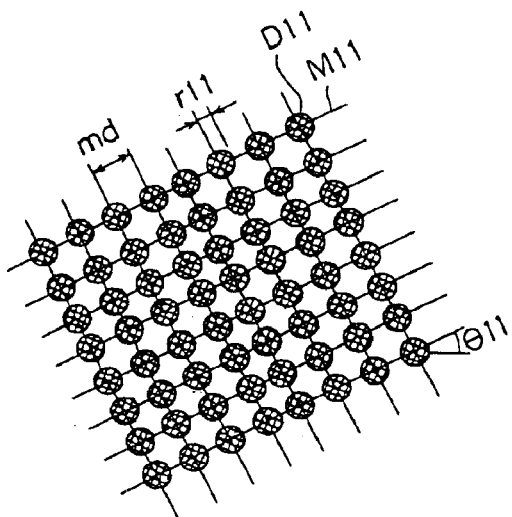
Figure 19C:
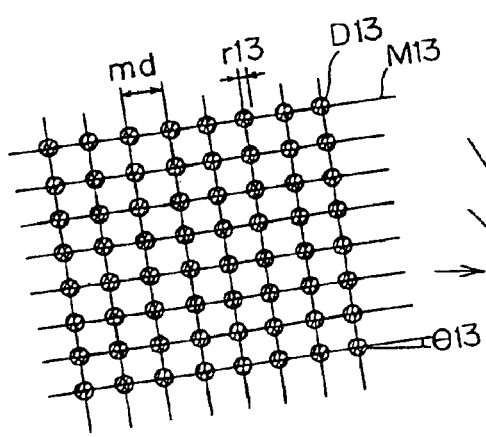
Figure 19D:
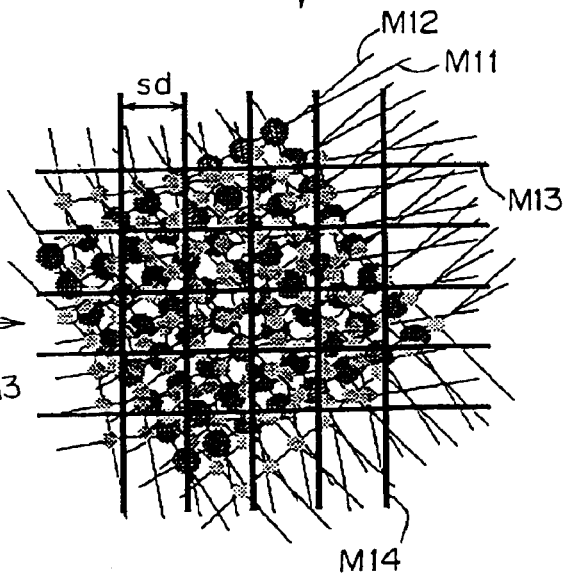

FIG. 17 is an enlarged view showing a document printed by the color halftone printing method.

In FIG. 17, in the halftone printing method, cyan (sky blue), magenta (purple), and yellow dots 121 to 123 whose sizes vary at each position are regularly arranged in a mesh pattern.

In the halftone printing method, colored circles of the first color of three primary colors (or four colors including black) are printed at predetermined mesh intervals so that a desired concentration is obtained. Next, with a rotated mesh, colored circles of the second color are printed with a different size at the same mesh intervals as those of the first color. Thereafter, with another rotated mesh, colored circles of the third color are printed with a different size at the same mesh intervals as those of the first color. In this printing method, the printed circles can be seen as an equal color by the naked eye.

FIGS. 18A, 18B, and 18C are schematic diagrams for explaining the reason why luminance values of individual pixels are different from each other in the case that one color is printed with one mesh point by the halftone printing method.

In FIG. 18A, when one color is printed by the halftone printing method, colored circles D1 with a radius r1 are printed at mesh points of a print mesh M1. When a print color is changed in the halftone printing method, the radius r1 of the colored circles D1 is changed. Thus, in areas of which another color is printed by the halftone printing method, the colored circles D1 with the radius r1 are dispersedly disposed.

When a printed document shown in FIG. 18A is read by a scanner or the like, an image of the printed document is read with a fixed resolution of the scanner or the like. Thus, as shown in FIG. 18B, the colored circles D1 are read as pixels sectioned by a read mesh M2 corresponding to the resolution of the scanner or the like. Since the colored circles D1 are dispersedly disposed, the areas of the colored circles D1 included in the pixels sectioned with the read mesh M2 are not equal. Thus, as shown in FIG. 18C, the luminance of a considered pixel at the center of the mesh M2 is different from the average luminance of eight pixels P1 to P8 adjacent to the considered pixel.

On the other hand, when areas with the same color are extracted from the printed document shown in FIG. 18A, since the document showing in FIG. 18A is printed with one color by the halftone printing method, the eight pixels P1 to P8 adjacent to the considered pixel should be extracted as pixels with the same color as the considered pixel. Thus, the luminance difference between the considered pixel and each of the pixels P1 to P8 is obtained and the maximum value of the luminance difference (in the example shown in FIG. 18C, the luminance difference between the considered pixel and the pixel P4) is recorded. When areas with the same color are extracted from an input image, the maximum value of the luminance difference between the considered pixel and each of pixels adjacent thereof is used as a threshold value. Adjacent pixels with luminance differences that is not larger than the threshold value are extracted as pixels with the same color as the considered pixel.

Next, a method for structuring a scanner read model that precisely corresponds to the halftone printing method will be described.

FIGS. 19A, 19B, 19C, and 19D are schematic diagrams showing a scanner read model corresponding to the halftone printing method.

In FIGS. 19A, 19B, 19C, and 19D, print meshes M11, M12, and M13 for cyan, magenta, and yellow are rotated and combined as a print model. To adjust the concentrations of cyan, magenta, and yellow, the sizes of colored circles D12, D12, and D13 at mesh points of the print meshes M12, M12, and M13 are adjusted.

At this point, parameters of a scanner read model are as follows.

Mesh distance md of print meshes M11, M12, and M13 (however, the mesh distance md is in common with yellow, cyan, and magenta)

Angle θ11 to horizontal line of yellow mesh M11

Angle θ12 to horizontal line of magenta mesh M12

Angle θ13 to horizontal line of cyan mesh M13

Radius r11 of colored circle D11 of yellow

Radius r12 of colored circle D12 of magenta

Radius r13 of colored circle D13 of cyan

However, in this embodiment, to avoid complicity, parameters are assigned the following values, not variables.

Angle θ11 to horizontal line of yellow mesh M11=15 degrees

Angle θ12 to horizontal line of magenta mesh M12=30 degrees

Angle θ13 to horizontal line of cyan mesh M13=45 degrees

Mesh distance md=20 dots

With the print model, the average RGB value (Rm, Gm, Bm) that is affected by the radiuses r11, r12, and r13 of the colored circles D11, D12, and D13 of yellow, magenta, and cyan is simulated. In reality, a unit area that is much larger than the mesh distance md of the print meshes M11, M12, and M13 is considered as follows.

$Rm$=255−area of cyan in unit area×255/unit area $Gm$=255−area of magenta in unit area×255/unit area $Bm$=255−area of yellow in unit area×255/unit area Next, a scanner read model of which an image equally printed in one color (Rm, Gm, Bm) is read by a scanner will be described. In this model, a read mesh M14 with a distance sd that is different from the mesh distance of the print meshes M11, M12, and M13 is introduced. Luminance of RGB in the read mesh M4 (namely, areas of individual colors) is obtained.

In this case, the distance sd of the read mesh M14 is equivalent to the read resolution of the scanner. When an image with an average color (Gm, Gm, Bm) is read, if the read resolution of the scanner is high, the luminance values of RGB of adjacent pixels largely vary. In contrast, when the read resolution of the scanner is low, the colors of read pixels are close to the average color (Rm, Gm, Bm). The luminance difference of RGB of the adjacent pixels approaches to 0.

The luminance value of RGB (Rc, Gc, Bc) in the read mesh M14 is as follows.

$Rc$=255−area of cyan in area of read mesh×255/area of read mesh $Gc$=255−area of magenta in area of read mesh×255/area of read mesh $Bc$=255−area of yellow in area of read mesh×255/area of read mesh The luminance value of RGB (Rc, Gc, Bc) of the read mesh M14 with the mesh distance sd is obtained. The luminance difference between the luminance value (Rc, Gc, Bc) and the luminance value of each of adjacent pixels is obtained. A proper value (for example, the maximum value) is recorded to a color difference table.

In a print model, colored circles at mesh points overlap for each color of RGB. Thus, these colored circles mutually affect each other corresponding to the luminance value of RGB. Consequently, strictly speaking, it cannot be said that the print model is independent in RGB. However, in the scanner read model, for simplicity, it is supposed that the model is independent in RGB.

Thus, RGB luminance value, read resolution, and luminance difference between a considered pixel and each of adjacent pixels are stored in tables that are independent in RGB.

FIG. 20 is a table showing an example of a table for R.

In FIG. 20, the maximum value of luminance differences to adjacent pixels is listed corresponding to R luminance values (0 to 255) and scanner read resolutions (14 to 35). In the table shown in FIG. 20, R luminance values are recorded at intervals of three. Any R luminance value in the range from 0 to 255 can be obtained by an interpolating process.

The table for R shown in FIG. 20 applies to tables for G and B.

When a print model corresponding to the halftone printing method is created, colors created in the halftone printing method can be reproduced by a computer. Thus, without need to analyze a document printed in the halftone printing method, tables for RGB can be created.

Referencing the tables for RGB, a threshold value necessary for detecting the range of the same color can be obtained with an input image.

FIG. 21 is a block diagram showing the structure of a color difference table generating apparatus according to an embodiment of the present invention.

In FIG. 21, the color difference table generating apparatus comprises a color image inputting unit 111, an external outputting unit 112, a memory 113, and a central processing unit (CPU) 114. The central processing unit 114 has a print model generating unit 115 and a color difference table generating unit 116. The print model generating unit 115 generates a print model in the method shown in FIG. 19 and reproduces colors generated in the halftone printing method on a computer. The color difference table generating unit 116 generates a scanner read model with a print model corresponding to the halftone printing method and generates color difference tables for individual colors of RGB as shown in FIG. 20.

Figure 22:
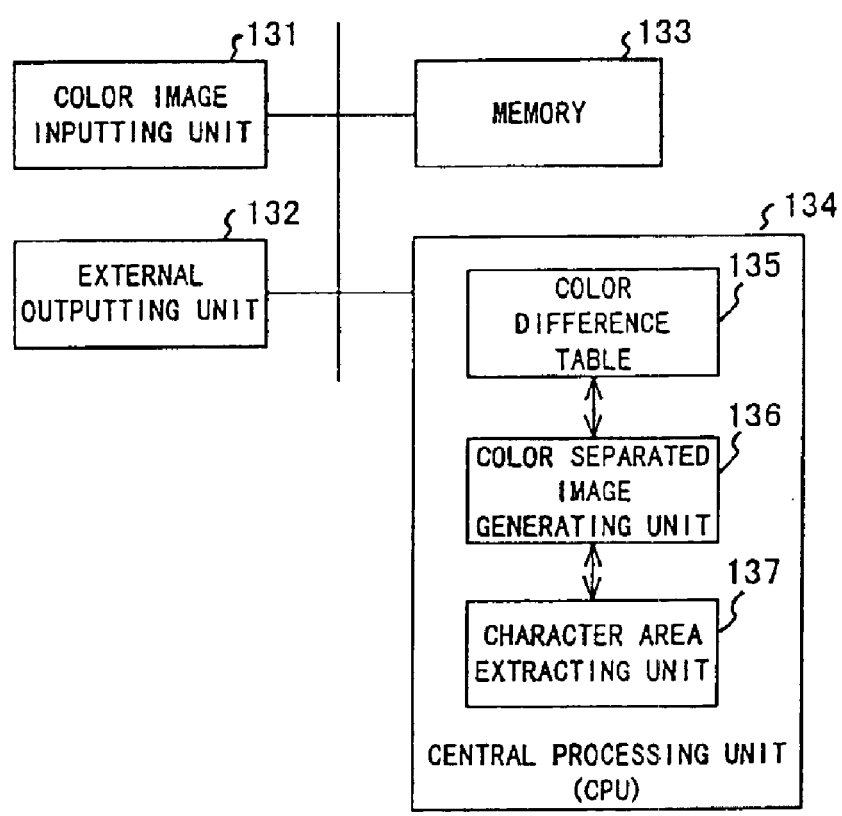
FIG. 22 is a block diagram showing the structure of a pattern extracting apparatus according to a seventh embodiment of the present invention.

FIG. 22 is a block diagram showing the structure of a pattern extracting apparatus according to a seventh embodiment of the present invention.

In FIG. 22, the pattern extracting apparatus according to the seventh embodiment comprises a color image inputting unit 131, an external outputting unit 132, a memory 133, and a central processing unit (CPU) 134. The central processing unit 134 has a color difference table 135, a color separated image generating unit 136, and a character area extracting unit 137.

The color difference table 135 is a table shown in FIG. 20. The color difference table 135 stores luminance values, read resolutions, and luminance differences of adjacent pixels of each color of RGB.

The color separated image generating unit 136 searches the color difference table corresponding to the read resolution and RGB luminance value of an input image and obtains luminance differences of adjacent pixels corresponding to the read resolution and RGB luminance value of the input image. The luminance differences of the adjacent pixels are used as a threshold value for labeling the adjacent pixels. When the read resolution and RGB luminance value of the input image vary, with reference to the color table 135, the threshold value for labeling the adjacent pixels is updated.

With key information of the color (R, G, B) of a considered pixel, the color difference table 135 is searched for a threshold value of luminance differences of adjacent pixels treated as the same color. The obtained threshold value is applied to the adjacent pixels of the considered pixel. When the luminance difference between each adjacent pixel and the considered pixel for each color of RGB is not larger than the threshold value, the same label is assigned to the considered pixel and the adjacent pixels.

In the labeling process, only pixels adjacent to a considered pixel are processed. In addition, pixels are assigned labels with threshold values corresponding to colors of the pixels. Thus, an input image can be locally and precisely color-clustered. Consequently, a label image free from holes and unsmooth contour can be generated.

In addition, a character area with an equal color can be extracted quickly and accurately from a color document image.

From an image that has a background and an object whose colors are locally similar and that has an area whose color is similar to the color of another area, areas whose colors are locally and accurately the same can be extracted.

In areas whose colors are treated as the same color, even if the color value of a pixel is slightly different from the color value of a pixel adjacent thereto, the area can be prevented from being extracted as a hole and an unsmooth contour. Thus, the area can be accurately extracted.

When a label image is generated, enclosing rectangles of patterns of an input image are generated corresponding to labels of the patterns. The enclosing rectangles are grouped corresponding to color information of areas of the enclosing rectangles and geometry information thereof.

The character area extracting unit 137 extracts a character string area from the label image obtained from the original image corresponding to the arrangement and sizes of the enclosing rectangles grouped by the color separated image generating unit 136.

When a character area as a keyword such as a headline or a title described with a large font is extracted from a color document, only the character area is extracted with information of the size and arrangement of enclosing rectangles.

Figure 23:
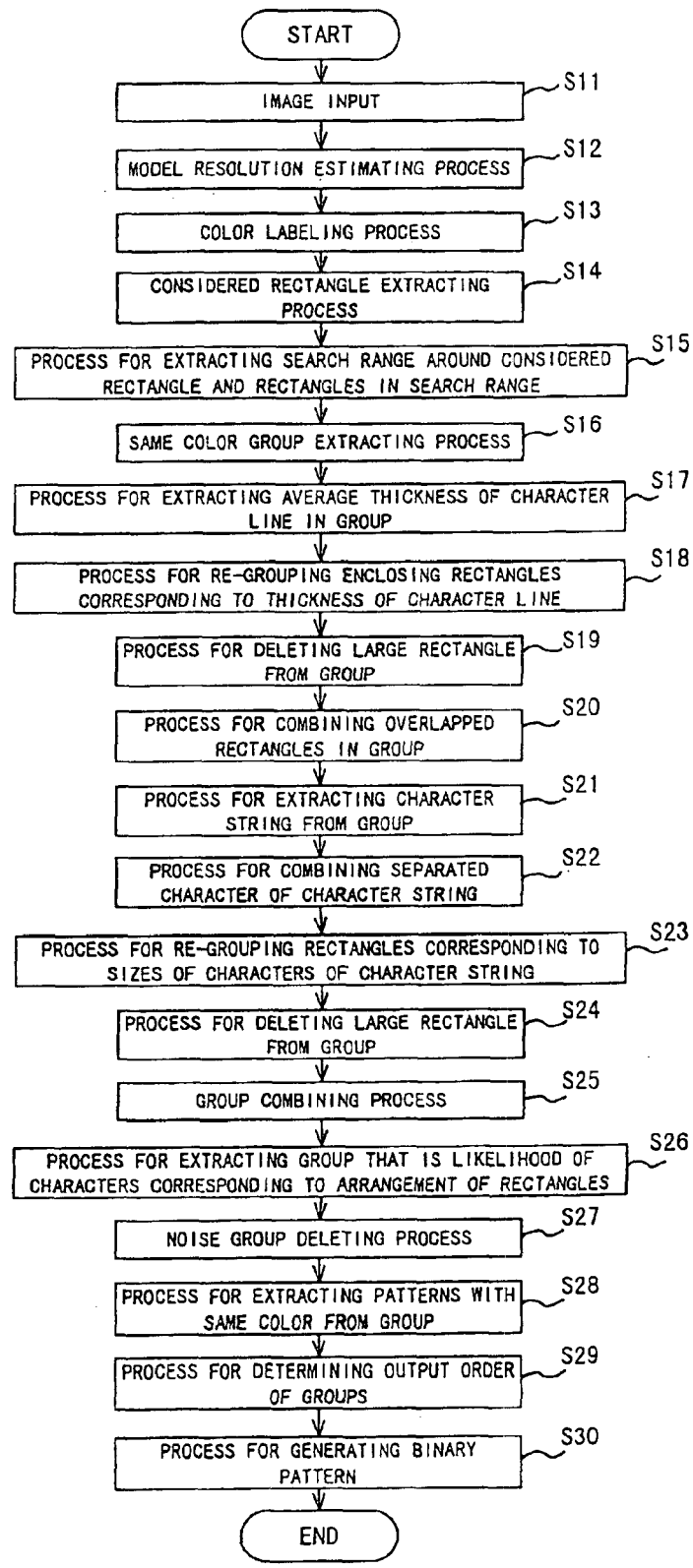
FIG. 23 is a flowchart showing the operation of the pattern extracting apparatus shown in FIG. 9.

FIG. 23 is a flowchart showing the operation of the pattern extracting apparatus shown in FIG. 22.

In FIG. 23, an image inputting process is performed (at step S11). In the image inputting process, a color image is input with a photographing unit such as a CCD camera or a scanner and stored in a memory.

Thereafter, a model resolution estimating process is performed (at step S12). In the model resolution estimating process, the average luminance value and the maximum value of the luminance difference values of adjacent pixels registered in a color difference table obtained from a print model representing a moire pattern of a color printed document and a scanner read model thereof are compared with the average luminance value and the maximum value of the luminance difference values of adjacent pixels of the input image, respectively. Thus, an optimum scanner read resolution for the entire input image is obtained.

Figure 24:
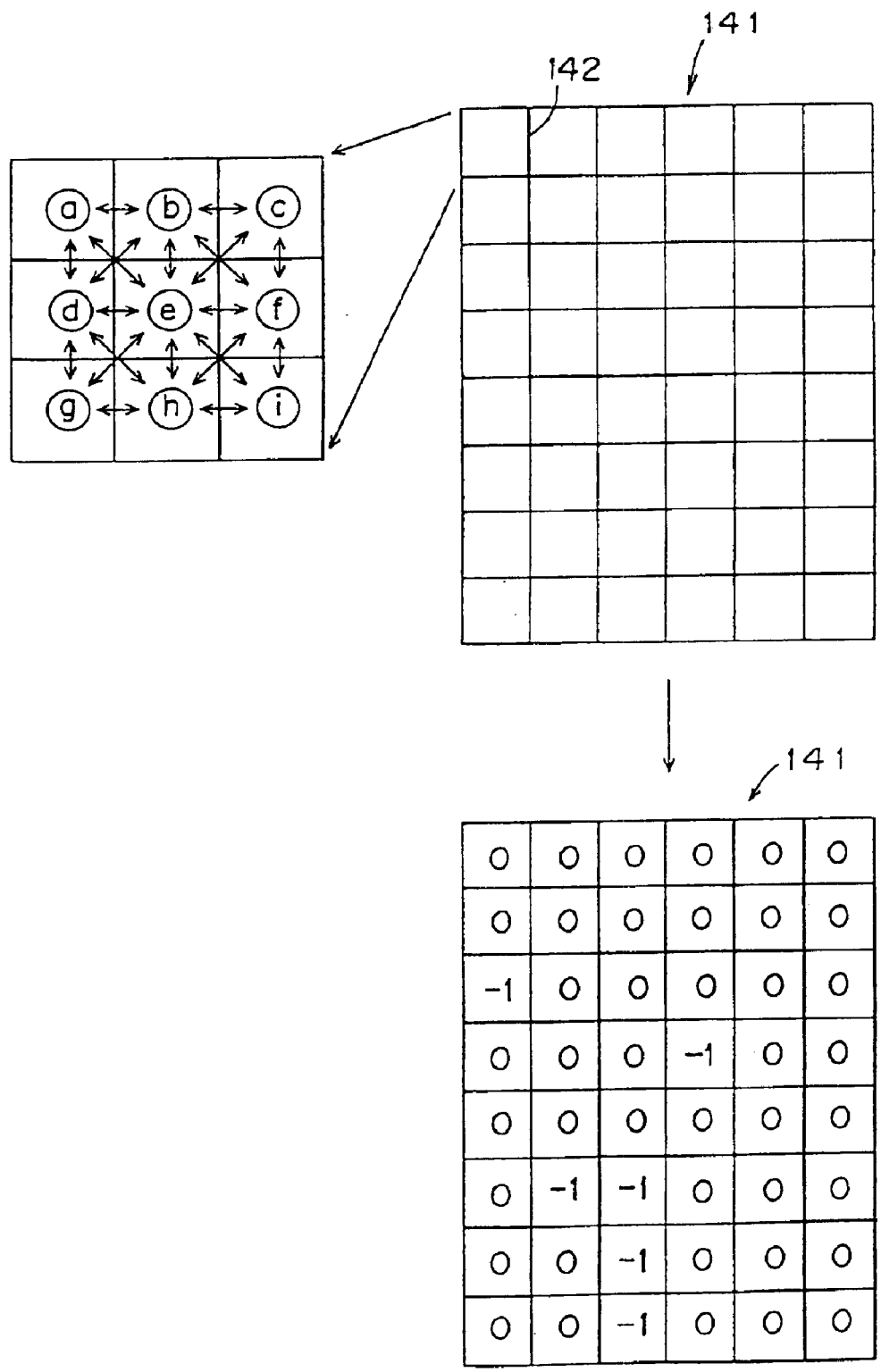
FIG. 24 is a schematic diagram for explaining a model resolution estimating process according to an embodiment of the present invention.

FIG. 24 is a schematic diagram for explaining a model resolution estimating process according to an embodiment of the present invention.

In FIG. 24, an input image 141 is divided into (3×3) pixel blocks corresponding to a mesh 142. The average RGB luminance value (Rm, Gm, Bm) of (3×3) pixels a to i and the maximum value (Rd, Gd, Bd) of luminance difference values of adjacent pixels are obtained for each block of the entire input image 141. There are 20 adjacent directions in the (3×3) pixels a to i. The luminance difference values in the 20 adjacent directions of the pixels are obtained. The maximum value (Rd, Gd, Bd) of the luminance difference values is used.

With key information of the average RGB luminance value (Rm, Gm, Bm) and the maximum value (Rd, gd, Bd) of the luminance difference values of the adjacent pixels, the color difference table is searched for a scanner read resolution value that is optimum for the average luminance value and the maximum value of the luminance difference values of the adjacent pixels registered in the color difference table. When the difference between the maximum value (Rd, Gd, Bd) of the luminance difference values of the adjacent pixels obtained from the input image 141 and the maximum value of the luminance difference values of the adjacent pixels with the scanner read resolution optimum in the color difference table is not in a predetermined range, a reject code (−1) is returned to the (3×3) pixels a to i. Otherwise, a conformity code (0) is returned.

Such a process is performed for the entire input image 141. Thus, the reject code (−1) or conformity code (0) is assigned all (3×3) pixels a to i of all the blocks of the mesh 142. For pixels assigned the conformity code (0) in the (3×3) pixels a to i, the average value of the scanner read resolutions thereof is obtained. The average value is treated as the scanner read resolution of the input image 141.

Next, a process for R will be exemplified.

The resolution value of the table for R is fixed to a particular value. R luminance values of the table for R are scanned for an R luminance value $Ri$ that satisfies $Ri \leq Rm < Ri+1$ (where Rm is the average luminance value). At this point, assuming that the maximum value of the luminance values of adjacent pixels against the R luminance value Ri is Rdi and that the maximum value of the luminance values of the adjacent pixel against the R luminance value Ri+1 is Rdi+1, the average luminance value Rm is obtained by linearly interpolating the R luminance value Ri and the R luminance value Ri+1. The relation is applied to the maximum value of luminance values of the adjacent pixels so as to obtain the maximum value infered_delta of luminance values against estimated adjacent pixels. In other words, the following relation is satisfied.

rl=Ri−Ri rm=Rm−Ri rn=Ri+1−Rm infered_delta=Rri*rn/rl+Rri+1*rm/rl

The difference delta_r between the estimated maximum value infered_delta of the luminance values against the adjacent pixels and the maximum value Rd of the luminance values obtained from the image is obtained as follows.

delta_r=|Rd−infered_delta|

The same process is performed for G and B so as to obtain delta_g and delta_b. The sum delta is obtained as follows.

delta=delta_r+delta_g+delta_b

The resolution parameters are scanned so as to obtain a resolution resol with the minimum delta value and a delta value delta_min. When the value delta_min satisfies the following condition:

delta_min>TH_SUB (where TH_SUB is a fixed threshold value), it is determined that the relevant (3×3) block does not conform with the model. Thus, the reject code (−1) is returned. Otherwise, the conformity code (0) is returned. For only blocks assigned the conformity code, the average value of the resolution values resol thereof is obtained as resolution of the input image.

resolution=(Σ resol of blocks assigned conformity code)/number of blocks assigned conformity code The term "resolution" used in the description represents a read resolution in the case that an input image is applied to a prepared model rather than a read resolution of an input image that is read by a scanner.

Thereafter, a color labeling process is performed (at step S13). In the color labeling process, adjacent pixels with similar colors are assigned the same label. Enclosing rectangles that are connected areas with the same labels as the label image are obtained. As information of enclosing rectangles, the coordinate values of the enclosing rectangles, the average color (R, G, B) of the connected areas of the enclosing rectangles, the label numbers of the connected areas of the enclosing rectangles, and the area of the connected areas (the number of pixels of the connected areas) are stored.

In reality, the input image is scanned from the upper left position. A non-labeled pixel is considered. With the RGB luminance value and the estimated resolution of the pixel, the color difference table is searched for the maximum value of luminance values to adjacent pixels for each of RGB. The maximum value is treated as a threshold value for labeling a considered pixel.

In the labeling process, for an area with the same label expanded from one pixel, whenever one pixel is added, the average color (R, G, B) in the label area is obtained. It is determined whether or not the same label as the label area is assigned to an adjacent pixel in the label area. When the color of the adjacent pixel to be newly labeled is different from the average color of the label area that has been labeled by the threshold value or more, even if the color difference of the adjacent pixel is not larger than the threshold the adjacent pixel to be newly labeled is assigned a label different from the label area that has been labeled. Thus, even if the color of the boundary of the character area and the background area gradually varies, the character area can be correctly extracted.

Figure 25:
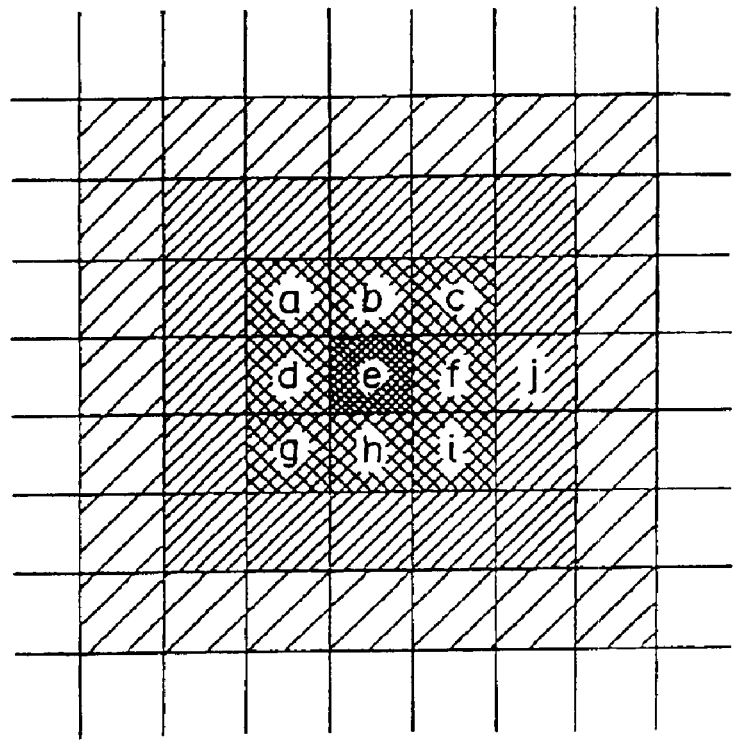
FIG. 25 is a schematic diagram for explaining a color labeling process according to an embodiment of the present invention.

FIG. 25 is a schematic diagram for explaining a color labeling process according to an embodiment of the present invention.

In FIG. 25, it is assumed that the color of a pixel e is black and that colors of pixels that are apart from the pixel e vary from black to red. When the color difference between the pixel e and adjacent pixels a to i except for e is the threshold value or less, the pixels e and the adjacent pixels a to i (other than e) are assigned the same label.

When the pixel j is assigned a label, it is determined whether or not the color difference between the pixels f and j is the threshold value or less and whether or not the color difference between the average value of the colors of the pixels a to i and the color of the pixel j is the threshold value or less. Even if the color difference between the pixel f and the pixel j is the threshold value or less, when the color difference between the average value of the colors of the pixels a to i and the color of the pixel j exceeds the threshold value, the pixel j is assigned a label different from the label of the pixel f.

When colors of pixels that are apart from the pixel e gradually vary from the color of the pixel e, although the color of the pixel j is similar to the color of the pixel f, the color difference between the pixels j and e is remarkable. Thus, when the average value of the colors of the pixels a to i that have been assigned a label is compared with the color of the pixel j, the average value of the colors of the pixels a to i is affected by the color of the pixel e. Thus, this color difference is larger than the color difference between the pixels f and j.

Thus, even if colors gradually vary, a boundary can be formed between the pixels f and j. Consequently, a black area and a red area can be prevented from being assigned the same label.

Next, a real method for an R luminance value will be described.

A resolution value of the table for R is fixed to an estimated resolution value. The table for R is scanned for a luminance value R of a considered pixel that satisfies the condition Ri≦R<Ri+1. At this point, assuming that the maximum value of luminance values of adjacent pixels against the R luminance value Ri is Rdi and that the maximum value of luminance values of the adjacent pixels against the R luminance value Ri+1 is Rdi+1, the luminance value R of the considered pixel is obtained by linearly interpolating the R luminance value Ri of the table for R and the R luminance value Ri+1 of the table for R. This relation is applied to the maximum value of the luminance values of the adjacent pixels so as to obtain the estimated maximum value delta_r of the luminance values of adjacent pixels. In other words, the maximum value delta_r is obtained as follows.

rl=Ri−Ri+1 rm=R−Ri rn=Ri+1−R delta_r=Rri*rn/rl+Rri+1*rm/rl

This relation applies to G and B.

In such a manner, with a color value (R, G, B) of a considered pixel that has not been processed, the maximum value (delta_r, delta_g, delta_b) of luminance differences between the considered pixel and the adjacent pixels is obtained as a threshold value for labeling adjacent pixels.

Assuming that eight pixels adjacent to a considered pixel that has not been processed are scanned, that a pixel that has been assigned a label is present adjacent to the considered pixel, and that the RGB luminance value (Rs, Gs, Bs) of the labeled pixel satisfies the following conditions:

|R−Rs|<=delta_r and

|G−Gs|<=delta_g and

|B−Bs|<=delta_b, since the color of the considered pixel is similar to the color of the adjacent pixel, the label of the adjacent pixel is stored as a current label region. The considered pixel is assigned the current label region. In addition, as the average color (Rm, Gm, Bm) of the area assigned the current label region, a new average color of which the color of the considered pixel is added to the average color of the adjacent labels is obtained.

Otherwise, the considered pixel is assigned a new label value of the maximum label value plus 1 as the current label. In this case, as the average value (Rm, Gm, Bm) of the area, the RGB value of the considered pixel is assigned.

In any case, the coordinate value of the considered pixel is stored in a process coordinate array.

Next, a process for extending areas with the same color around a considered pixel is performed. In this process, the top coordinate value is extracted from the process coordinate array. A pixel with the top coordinate value is treated as a considered pixel. An estimated threshold value (delta_r, delta_g, delta_b) that is the difference between the RGB luminance value of the considered pixel and the luminance value of an adjacent pixel is obtained.

The threshold value (delta_rm, delta_gm, delta_bm) of the luminance difference of each RGB signal of the average color is obtained with the average color (Rm, Gm, Bm) in the area and the estimated resolution.

Next, as shown in FIG. 12A, eight pixels adjacent to the considered pixel are scanned so as to obtain (Ri, Gi, Bi) values (where i=1 to 8) of the pixels adjacent to the considered pixel. The luminance difference value between the (Rc, Gc, Bc) value of the color of the considered pixel and the (Rm, Gm, Bm) value of the average color of the adjacent pixels is obtained with respect to the RGB value. When the luminance difference value satisfies the following conditions:

|Ri−Rc|<=delta_r and

|Gi−Gc|<=delta_g and

|Bi−Bc|<=delta_b

|Ri−Rm|<=delta_rm and

|Gi−Gm|<=delta_gm and

|Bi−Bm|<=delta_bm the adjacent pixels are assigned the same label as that of the considered pixel and the coordinate values of the adjacent pixels are stored in the process coordinate array. The considered pixel is deleted from the process coordinate array.

Next, the maximum value and the minimum value of the process coordinates (x, y) are obtained and stored as an enclosing rectangle of the label area along with the average color of the label area as an attribute of the enclosing rectangle.

This process is repeated until there is no pixel in the process coordinate array.

As results of the labeling process, an enclosing rectangle that surrounds an area with the same label as that of a label image is obtained.

Output information of the labeling process is as follows.

---

Label image: 4 bytes/pixel
Enclosing rectangles
  Number of rectangles: maxcount
  Rectangle information: lbtbl
    Label number of label image included:
      label
    Upper left coordinates of rectangle:
(xmin, ymin)
    Lower right coordinates of rectangle:
(xmax, ymax)
    Representative color in rectangle:
(r, g, b)
    Relevant group number: string_label
    Length of contour: contour

---

Next, a considered rectangle extracting process is performed (at step S14). In the considered rectangle extracting process, an enclosing rectangle in the range of a predetermined size is extracted as a considered rectangle from enclosing rectangles with all colors.

In reality, an enclosing rectangle whose x length is 23 dots or more (at 100 dpi) and ½ less of the width of the image and whose y length is 23 dots or more (at 100 dpi) and ½ or less of the height of the image is extracted as a considered rectangle.

In the considered rectangle extracting process, the sizes of enclosing rectangles can be limited as a reference for grouping them. For example, when a title area is extracted, with reference to an enclosing rectangle corresponding to the size of characters of a title, enclosing rectangles can be grouped. Thus, enclosing rectangles such as noise and a background that are not used in a title can be prevented from being referenced in the grouping process. Consequently, since an unnecessary process can be prevented, the process speed can be improved.

Next, a process for extracting a search range around a considered pixel and rectangles in the search range is performed (at step S15). In this process, a search range with a predetermined size is assigned around a considered rectangle so as to extract rectangles in the search range.

Figure 26:
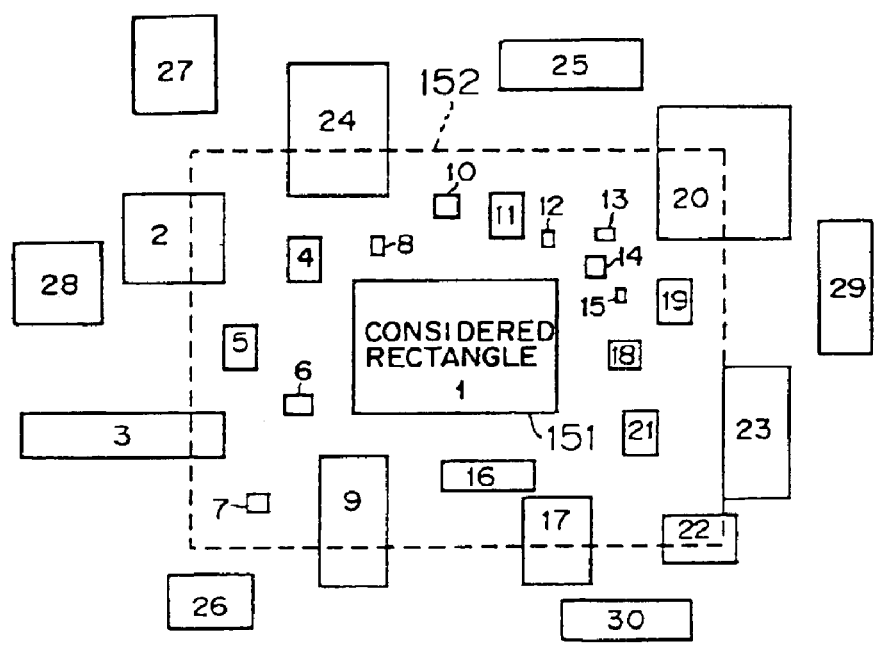
FIG. 26 is a schematic diagram for explaining an assigning method for a search range in the vicinity of a considered rectangle according to an embodiment of the present invention.

FIG. 26 is a schematic diagram for explaining a method for assigning a search range around a considered rectangle according to an embodiment of the present invention.

In FIG. 26, enclosing rectangles with rectangle numbers 1 to 30 are extracted. It is assumed that an enclosing rectangle 151 with the rectangle number 1 is a considered rectangle. In addition, it is assumed that a search range 152 is assigned around the enclosing rectangle 151. As objects to be grouped with respect to the enclosing rectangle 151, only the enclosing rectangles with the rectangle numbers 2 to 24 in the search range are selected. In contrast, the enclosing rectangles with the rectangle numbers 25 to 30 that are not in the search range 152 are not selected as objects to be grouped with respect to the enclosing rectangle 151.

In the case that enclosing rectangles are grouped, when the search range of the enclosing rectangles is limited around a considered rectangle, only a character string that is present in a predetermined range can be extracted. For example, when a title area is extracted, it is not necessary to consider characters that are apart from the title. Thus, the title area can be effectively extracted.

In reality, it is assumed that the longer side of the considered rectangle 151 is denoted by len, that the smaller side thereof is 35 dots at 100 dpi, and that the search range around the considered rectangle is denoted by range_size.

To obtain the enclosing rectangles in the range range_size around the considered rectangle at high speed, the following method is used.

Figure 27:
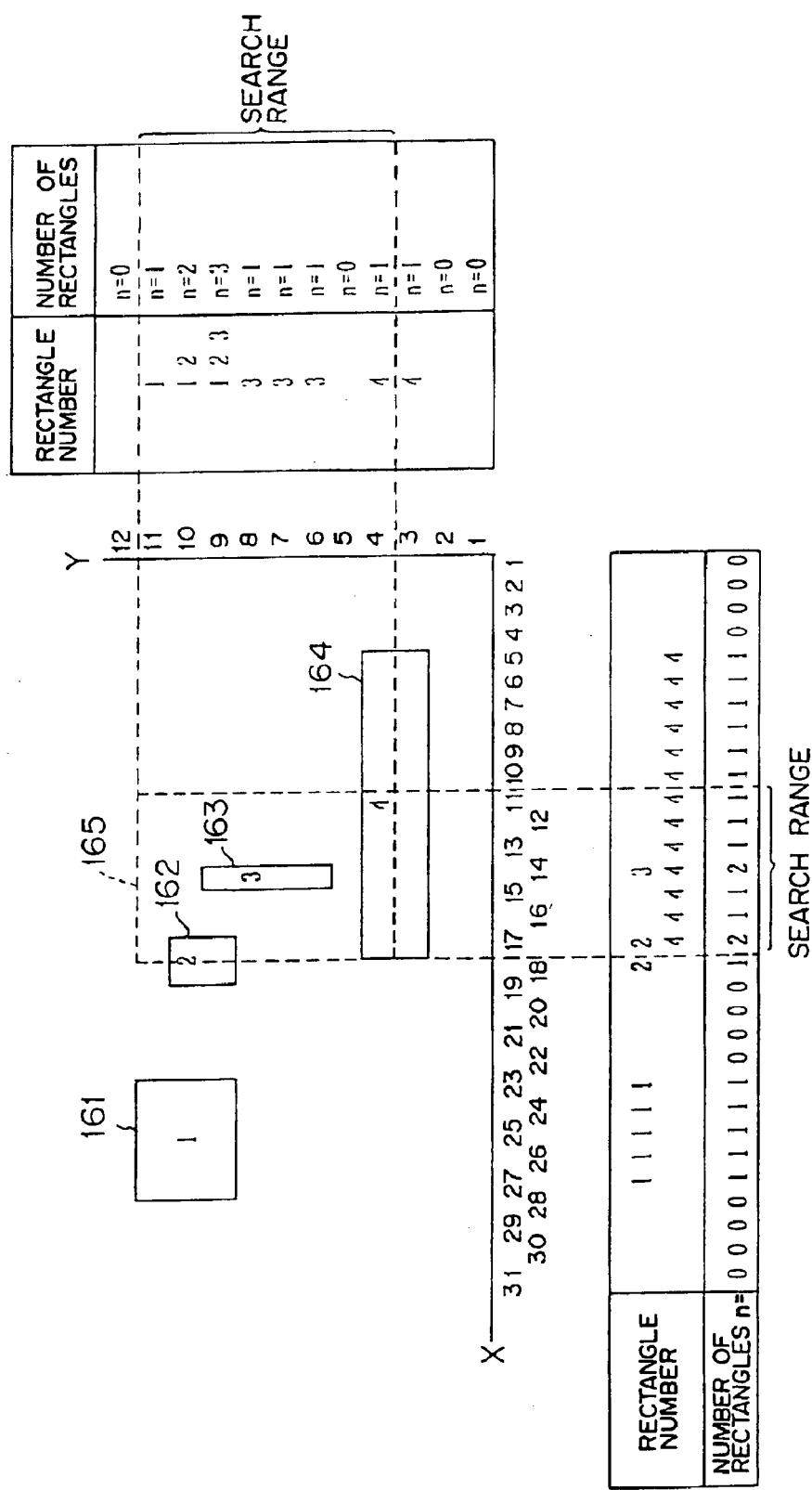
FIG. 27 is a schematic diagram for explaining a rectangle extracting method in a search range in the vicinity of a considered rectangle according to an embodiment of the present invention.

FIG. 27 is a schematic diagram for explaining a method for extracting rectangles in a search range around a considered rectangle according to an embodiment of the present invention.

In FIG. 27, assuming that enclosing rectangles 161 to 164 with rectangle numbers 1 to 4 have been extracted, rectangle numbers and the number of rectangles are obtained and registered corresponding to individual XY coordinate values.

Since the enclosing rectangles 161 to 164 are not present at positions of X coordinate values 1 to 4, the number of rectangles n=0 and rectangle number=null are recorded. Since the enclosing rectangle 164 with the rectangle number 4 is present at the positions of the X coordinate values 5 to 13, the number of rectangles n=1 and the rectangle number=4 are registered. Since the enclosing rectangle 163 with the rectangle number 3 and the enclosing rectangle 164 with the rectangle number 4 are present at the position of the X coordinate value 14, the number of rectangles n=2 and the rectangle numbers=3 and 4 are registered. Since the enclosing rectangle 164 with the rectangle number 4 is present at the positions of the X coordinate values 15 and 16, the number of rectangles n=1 and the rectangle number=4 are registered. The similar operation is performed at the positions of all the XY coordinate values.

Next, assuming that the enclosing rectangle 163 with the rectangle number 3 is a considered rectangle and that a search range 165 is assigned around the enclosing rectangle 163, the XY coordinate values included in the search range 165 are obtained. Rectangle numbers at the positions of the individual XY coordinate values are obtained. Rectangle numbers that are present at both the positions of the XY coordinate values are those of enclosing rectangles in the search range 165. For example, the rectangle numbers of the enclosing rectangle at the positions of the X coordinate values in the search range 165 are 2 to 4. The rectangle numbers of the enclosing rectangles at the positions of the Y coordinate values in the search range 165 are 1 to 4. Thus, the rectangle numbers at both the positions of the XY coordinate values are 2 to 4. Consequently, the enclosing rectangles 162 to 164 with the rectangle numbers 2 to 4 are obtained as those in the search range 165.

In reality, the following steps a) to d) are performed.

a) Rectangle numbers are projected to XY axes of the entire image.

A set of the number of rectangles and rectangle number is registered for each pixel on the XY axes of the entire image. For example, assuming that a rectangle number i is present in a range (x1, x2) on the X axis, the number i is included in a set of rectangle numbers in the range from coordinate values x1 to x2 on the X axis. The same operation is performed for all rectangles on the XY coordinates.

b) A range range_size is assigned around a considered rectangle.

c) Rectangles at the potions of the coordinate values on the X axis in the range range_size are ORed so as to extract a set of rectangle numbers.

The same operation is performed on the Y axis.

d) The set of rectangle numbers on the X axis and the set of rectangle numbers on the Y axis are ANDed so as to obtain a set of rectangles around the considered rectangle.

In the rectangle number storing method shown in FIG. 27, a storage capacity for storing all rectangle numbers of the entire image is required for each coordinate value. Thus, a large storage capacity is required.

To obtain the number of rectangles and rectangle numbers at individual coordinate values at high speed without an increase of the storage capacity of the memory, the following method is used.

Figures 28A, 28B, 28C:
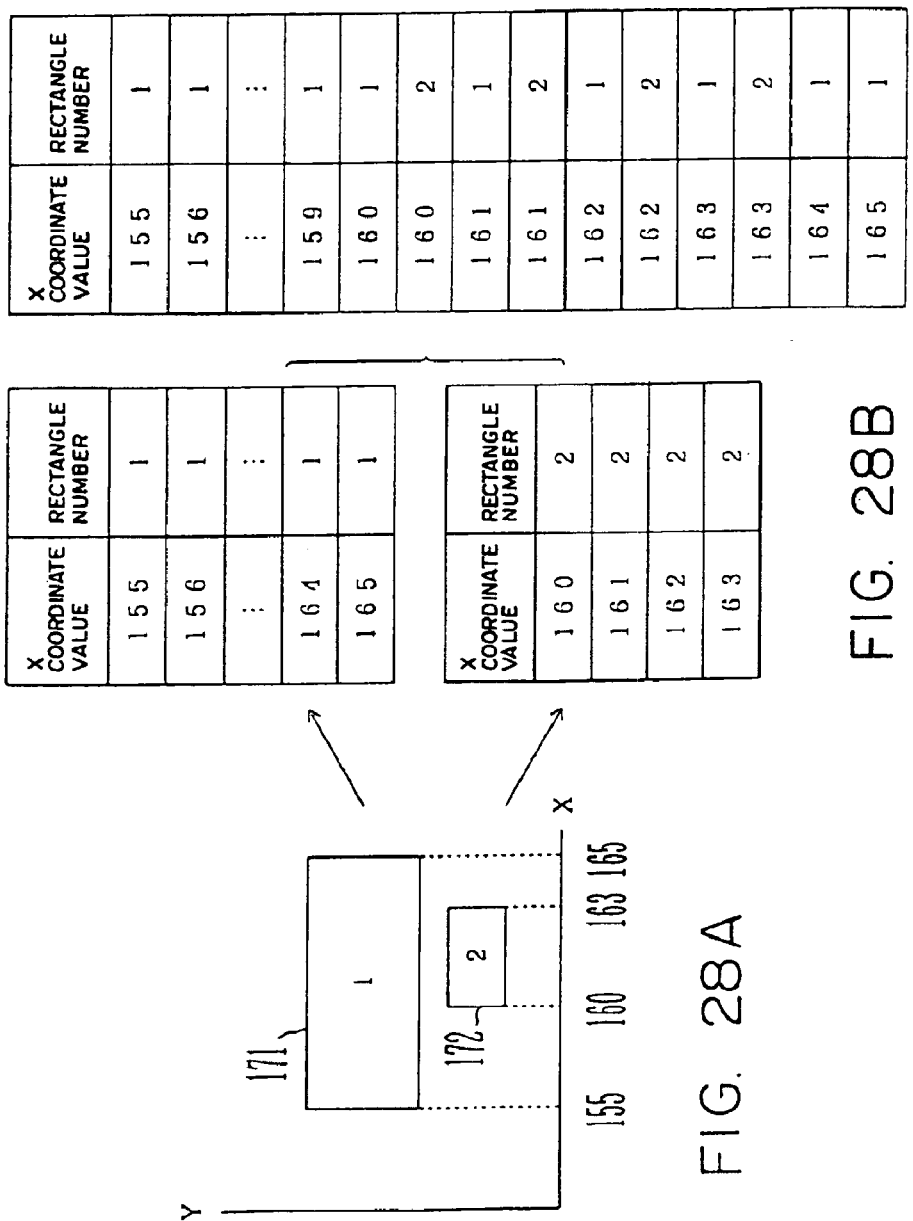
FIGS. 28A, 28B, and 28C are schematic diagrams for explaining a storing method of rectangle information in a search range in the vicinity of a considered rectangle according to an embodiment of the present invention.

FIGS. 28A, 28B, and 28C are schematic diagrams for explaining a method for storing rectangle information in a search range, or partially disposed in the area around a considered rectangle according to an embodiment of the present invention.

In FIG. 28A, it is assumed that enclosing rectangles 171 and 172 with rectangle numbers 1 and 2 have been extracted, respectively, that the enclosing rectangle 171 is present at the positions of the X coordinate values 155 to 165, and that the enclosing rectangle 172 are present at the positions of the X coordinate values 160 to 163. Thus, as shown in FIG. 28B, for the enclosing rectangle 171, the rectangle number 1 is registered at the positions of the X coordinate values 155 to 165. For the enclosing rectangle 172, the rectangle number 2 is registered at the positions of the X coordinate values 160 to 163.

Next, as shown in FIG. 28C, the rectangle numbers 1 and 2 are arranged in the order thereof and in the ascending order of the X coordinate values 155 to 165. Thus, the number of rectangles having an equal coordinate value can be obtained.

In reality, the following steps i) to v) are performed.

i) The horizontal lengths of all rectangles are added. A data structure having rectangle numbers and coordinate information is prepared corresponding to the total horizontal length of the rectangles.

ii) The coordinate values of rectangles and the rectangle numbers are assigned to the data structure.

iii) The data of the data structure is sorted by coordinate values.

iv) The number of rectangles is counted at each coordinate value. A storage area for the number of rectangles is prepared corresponding to each coordinate value. The sorted data structure is scanned from the beginning. When the coordinate value does not vary, the number of rectangles is counted. When the coordinate value varies, the number of rectangles is settled and stored.

v) A rectangle number with the same coordinate value is stored in the sorted data structure in the prepared area. The sorted data structure is scanned from the beginning. When the coordinate value does not vary, a rectangle number is stored in the storage area.

Next, a same color group extracting process is performed (at step S16). In the same color group extracting process, as with the labeling process, a threshold value of luminance difference values of RGB is obtained with the average color of a pattern in one considered rectangle. Rectangles whose RGB luminance difference values to the considered rectangle are not larger than the threshold value are extracted as rectangles in the same group and stored in a group information area. Next, with an enclosing rectangle that is newly added to the group, the same process is performed until there is no added rectangle.

In reality, the distance between value (Rc, Gc, Bc) of one considered rectangle and value (Ri, Gi, Bi) of one enclosing rectangle i of a set of rectangles around the considered rectangle in the RGB space is defined as follows.

$$dist=|Rc-Ri|+|Gc-Gi|+|Bc-Bi|$$

In addition, it is assumed that the luminance difference of RGB obtained with the color value (Rc, Gc, Bc) of a considered rectangle and a resolution is denoted by delta_r, delta_g, delta_b. When the value (Rc, Gc, Bc) of the considered rectangle and the value (Ri, Gi, Bi) of one enclosing rectangle i of a set of enclosing rectangles around the considered rectangle satisfy the following conditions, it is determined that the enclosing rectangle around the considered rectangle is included in the group of the considered rectangle. The enclosing rectangle i around the considered rectangle is stored in the group of the considered rectangle.

$$dist<TH\_RGB\ (TH\_RGB=20)$$

or $$(|Rc-Ri|<delta\_r$$

and $$|Gc-Gi|<delta\_g$$

and $$|Bc-Bi|<delta\_b)$$

In addition, the rectangle number that is newly added to the group is stored to a newly added rectangle area.

Next, the top rectangle number is extracted as a newly considered rectangle from the newly added rectangle area. Enclosing rectangles around the newly considered rectangle are obtained. By repeating the steps, enclosing rectangles included in the group are obtained until there is no rectangle added to the group.

In the above-described process, the following data structure of group information to be extracted is obtained.

```
Number of rectangles in group: num
    Rectangle number that composes group: child
    Number of rectangles after overlapped
rectangles are combined: overlap_num
    Rectangle information after overlapped
```

```
                -continued rectangles are combined: overlap
    (Delta type: rectangle information lbtbl
    type)
    Direction code of character string in
        group: orient
    Number of character strings in group:
gyou_num
    Rectangle information of character string:
        gyou
```

Next, a process for extracting the average thickness of a character line in a group is performed (at step S17). In this process, a contour tracing process is performed for a pattern of a label image corresponding to an enclosing rectangle in a group so as to obtain the length of the contour. In other words, in the rectangle range of one enclosing rectangle included in a group, the contour tracing process is performed on the label image corresponding to the label number of the enclosing rectangle. The extracted length of the contour is assigned to an attribute of the length of the contour of the rectangle. The area of the pattern is divided by the length of the contour so as to obtain the average thickness of a character line. The obtained average thickness is registered as an attribute of the rectangle to the rectangle information.

Figure 29A:
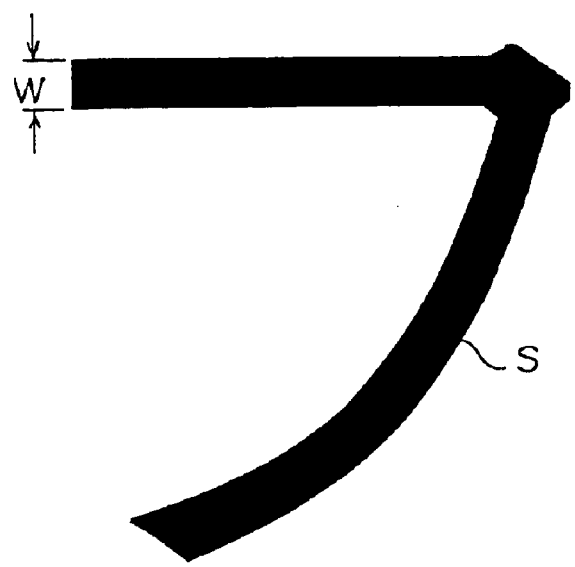
FIGS. 29A and 29B are schematic diagrams for explaining a calculating method of the thickness of a character line according to an embodiment of the present invention.
Figure 29B:
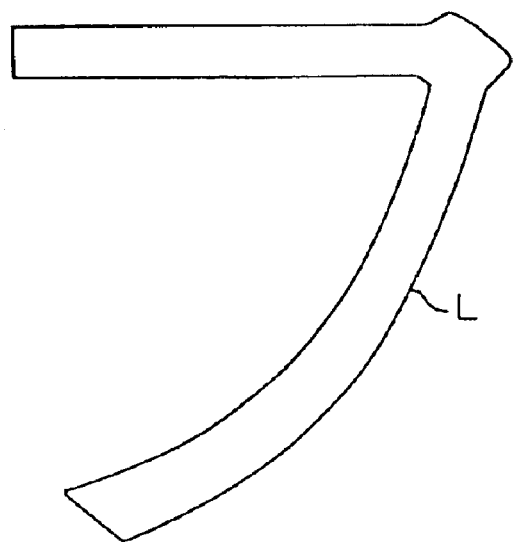

FIGS. 29A and 29B are schematic diagrams for explaining a method for calculating the thickness of a character line according to an embodiment of the present invention.

In FIG. 29A, it is assumed that a pattern "フ" has been extracted. By counting the number of pixels included in the pattern "フ", the area S of the pattern "フ" is calculated.

Next, as shown in FIG. 29B, the contour of the pattern "フ" is extracted. The length L of the contour is calculated. The area S of the pattern "フ" is divided by the length L of the contour so as to obtain the average thickness W of the pattern "フ".

Next, a process for re-grouping enclosing rectangles corresponding to the thickness of a character line is performed (at step S18). In the process, the enclosing rectangles in the group are re-grouped corresponding to the average thickness of the character line so as to structure new group information. In other words, for the enclosing rectangles in the group, steps S14 to S16 shown in FIG. 23 are repeated. When the same color group extracting process is performed at step S16, an estimated thickness of a character line (=area of pattern in rectangle/length of contour of pattern) is used in addition to color information used at step S15.

Figure 30:
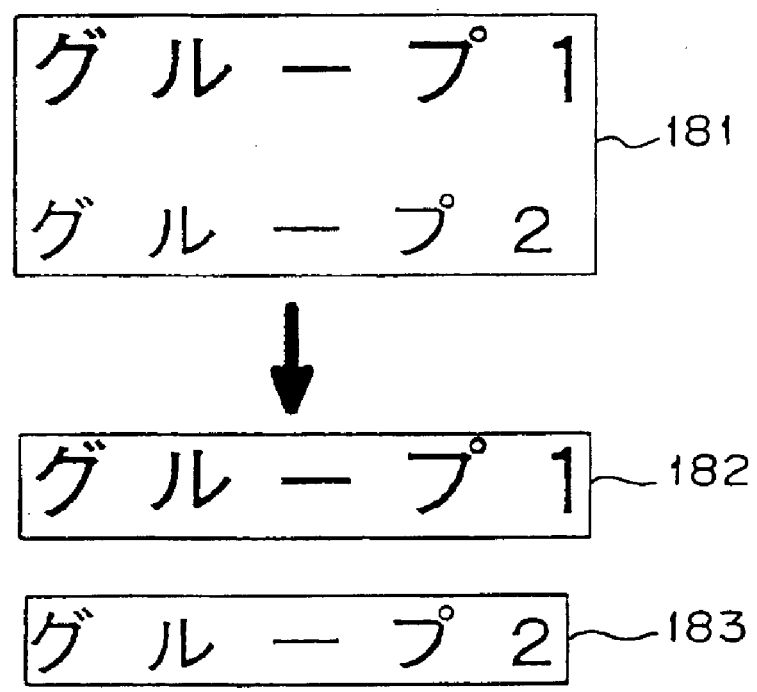
FIG. 30 is a schematic diagram for explaining a re-grouping process corresponding to the thickness of a character line according to an embodiment of the present invention.

FIG. 30 is a schematic diagram for explaining a process for re-grouping enclosing rectangles corresponding to the thickness of a character line according to an embodiment of the present invention.

In FIG. 30, it is assumed that a character string "グループ 1 (group 1)" and a character string "グループ 2 (group 2)" are described with the same color and closely disposed. Thus, it is assumed that the character string "グループ 1" and the character string "グループ 2" are grouped in the same group 181.

The thickness of the characters of the character string "グループ 1" and the thickness of the characters of the character string "グループ 2" are calculated. Characters with different thickness are categorized as different groups. Thus, the character string "グループ 1" is categorized as the group 182. The character string "グループ 2" is categorized as the group 183.

In this process, the background and the character pattern that have been categorized as the same group can be categorized as different groups. In addition, character strings with different fonts or different character sizes can be categorized as different groups.

In reality, with an estimated thickness of a character line of a first enclosing rectangle (thick1) and an estimated thickness of a character line of a second enclosing rectangle (thick2), the rate of the thicknesses of the character lines (thick_rate) can be obtained as follow.

thick_rate=max (thick1, thick2)/min (thick1, thick2)

As with step S15, when the following conditions are satisfied, two enclosing rectangles are recorded as the same group.

thick_rate<TH_THICK_RATE and (dist<TH_RGB or ($|Rc-Ri|$<delta_r and $|GC-Gi|$<delta_g and $|Bc-Bi|$<delta_b)} where it is assumed that TH_THICK_RATE is 2.5.

This process is performed for all enclosing rectangles in the original group so as to categorize the enclosing rectangles as new groups.

When the thickness of a character line is obtained, it is necessary to obtain the contour of the pattern. However, to trace the contour at high speed, the following process is performed.

FIGS. 31A, 31B, 31C, and 31D are schematic diagrams for explaining a method for assigning a search start point of pixels to trace a contour according to an embodiment of the present invention.

Figure 31:
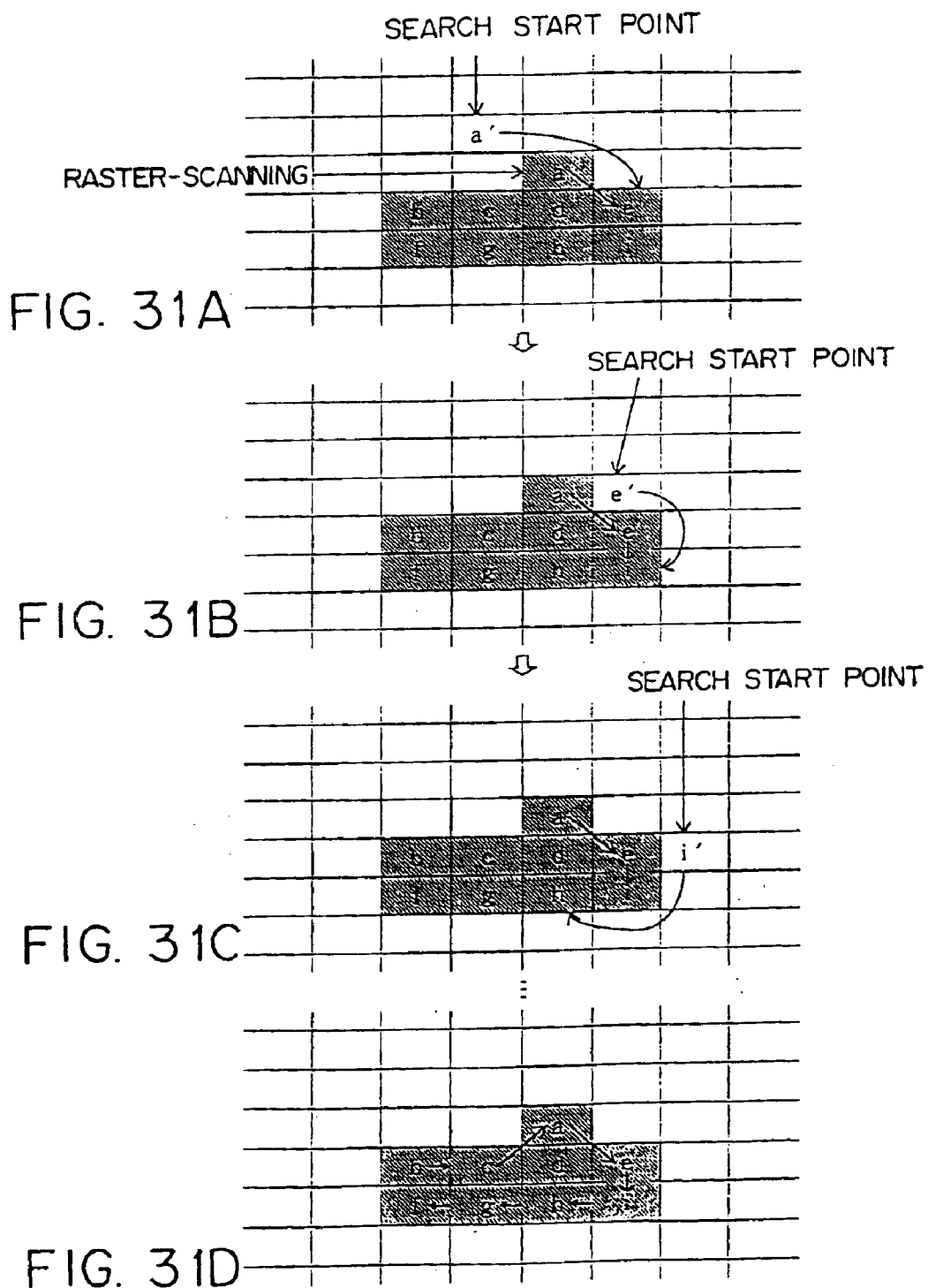
FIGS. 31A, 31B, 31C, and 31D are schematic diagrams for explaining an assigning method of a search start point of a pixel in a contour tracing process according to an embodiment of the present invention.

In FIG. 31A, assuming that the contour of a pattern composed of pixels a to i is obtained, a label image is raster-scanned from the upper left position. Thus, the pixel a is obtained. After the pixel a is obtained, with a search start point of a pixel a' that is one of eight pixels adjacent to the pixel a and that has been searched two pixels before the pixel a, the eight pixels adjacent to the pixel a are searched clockwise. When the pixel e is obtained, as shown in FIG. 31B, with a search start point of a pixel e' that is one of eight pixels adjacent to the pixel e and that is the next pixel of the pixel a that has been searched as a contour just before the pixel e, the eight pixels adjacent to the pixel e are searched clockwise. When the pixel i is obtained, as shown in FIG. 31C, with a search start point of a pixel i' that is one of eight pixels adjacent to the pixel i and that is the next pixel of the pixel e that has been searched as a contour just before the pixel i, the eight pixels adjacent to the pixel i are searched clockwise. Likewise, as shown in FIG. 31D, pixel a→pixel e→pixel i→pixel h→pixel g→pixel f→pixel b→pixel c are extracted as the contour of the pattern composed of the pixels a to i.

In reality, the following steps a) to f) are performed.

a) Rectangle size process completion flags are prepared. As initial values, all the rectangle size process completion flags are set to "0".

b) The rectangle range is scanned from the upper left position with the process completion flags and label image so as to search a pixel i with process completion flag=0 and label number=label number of current rectangle. The contour length is set to 0.

c) Eight pixels adjacent to the pixel i are searched from the pixel 0 clockwise as shown in FIG. 32. When there is a pixel with process completion flag=0 and label number= label number of current rectangle, a direction code DC of the pixel is extracted.

FIG. 32 is a schematic diagram showing a direction code viewed from a current pixel according to an embodiment of the present invention.

In FIG. 32, the pixel C is a current pixel. The pixels 0 to 7 are pixels adjacent to the current pixel C. The direction code DC is viewed from the current pixel C. From a pixel i, eight pixels are searched in order.

d) As the next pixel that composes the contour, a pixel in the direction of the direction code DC detected from the current pixel C, is searched. At this point, the contour length that has been calculated is incremented by 1. The pixel to be searched next is assigned a new current pixel C'. A pixel with process completion flag=0 and label number=label number of current rectangle is searched from eight pixels adjacent to the current pixel C'. At this point, the start direction code for searching eight pixels adjacent to the new current pixel C' is DC' that is the remainder from the former direction code (DC+5) which is divided by 8. The adjacent pixels are searched clockwise in the direction DC'.

Thus, since a pixel is prevented from being redundantly searched, the contour tracing process can be performed at high speed.

e) The contour tracing process is continued until a pixel at the start coordinates is searched. The contour length at the point is extracted as the contour length of one contour of a pattern with a label value in the rectangle.

f) Steps c) to e) are performed for another contour of the same pattern. All the contour lengths are added and finally extracted as the contour length of the pattern.

Thereafter, a process for deleting a large rectangle from a group is performed (at step S19). In the process, to remove noise, the average size of rectangles in the group is obtained. Corresponding to the average size, excessively large rectangles are deleted.

Figures 33A, 33B:
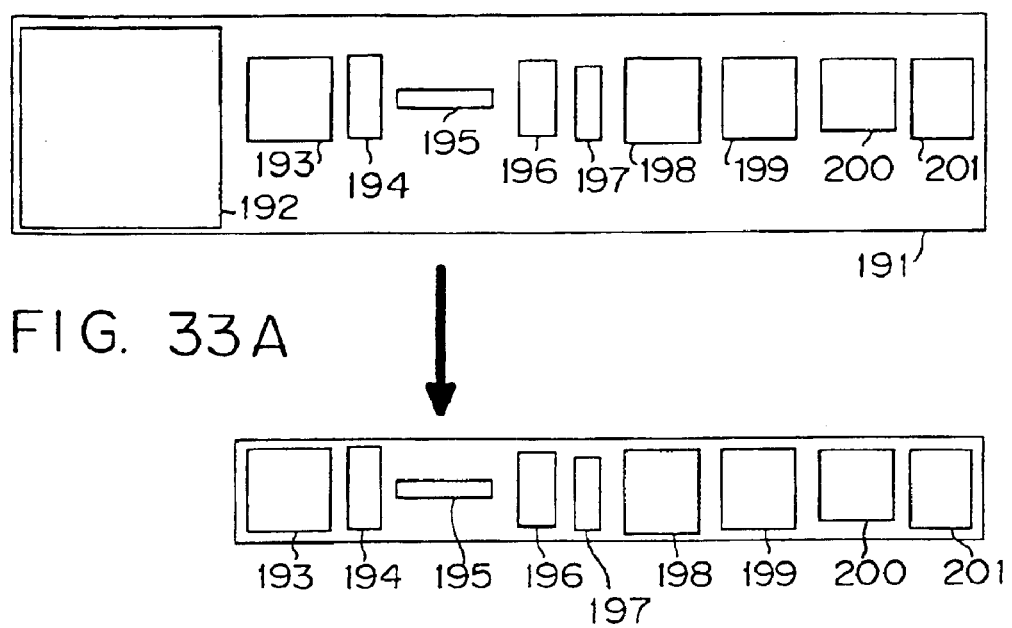
FIGS. 33A and 33B are schematic diagrams for explaining a process for deleting a large rectangle from a group according to an embodiment of the present invention.

FIGS. 33A and 33B are schematic diagrams for explaining a process for deleting a large rectangle from a group according to an embodiment of the present invention.

In FIG. 33A, assuming that enclosing rectangles 192 to 201 are categorized as a group 191, the sizes of the enclosing rectangles 192 to 201 in the group 191 are obtained. Assuming that the size of the enclosing rectangle 192 is much larger than the sizes of the enclosing rectangles 193 to 201, as shown in FIG. 33B, the enclosing rectangle 192 is deleted from the group 191 and thereby a group 202 composed of the enclosing rectangles 193 to 201 are generated.

In reality, the following steps a) to d) are preformed.

a) A histogram of the heights of the enclosing rectangles in the group is created. A rectangle height freq_height that represents the maximum frequency value is obtained in the following method.

i) With a gradation window, a convolutional calculation is performed for the histogram (namely, a moving sum thereof is obtained). In reality, the gradation window is composed of for example five pixels of "11111".

ii) The minimum height value (in reality, 23 dots at 100 dpi) is obtained beforehand. A rectangle height freq_height that is larger than the minimum height value and that represents the maximum frequency is obtained.

Figure 34A:
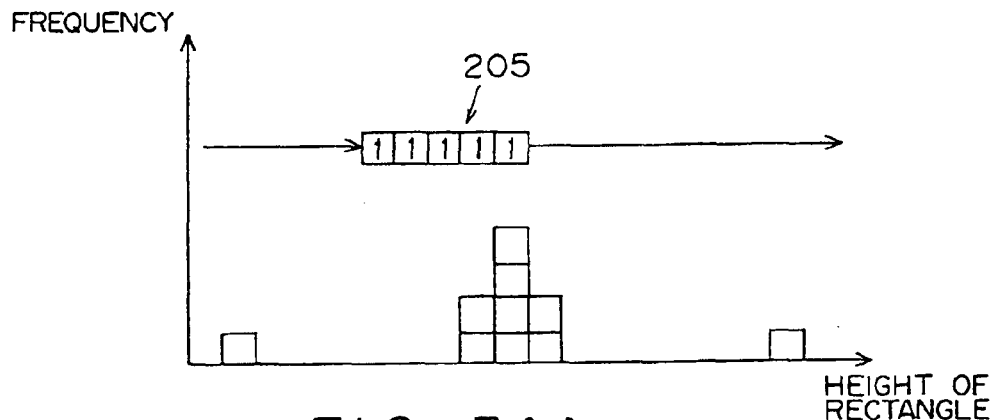
FIGS. 34A and 34B are schematic diagrams for explaining a method for calculating the maximum frequency value of the height of rectangles according to an embodiment of the present invention.
Figure 34B:
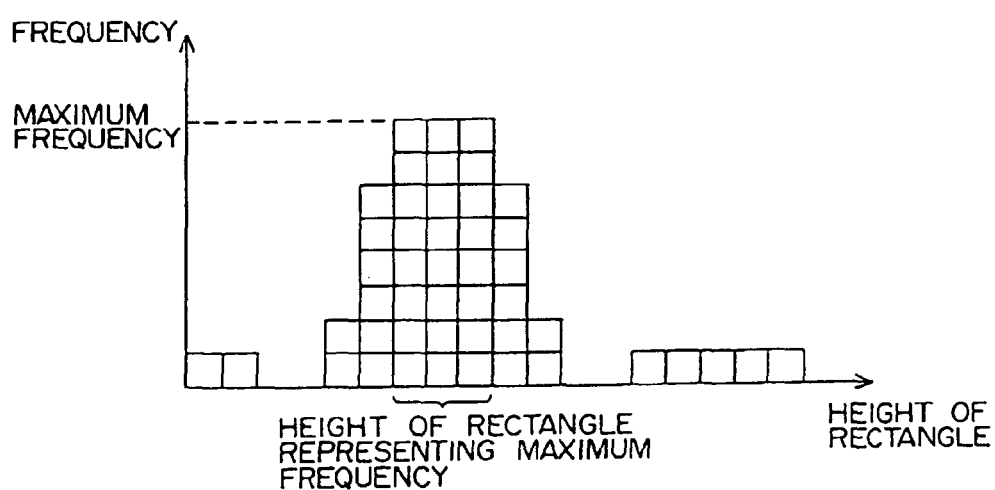

FIGS. 34A and 34B are schematic diagrams for explaining a method for calculating the heights of rectangles that represent the maximum frequency value according to an embodiment of the present invention.

In FIG. 34A, when the frequence of the heights of the enclosing rectangles 192 to 201 shown in FIG. 33A is obtained, with a gradation window 205, as shown in FIG. 34B, the moving sum of the frequency of the heights of rectangles obtained in FIG. 34A is calculated. After the moving sum of the frequency of the heights of rectangles is obtained, the height of rectangle freq_height that represents the maximum frequency is obtained from the heights of the enclosing rectangles 192 to 201.

b) When the height of rectangle freq_height that represents the maximum frequency value is smaller than the minimum height value (in reality, 23 dots at 100 dpi), the minimum height value is treated as the height of rectangle freq_height that represents the maximum frequency value.

c) A threshold value th_large that determines a large rectangle is obtained as th_large=freq_height*10.

d) Enclosing rectangles whose vertical and horizontal sizes are smaller than th_large are kept in the group. The remaining enclosing rectangles are deleted as noise from the group.

Next, a process for combining overlapped rectangles in a group is performed (at step S20). In this process, a rectangle that surrounds enclosing rectangles that overlap is newly created and registered to group information.

In other words, enclosing rectangles that overlap (even if enclosing rectangles partly overlap) are combined. An enclosing rectangle that surrounds the combined enclosing rectangles is created.

Figures 35A, 35B:
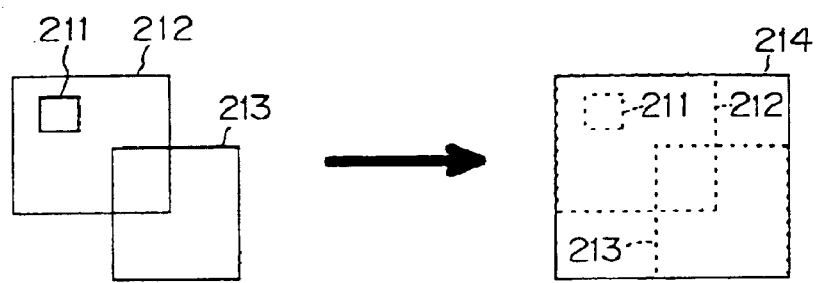
FIGS. 35A and 35B are schematic diagrams for explaining a process for combining overlapped rectangles in a group according to an embodiment of the present invention.

FIGS. 35A and 35B are schematic diagrams for explaining a process for combining overlapped rectangles in a group according to an embodiment of the present invention.

In FIG. 35A, an enclosing rectangle 211 is included in an enclosing rectangle 212. The enclosing rectangle 212 overlaps with an enclosing rectangle 213. In this case, the enclosing rectangles 211 to 213 are combined. Thus, in addition to the enclosing rectangles 211 to 213, an enclosing rectangle 214 is created.

In this process, when one character is composed of a plurality of separated patterns such as "圖" (meaning a picture in Japanese) and "關" (meaning a checking station in Japanese), such patterns can be integrally treated and the successive process can be effectively performed.

Next, a process for extracting a character string from a group is performed (at step S21). In this process, the direction of a character string in a group is estimated. The character string in the direction is extracted. Information of the direction and coordinates of the extracted character string is stored for each group.

FIGS. 36A and 36B are schematic diagrams for explaining a process for extracting a character string from a group according to an embodiment of the present invention.

In FIG. 36A, assuming that enclosing rectangles 1 to 29 are categorized as a group 221, an enclosing rectangle adjacent to the enclosing rectangle 1 at the leftmost position is searched on the right. When the enclosing rectangle 2 adjacent to the enclosing rectangle 1 is obtained, the obtained enclosing rectangle is assigned the rectangle number 1. The rectangle number 2 of the obtained enclosing rectangle is changed to the rectangle number 1. Likewise, an enclosing rectangle adjacent to the obtained enclosing rectangle with the rectangle number 1 is searched on the right. When an enclosing rectangle is obtained, the rectangle number of the left side enclosing rectangle is assigned to the right side enclosing rectangle.

When there is no enclosing rectangle adjacent to the enclosing rectangle with the rectangle number on the right, an enclosing rectangle adjacent to an enclosing rectangle with the rectangle number 15 is searched on the right. When an enclosing rectangle adjacent to the enclosing rectangle with the rectangle number 15 is obtained, the rectangle number 15 is assigned to the obtained enclosing rectangle.

In such a process, as shown in FIG. 36B, the rectangle number 1 is assigned to the enclosing rectangle adjacent to the enclosing rectangle with the rectangle number 1 on the right side. Likewise, the rectangle number 15 is assigned to an enclosing rectangle adjacent to the enclosing rectangle with the rectangle number 15 on the right. After the rectangle numbers are transferred, an enclosing rectangle 222 that surrounds the enclosing rectangles with the same rectangle number 1 assigned is created. Likewise, an enclosing rectangle 223 that surrounds the enclosing rectangles with the same rectangle number 15 assigned is created.

In reality, the following steps a) to e) are performed.

a) The direction of a character string is estimated corresponding to the coordinates of enclosing rectangles in the group.

b) The adjacent relation of a rectangle that is the closest (upper, lower, left, or right position) to an enclosing rectangle in outward and inward directions is obtained.

c) When a character string is arranged in the horizontal direction, from a rectangle at the leftmost position, the start rectangle number is transferred to a rectangle on the right until there is no rectangle on the right. This process applies to the vertical direction.

d) A rectangle adjacent to a rectangle at the leftmost position is assigned the rectangle number thereof. The rectangle number assigned is transferred to a rectangle adjacent thereto on the right until there is no rectangle relation.

e) After the above-described process is performed for all rectangles in the group, rectangles with the same rectangle number assigned are obtained. An enclosing rectangle that surrounds the rectangles with the same rectangle number assigned is extracted as a character string.

Next, a process for combining separated characters of a character string is performed (at step S22). In this process, a process for combining vertically separated characters of a horizontal character string is applied to rectangles of the character string (in the case of a vertical character string, a process for combining horizontally separated characters is applied to rectangles of the character string). The combined rectangles are substituted with an enclosing rectangle. In this case, the rectangles of the character string are vertically combined. In other words, in the case of a horizontal character string, respective rectangles that surround an upper stroke and a lower stroke of a character (for example, "こ") are combined and processed as one rectangle.

FIGS. 37A and 37B are schematic diagrams for explaining a process for combining separated characters of a character string according to an embodiment of the present invention.

In FIG. 37A, enclosing rectangles 222 and 223 that surround enclosing rectangles horizontally adjacent in a group 221 are generated. In the enclosing rectangle 222, enclosing rectangles 224 and 225 that are vertically adjacent and enclosing rectangles 226 and 226 that are vertically adjacent are present. In the enclosing rectangle 223, enclosing rectangles 228 and 229 that are vertically adjacent and enclosing rectangles 230 and 231 that are vertically adjacent are present.

In this case, as shown in FIG. 37B, an enclosing rectangle 232 that surrounds the enclosing rectangles 222 and 223 is generated. The enclosing rectangles 222 and 223 are combined. An enclosing rectangle 233 that surrounds the enclosing rectangles 226 and 227 is generated. The enclosing rectangles 226 and 227 are combined. An enclosing rectangle 234 that surrounds the enclosing rectangles 228 and 229 is generated. The enclosing rectangles 228 and 229 are combined. An enclosing rectangle 235 that surrounds the enclosing rectangles 230 and 231 is generated. The enclosing rectangles 230 and 231 are combined.

In reality, the following steps a) to c) are performed. In the following example, the case of a horizontal character string will be described. However, these steps apply to the case of a vertical character string.

a) Rectangles in a character string are sorted in the ascending order of X coordinate values.

b) The first rectangle is assigned a current rectangle. When the next rectangle overlaps with the current rectangle in the range of the X coordinate values of the current rectangle, these rectangles are combined. The range of the X coordinate values of the current rectangle becomes the range of the X coordinate values of the combined rectangles. This process is repeated until there is no rectangle to be combined. When there is no rectangle to be combined, the combined rectangles are stored.

c) After there is no rectangle to be combined, the next rectangle is assigned a new current rectangle. With the new current rectangle, step b) is repeated.

Thereafter, a process for re-grouping rectangles corresponding to the sizes of characters of a character string is performed (at step S23). In this process, rectangles are re-grouped corresponding to vertical sizes of characters of a character string information of the group. The results are stored in new group information.

Thus, character strings with the same color and different character sizes can be categorized as different groups. In addition, noise and a character string can be categorized as different groups.

Figures 38A, 38B:
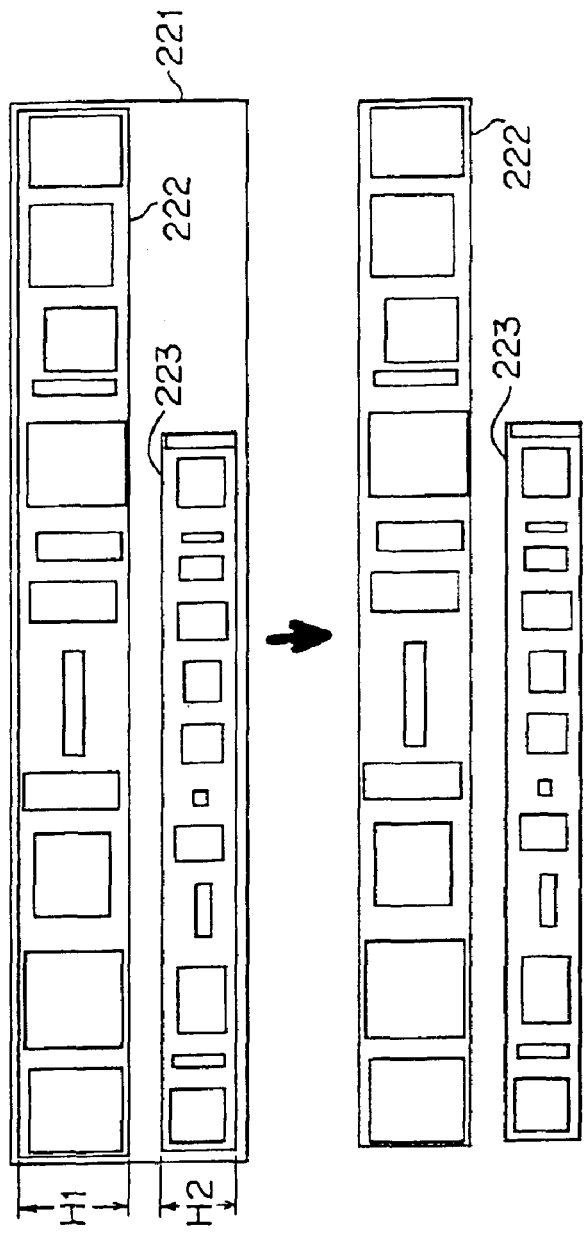
FIGS. 38A and 38B are schematic diagrams for explaining a re-grouping process corresponding to sizes of characters in a group according to an embodiment of the present invention.

FIGS. 38A and 38B are schematic diagrams for explaining a process for re-grouping rectangles corresponding to the sizes of characters of a character string according to an embodiment of the present invention.

In FIG. 38A, assuming that enclosing rectangles 222 and 223 that surround enclosing rectangles that are horizontally adjacent in a group 221 have been generated, a height H1 of the enclosing rectangle 222 and a height H2 of the enclosing rectangle 223 are calculated. When the difference between the height Hi of the enclosing rectangle 222 and the height H2 of the enclosing rectangle 223 is larger than a predetermined threshold, the enclosing rectangles 222 and 223 are categorized as different groups.

In reality, when the difference of the heights of two rectangles of a horizontal character string (the difference of the widths of two rectangles of a vertical character string) is smaller than the predetermined threshold value and the rectangles of the two rectangles overlap with each other or the distance between the two rectangles is smaller than the predetermined threshold value, the two rectangles are categorized as the same group and assigned the same group number. This process is performed for all groups.

Next, a new group is generated with character strings with the same group number. In this process, character strings with different character sizes categorized as the same group at step S18 shown in FIG. 23 can be categorized as different groups.

Thereafter, a process for deleting a large rectangle from a group is performed (at step S24). In this process, to remove noise, the average size of rectangles in a group is obtained. With reference to the average size, rectangles with very large sizes are deleted again. In other words, for a group that has been varied in the above-described process, the process at step S19 shown in FIG. 21 is performed again so as to remove the noise in the group.

Next, a group combining process is performed (at step S25). In this process, groups that are horizontally or vertically adjacent and that have the same color are combined. In other words, in the case that the colors of two groups are similar, that they are adjacent, and that enclosing rectangles of the groups are in a row, the two enclosing rectangles are combined as one group. This process is performed so as to determine a likelihood of character strings of groups corresponding to the arrangement of rectangles as will be described later.

FIGS. 39A and 39B are schematic diagrams for explaining a process for combining groups according to an embodiment of the present invention. In FIG. 39A, assuming that an enclosing rectangle 241 of a group 1 and an enclosing rectangle 242 of a group 2 are horizontally arranged, a distance L1 between the enclosing rectangles 241 and 242, a coordinate difference E1 between the upper edge of the enclosing rectangle 241 and the upper edge of the enclosing rectangle 242, and a coordinate difference E2 between the lower edge of the enclosing rectangle 241 and the lower edge of the enclosing rectangle 241 are obtained. In the case that the distance L1 between the enclosing rectangles 241 and 242, the coordinate difference E1 between the upper edge of the enclosing rectangle 241 and the upper edge of the enclosing rectangle 242, and the coordinate difference E2 between the lower edge of the enclosing rectangle 241 and the lower edge of the enclosing rectangle 242 are smaller than respective threshold values and that the difference between the representative color of the group 1 and the representative color of the group 2 is not larger than a predetermined threshold value, the enclosing rectangles 241 and 242 are combined and an enclosing rectangle 243 that surrounds the enclosing rectangles 241 and 242 is generated.

In reality, in the case that the coordinates of enclosing rectangles of two groups are close and the distance thereof is short and that it is supposed that the two enclosing rectangles can be combined as one character string, the enclosing rectangles are categorized as one group in the following conditions.

The luminance difference values of the average RGB value of two groups is smaller than a predetermined threshold value.

When two groups are horizontally arranged, the horizontal distance thereof is smaller than a fixed threshold value (when two groups are vertically arranged, the vertical distance thereof is smaller than a fixed threshold value).

When two groups are horizontally arranged, the coordinate difference between the upper edges of enclosing rectangles of the two groups is smaller than a fixed threshold value and the coordinate difference between the lower edges of the enclosing rectangles of the two groups is smaller than a fixed threshold value (when two groups are vertically arranged, the coordinate difference between the right edges of enclosing rectangles of the two groups is smaller than a fixed threshold value and the coordinate difference between the left edges of the enclosing rectangles of the two groups is smaller than a fixed threshold value).

This process is repeated until there is no group to be combined.

Next, a process for extracting a group that is a likelihood of characters corresponding to the arrangement of rectangles is performed (at step S26). In this process, for rectangles of a group that satisfy a particular condition such a size or a shape, when the upper edge or lower edge of one rectangle is close to the upper edge or lower edge of an adjacent rectangle, it is determined that the rectangles are in a row. In this case, a row flag is set. A row rectangle ratio that represents the number of rectangles that are in a row in those of the group that satisfy a predetermined condition is obtained. When a group with a row rectangle ratio that exceeds a predetermined threshold value is extracted as a character string.

Figures 40A, 40B:
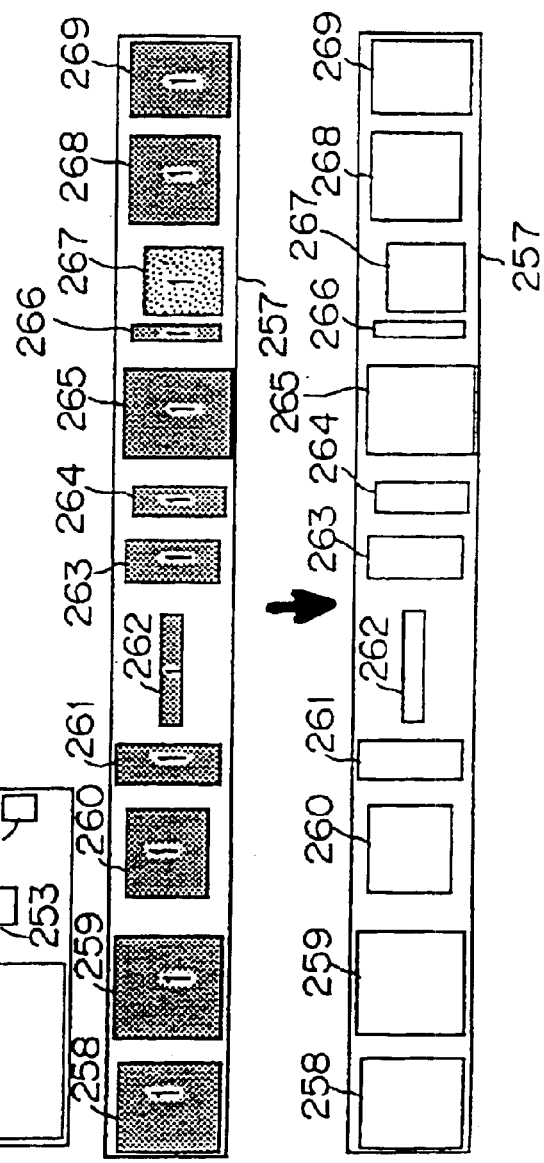
FIGS. 40A and 40B are schematic diagrams for explaining an extracting process for a rectangle and a group that is a likelihood of a character string according to an embodiment of the present invention.

FIGS. 40A and 40B are schematic diagrams for explaining a process for extracting a group that is a likelihood of a character string corresponding to the arrangement of rectangles according to an embodiment of the present invention.

In FIG. 40A, enclosing rectangles 252 to 256 and enclosing rectangles 258 to 269 are generated with an input image. The enclosing rectangles 252 to 256 are categorized as one group. Thus, an enclosing rectangle 251 that surrounds the enclosing rectangles 252 to 256 is generated. Likewise, the enclosing rectangles 258 to 269 are categorized as another group. Thus, an enclosing rectangle 257 that surrounds the enclosing rectangles 258 to 269 is generated.

Next, the sizes and positions of enclosing rectangles of groups are determined. An enclosing rectangle horizontally arranged is assigned a horizontal arrangement flag 1. An enclosing rectangle vertically arranged is assigned a vertical arrangement flag 2. Since the enclosing rectangles 252 to 256 are randomly arranged in the enclosing rectangle 251, the enclosing rectangles 252 to 256 are assigned neither the horizontal arrangement flag 1 nor the vertical arrangement flag 2. On other hand, since the enclosing rectangles 258 to 269 are horizontally arranged in the enclosing rectangle 257, the enclosing rectangles 258 to 269 are assigned the horizontal arrangement flag 1.

After the flag assigning process for the enclosing rectangles 252 to 256 and the enclosing rectangles 258 to 269 has been completed, the ratio of rectangles assigned flags in all rectangles is calculated in each group. A group with a high rectangle ratio is extracted as a character string. A group with a low rectangle ratio is removed as noise.

Thus, as shown in FIG. 40B, since the enclosing rectangles 252 to 256 have not been assigned flags, the group thereof is removed as noise. In contrast, since the enclosing rectangles 258 to 269 have been assigned the horizontal arrangement flag 1, the group thereof is extracted as a character string.

In reality, the following steps a) to e) are performed.

a) When two adjacent rectangles in a group satisfy a predetermined condition of a size or a shape and the coordinate difference between the upper edges of the two rectangles is smaller than a predetermined threshold value (height WID_RATE (=0.2) times), the two rectangles are assigned the horizontal arrangement flag 1.

When two rectangles are adjacent rectangles, they should be present in the range of the width of a reference rectangle times WID_RATE_DIST (=0.5).

b) When two adjacent rectangles in a group satisfy a predetermined condition of a size or a shape and the coordinate difference between the left edge of one rectangle and the right edge of the other rectangle is smaller than a predetermined threshold value (the width times WID_RATE), the two rectangles are assigned the vertical arrangement flag 2.

When two rectangles are adjacent rectangles, they should be present in the range of the height of a reference rectangle times WID_RATE_DIST.

c) The number of rectangles assigned the horizontal arrangement flag and the number of rectangles assigned the vertical arrangement flag are compared in the group. The direction of a character string corresponds to the compared result.

d) The ratio of rectangles arranged in the group is obtained by "number of rectangles arranged/total number of rectangles that satisfy the predetermined condition such as size or shape in the group".

As a condition of a rectangle in a group, the height that represents the most frequency value of rectangles in the group is obtained by the method shown in FIG. 34. The height×3 is denoted by large_rect. The height of the rectangle is larger than the fixed size (23 dots at 100 dpi) and smaller than large rect.

e) When the ratio of rectangles arranged in a group is larger than a predetermined threshold value NUM_RATE (=0.8), the group is kept as a group that is a likelihood of a character string. Otherwise, the group is removed as noise.

A center point "•" and a dash "-" in a group are kept as characters.

Next, a noise group deleting process is performed (at step S27). In this process, a group that is composed of two rectangles and that is treated as noise corresponding to the shape or coordinates is extracted and deleted. In other words, a group that is composed of two rectangles and of which the distance between the upper edge and the lower edge (or the left edge and the right edge) of the two rectangles is small is deleted as noise unless it is determined that the two rectangles are in a row.

Figure 41:
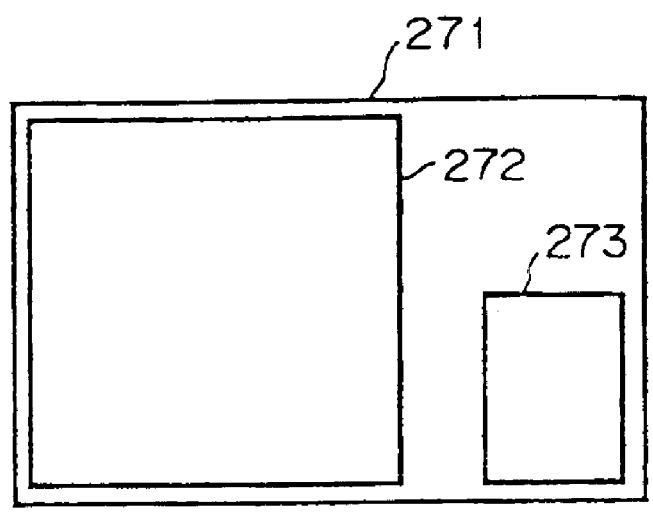
FIG. 41 is a schematic diagram for explaining a deleting process for a noise group according to an embodiment of the present invention.

FIG. 41 is a schematic diagram for explaining a process for deleting a noise group according to an embodiment of the present invention.

In FIG. 41, it is assumed that two enclosing rectangles 272 and 273 are extracted as one group and an enclosing rectangle 271 that surrounds the two enclosing rectangles 272 and 273 is generated. In this case, the lower edge of the enclosing rectangle 272 accords with the lower edge of the enclosing rectangle 273. However, since the upper edge of the enclosing rectangle 272 is largely different from the upper edge of the enclosing rectangle 273, the enclosing rectangles 272 and 273 are treated as noise and the group thereof is deleted from groups that are likelihood of character strings.

In reality, the following process is performed.

Assuming that the average height of two rectangles of a group is denoted by hei, that the average width thereof is denoted by wid, and that the ratio DEL_RATE for assigning a threshold value is 0.1, a group that satisfies the following conditions is kept. A group that does not satisfies the following conditions is deleted as noise.

(|coordinate at upper edge of first rectangle−coordinate at upper edge of second rectangle|<hei×DEL_RATE and

|coordinate at lower edge of first rectangle−coordinate at lower edge of second rectangle|<hei×DEL_RATE or (|coordinate at left edge of first rectangle−coordinate at left edge of second rectangle|<wid×DEL_RATE and

|coordinate at right edge of first rectangle−coordinate at right edge of second rectangle|<wid×DEL_RATE)

Next, a process is performed for extracting patterns with the same color from a group (at step S28). In this process, the representative color of a group is obtained as the average color of representative colors of rectangles in the group. A pattern that has not been extracted and that has the similar color to the original image is extracted as a binary image in the range of the group. The extracted pattern is assigned a label for a binary image so as to obtain an enclosing rectangle of connected portions. When the size of the obtained enclosing rectangle is larger than a predetermined threshold value, the enclosing rectangle is added as a part of a character pattern to the group.

For example, the average color (RGB) of patterns in a group is obtained. Pixels with the similar color of the average color are obtained in the range of the enclosing rectangle of the group so as to generate a binary image. A pattern portion is removed from the binary image. The remaining binary image is assigned the label for the binary image so as to obtain a new enclosing rectangle. When the size and shape of the new enclosing rectangle exceed predetermined threshold values, a pattern in the new enclosing rectangle is added to the group.

In this process, a pattern that is lost in the above-described processes due to character width information, color deviation, and so forth and that is a part of a character can be re-extracted. An example of the pattern is a sonant letter "゛" of a character "ば".

Figure 42A:
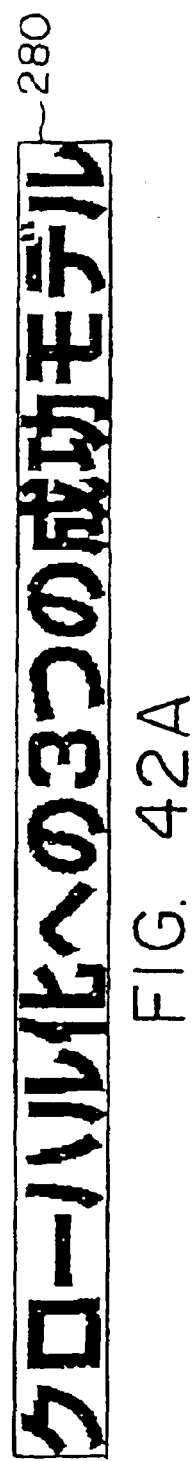
FIGS. 42A and 42B are schematic diagrams for explaining a process for extracting patterns with same colors from a group according to an embodiment of the present invention.
Figure 42B:
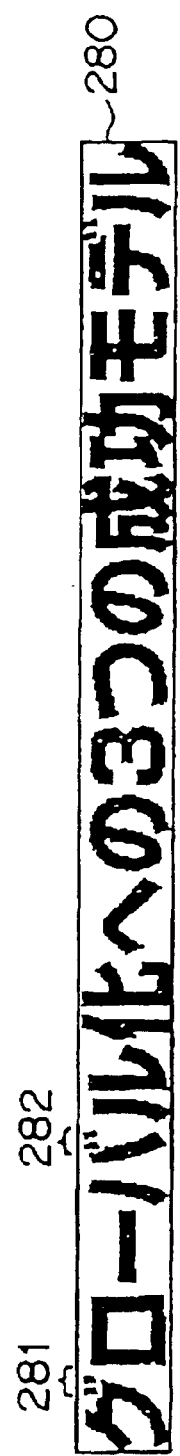

FIGS. 42A and 42B are schematic diagrams for explaining a process for extracting patterns with the same colors from a group according to an embodiment of the present invention.

In FIG. 42A, with the process from step S11 to S27 shown in FIG. 23, it is assumed that a character string "クローハル化への3つの成功モデル" is extracted from an input image and that an enclosing rectangle 280 that surrounds the character string is generated. In this example, sonant letters "゛" are removed from "ク" and "ハ".

In this case, since the difference between the color of the sonant letter "゛" and the color of "ク" exceeds the predetermined threshold value, the sonant letter "゛" is categorized as a group different from a group of "ク".

In addition, since the difference between the color of the sonant letter "゛" and the color of "ハ" exceeds the predetermined threshold value, the sonant letter "゛" is categorized as a group different from a group of "ハ".

In the process at step S16, since colors of local portions of a character string to be extracted are compared, when the color of the character string is locally varied due to color shearing, a part of a character drops.

Thus, the sonant letter "゛" of "ク" and the sonant letter "゛" of "ハ" are re-extracted. When these sonant letters are re-extracted, corresponding to the entire character string "クローハル化への3つの成功モデル", a representative color thereof is obtained. A pattern with a similar color of the representative color is extracted from the label image. Thus, the influence of the variation of the color of a local portion of the character string is alleviated. Consequently, the sonant letters "゛" f "ク" and "ハ" can be extracted. When the sonant letters "゛" are re-extracted, the extracting range of the sonant letters "゛" is limited to the enclosing rectangle 280. When the extracting range is limited, the sonant letters "゛" of the characters to be re-extracted can be prevented from protruding from the range. Thus, since the range of the pattern to be processed can be narrowed, the process can be performed at high speed without a deterioration of the extracting accuracy.

Thus, as shown in FIG. 42B, the sonant letters "゛" of "ク" and "ハ" are correctly extracted and thereby the character string "クローハル化への3つの成功モデル" can be extracted from the input image.

As the re-extracted results, when the character string "クローハル化への3つの成功モデル" and noise with the same color are in the range of the enclosing rectangle 280, since the noise is also extracted, a small pattern that has been re-extracted is removed as noise.

In reality, the following steps a) to h) are performed.

a) Representative color information stored in rectangle information of a group is averaged for all rectangles in the group so as to obtain a representative color (Rm, Gm, Bm) of the group.

b) Most frequency values of the widths and heights of rectangles of the group are obtained as mfw an mfh, respectively. When the width mfw and the height mfh of the most frequency values are larger than a threshold value minsize (=2) of the size of the minimum rectangle, the width mfw and the height mfh of the maximum frequency values are substituted with minsize.

c) An enclosing rectangle of the group is obtained. In the range of the enclosing rectangle, a binary image is generated. All pixels of the binary image are set to "0".

d) The colors of the pixels of the original image in the range of the enclosing rectangle of the group are checked. The position of a pixel of the original image is recorded when the color (R, G, B) of the pixel of the original image and the representative color of the group satisfy the following relation. Pixels at the same position of the binary image are set to "1".

$|Rm-R|+|Gm-G|+|Bm-B|<THR\times 10$ (THR=10)

e) Rectangles of the group are extracted from the binary image. Patterns that have been extracted are removed. Only patterns that have been lost in the preceding processes and that have colors similar to the representative color of the group are kept in the binary image.

f) The binary image is assigned the label for the binary image so as to obtain an enclosing rectangle of connected areas.

g) Rectangles that satisfy the following conditions are kept. The remaining rectangles are deleted.

$w<mfw/2$ and $h<mfh/2$ where w is the width of an enclosing rectangle and h is the height thereof.

h) A pattern of connected rectangles that compose the remaining rectangles is added to the group.

Next, a process for determining an output order of groups is performed (at step S29). In the process, when a plurality of groups that contain character strings are extracted, the areas of enclosing rectangles of the groups are calculated. The groups are sorted in the order of the largest area. The sorted result becomes the output order.

Thereafter, a process for generating a binary pattern is performed (at step S30). In the process, a pattern that composes a group is generated as a binary image so that the pattern can be recognized as characters.

In reality, the following steps a) to c) are performed.

a) A binary image with the size of an enclosing rectangle of a group is generated. All pixels of the binary image are set to "0".

b) A label number of a rectangle in the group is extracted. A label image is searched in a relevant rectangle. A pixel with the label number is extracted. The pixel at the coordinates in the binary image is set to "1".

c) The step b) is performed for all rectangles. A pattern that composes the group is generated as a binary image.

The above-described process is described with an example of a real color image.

Figure 43A:
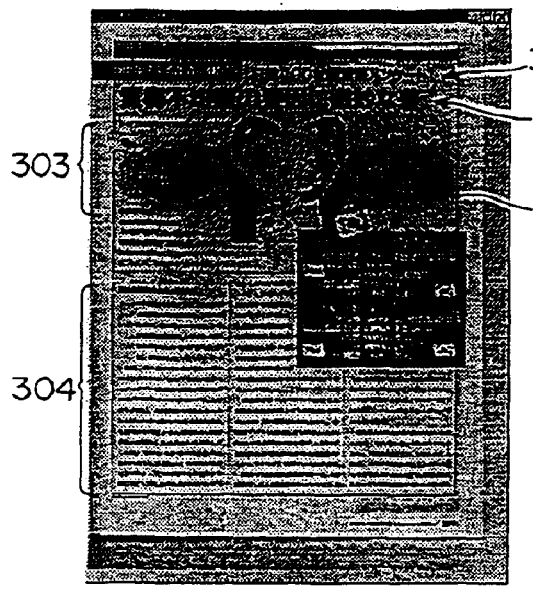
FIG. 43A is a schematic diagram showing an original image according to an embodiment of the present invention.

FIG. 43A is a schematic diagram showing an example of an input original image. In the original image, headline characters 301 and 302, a picture 303, text characters 304, a frame 305, and so forth have been printed in colors. The headline characters 301 and 302 are extracted as titles. Moreover, the headline characters 301 and 302 have been printed with one color.

Figure 43B:
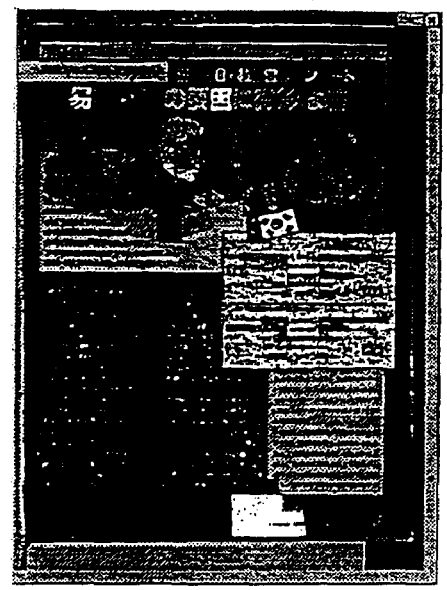
FIG. 43B is a schematic diagram showing a label image of FIG. 43A.

FIG. 43B is a schematic diagram showing the label image shown in FIG. 43A.

In FIG. 43B, the label image is obtained by the color labeling process at step S13 shown in FIG. 23. In the color labeling process, connected areas with the same color are assigned the same label. An enclosing rectangle of patterns with the same label is generated. At this point, the number of enclosing rectangles amounts to around several thousands to several ten thousands.

Figure 43C:
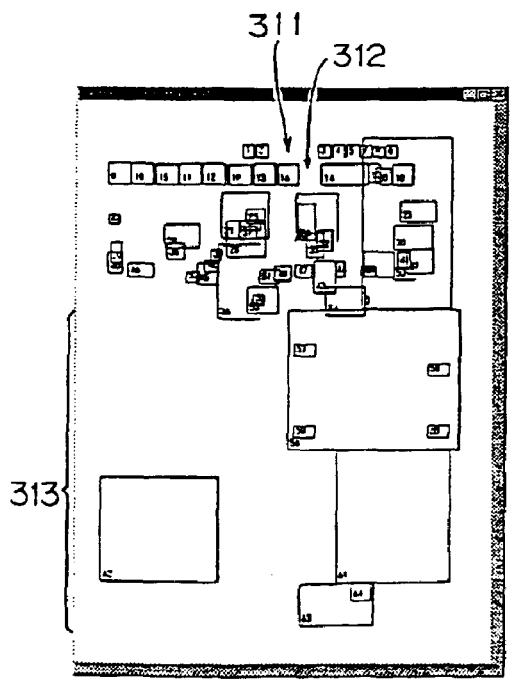
FIG. 43C is a schematic diagram showing a considered rectangle assigned in the label image shown in FIG. 43B.

FIG. 43C is a schematic diagram showing considered rectangles obtained from the label image shown in FIG. 43B.

In FIG. 43C, the considered rectangles are obtained by the considered rectangle extracting process at step S14 shown in FIG. 23. In the example shown in FIG. 43C, considered rectangles with rectangle numbers 1 to 64 are extracted.

In the considered rectangle extracting process at step S14, among enclosing rectangles obtained from the label image, enclosing rectangles with a predetermined size are treated as considered rectangles. Thus, enclosing rectangles of the headline characters 301 and 302 that should be extracted are dropped from areas 311 and 312 shown in FIG. 43C. In this example, the headline characters 302 that should be extracted in the area 312 shown in FIG. 43C is an enclosing rectangle corresponding to a character "に" shown in FIG. 43A. However, in the label image shown in FIG. 43B, three strokes that compose the character "に" are assigned different labels. Thus, the sizes of the enclosing rectangles of the strokes become small.

In the considered rectangle extracting process, when enclosing rectangles are categorized as groups, an enclosing rectangle 313 (not shown) corresponding to the text characters 304, an enclosing rectangle of noise, and an enclosing rectangle of the frame 305 can be removed from a reference enclosing rectangle in the search range. Thus, the process can be performed at high speed. In the state shown in FIG. 43B, the number of enclosing rectangles amounts to several thousands to several ten thousands. On the other hand, in FIG. 43C, the number of enclosing rectangles decreases to several tens.

Figure 43D:
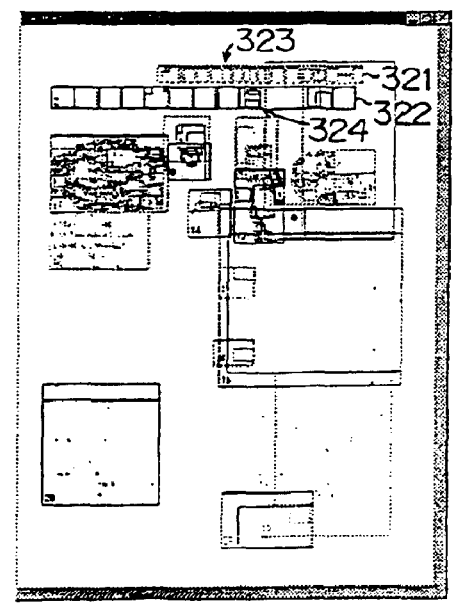
FIG. 43D is a schematic diagram showing group extracted results.

FIG. 43D is a schematic diagram showing a group extracted result.

In FIG. 43D, the group extracted result is obtained by the process for extracting groups with the same color at step S16 shown in FIG. 23. In FIG. 43D, enclosing rectangles with rectangle numbers 1 to 21 are generated. In this process, enclosing rectangles that are obtained from the label image shown FIG. 43B, that are in a predetermined range of a considered rectangle shown in FIG. 43C and that have similar representative colors are categorized as the same group. An enclosing rectangle that surrounds the enclosing rectangles categorized as the same group is generated.

Thus, an enclosing rectangle 321 of a group corresponding to the headline characters 301 "日経４００社経営者アンケート" shown in FIG. 43A is generated. In addition, an enclosing rectangle 322 of a group corresponding to the headline characters 302 "貿易不均衡の要因に微妙な差" is generated. In the grouping process, the respective character strings that compose the headline characters 301 and 302 can be combined to one character string. In addition, enclosing rectangles 323 and 324 of the headline characters 301 and 302 that should be extracted in the areas 311 and 312 shown in FIG. 43C can be correctly extracted.

When a label image of another enclosing rectangle with a similar representative color cannot be obtained in the predetermined range of a considered rectangle shown in FIG. 43C, since the considered rectangle does not compose a group, the considered rectangle is removed.

Figure 44A:
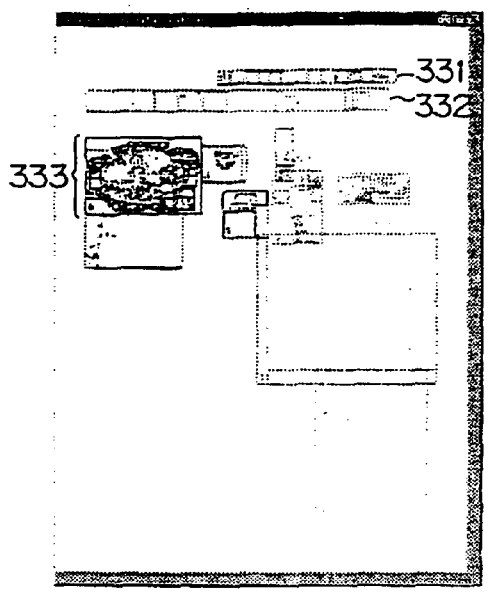
FIG. 44A is a schematic diagram showing results of which the group extracted results shown in FIG. 43D are re-grouped with the thickness of a character line.

FIG. 44A is a schematic diagram showing a re-grouped result of which the group extracted result shown in FIG. 43D is re-grouped corresponding to the thickness of a character line.

In FIG. 44A, the re-grouped result is obtained by the process for re-grouping enclosing rectangles corresponding to the thickness of a character line as step S18 shown in FIG. 23. Enclosing rectangles with rectangle numbers 0 to 12 are generated as a group. In this process, an enclosing rectangle 331 of a group corresponding to the headline characters 301 "日経４００社経営者アンケート" shown in FIG. 43A is generated. In addition, an enclosing rectangle 332 of a group corresponding to the headline character 302 "貿易不均衡の要因に微妙な差" shown in FIG. 43A is generated.

Among enclosing rectangles shown in FIG. 43D, those that cannot be categorized as groups corresponding to the thickness of a character line are removed.

Figure 44B:
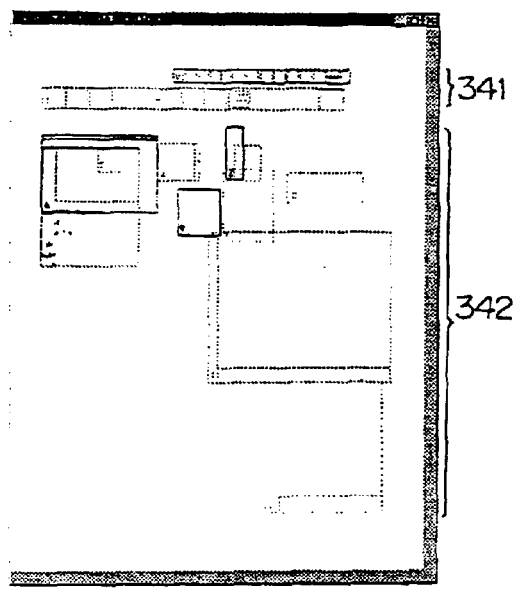
FIG. 44B is a schematic diagram showing results of which the overlapped rectangles shown in FIG. 44A are combined.
Figure 44C:
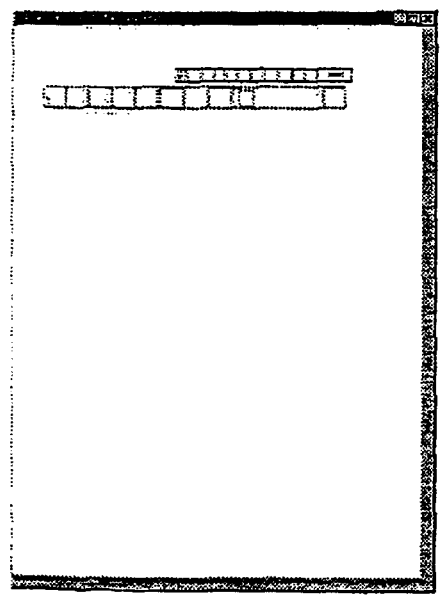
FIG. 44C is a schematic diagram showing results of which a rectangle and a group that is a likelihood of a character string are extracted from the image shown in FIG. 44B.
Figure 44D:
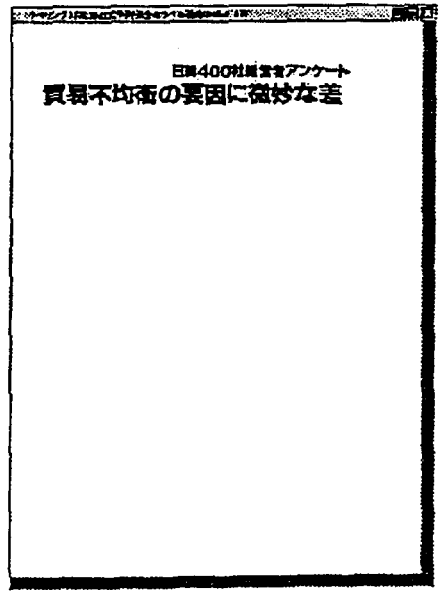
FIG. 44D is a schematic diagram showing results of which a pattern in a group is extracted from the image shown in FIG. 44C.

FIG. 44D is a schematic diagram showing a result of which rectangles that overlap are combined.

In FIG. 44D, the combined result of the rectangles is obtained by the process for combining overlapped rectangles of a group at step S20 shown in FIG. 23. Enclosing rectangles with rectangle numbers 0 to 12 are generated. In this process, since most of enclosing rectangles in an area 333 corresponding to the picture 303 overlap, they are combined and removed. In the combing process, the number of enclosing rectangles to be processed is decreased. Thus, the process can be performed at high speed.

FIG. 44C is a schematic diagram showing results of which groups that are likely to be character strings are extracted from an input image.

In FIG. 44C, groups that are likely to be character strings are obtained by the process for extracting groups that are likely to be character strings corresponding to the arrangement of rectangles at step S26 shown in FIG. 23. In FIG. 44C, enclosing rectangles with rectangle numbers 0 and 1 are extracted as a group. In this process, since enclosing rectangles of the group in an area 342 shown in FIG. 44B are randomly arranged, they are deleted. Thus, only an enclosing rectangle in an area 341 shown in FIG. 44B is extracted.

FIG. 44D is a schematic diagram showing a result of which a pattern of a group is extracted from the image shown in FIG. 44C.

In FIG. 44D, a pattern of a group is obtained by the process for extracting patterns with the same colors from a group at step S28 shown in FIG. 23. A pattern in an area of an enclosing rectangle of a group obtained in FIG. 44C is extracted. Thus, the headline characters 301 "日経４００社経営者アンケート" and headline characters 302 "貿易不均衡の要因に微妙な差" shown in FIG. 43A are obtained.

Figures 45A, 45B:
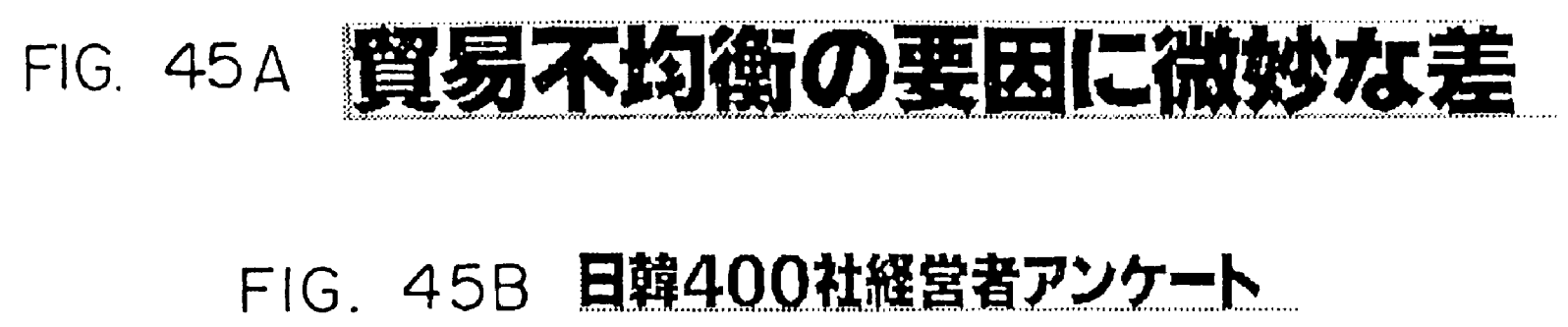

FIG. 45A is a schematic diagram showing a pattern of a first alternative of a title extracted from the image shown in FIG. 43A. FIG. 45B is a schematic diagram showing a pattern of a second alternative of the title extracted from the image shown in FIG. 43A.

In the example shown in FIGS. 45A and 45B, corresponding to the sizes of areas of enclosing rectangles 401 and 402 of extracted patterns, the output order of titles extracted from the original image shown in FIG. 43A is assigned.

Thus, the headline characters 302 "貿易不均衡の要因に微妙な差" shown in FIG. 43A are presented as the first alternative of the title. The headline characters 301 "日経４００社経営者アンケート" shown in FIG. 43A are presented as the second alternative of the title.

As described above, according to the present invention, the threshold value of the distance for determining whether or not to assign the same label to the adjacent pixels can be assigned corresponding to color information of the considered pixel, not a fixed value. Thus, it can be accurately determined whether or not the pixels are in the same range. Consequently, pixels can be accurately extracted from a desired area.

Thus, according to an aspect of the present invention, areas regarded as the same color can be obtained with a reduced image. Consequently, a process for extracting areas regarded as the same color can be performed at high speed.

Thus, according to an aspect of the present invention, enclosing rectangles of label images and labels, representative colors thereof, the number of colors in the same label area, and colors are obtained from a reduced image. Corresponding to the obtained results, a rectangle of the original image is obtained. The labeling process can be performed in the rectangle. Thus, the labeling process can be performed at high speed.

Thus, according to an aspect of the present invention, all colors and similarities are obtained from a reduced image, and similarities of areas of the reduced image are determined. When the similarity of colors of the areas is smaller than the predetermined threshold value, the same label can be assigned to the areas. Thus, a desired area can be extracted as viewed by the naked eye.

Thus, respective threshold value elements are assigned three color elements. When all the three color elements of two colors are less than the respective threshold value, these colors can be treated as the same color. Consequently, the capacity of the table of the threshold values can be decreased. In addition, the labeling process can be very accurately performed.

According to an aspect of the present invention, patterns of an input image are categorized corresponding to color information and geometry information of the patterns thereof. Thus, when a headline area with the same color is extracted from a color input image, a part of the color input image is limited as the headline area. Patterns with the same colors are extracted. A same color pattern apart from the headline area is removed from an object to be categorized. In addition, a small pattern and a large pattern that are not headline characters can be removed from an object to be categorized corresponding to color information. Thus, the speed of the extracting process of the headline area can be improved.

According to an aspect of the present invention, to cluster pixels of an input image, color information of a considered pixel and color information of a pixel adjacent thereto are compared. When all pixels of the input image are compared, the number of times of the comparing process of color information of adjacent pixels becomes the square of the number of pixels of the input image. In contrast, when the color information of a considered pixel is compared with the color information of a pixel adjacent thereto, the number of times of the comparing process becomes the number of pixels of the input image. Thus, the clustering process can be performed at high speed.

In addition, when pixels of an input image are categorized as groups, clusters in a predetermined range are categorized as groups. Thus, pixels in the same cluster can be integrally handled. Thus, it is not necessary to process individual pixels. Consequently, the grouping process can be performed at high speed. In addition, in a limited range of the input area, clusters with similar colors can be categorized as the same group. Thus, the grouping process can be performed at further higher speed.

According to an aspect of the present invention, an area in the range of a color deviation determined corresponding to a predetermined resolution is extracted as a same color area. Thus, since the color of a pattern of an input image is represented in a combination of sizes of dots of basic colors, even if an area represented as the same color in the input image is detected as a set of different colors depending on a read resolution, when the input image is read, the range of the same color of the area can be accurately extracted. Consequently, a part of a pattern represented as the same color in the input image can be prevented from being dropped or lost.

According to an aspect of the present invention, among enclosing rectangles generated with label images, an enclosing rectangle that becomes a reference for assigning a search area can be limited to an enclosing rectangle in a range of a predetermined size. Thus, when a character area is extracted from an input image, enclosing rectangles of a small pattern such as noise and a large pattern such as a background or a frame can be prevented from being selected as a reference of a search area for searching a character string. Consequently, a pattern that is not a character string can be suppressed from being categorized as a group. Thus, only a character string can be effectively extracted.

Since a search area for searching a character string is assigned in a predetermined range from a considered enclosing rectangle, only characters in the vicinity of a considered enclosing rectangle can be searched. When a title or the like is extracted from the input image, a character that is apart from the title and that does not compose the title can be prevented from being extracted as the group of the title. Thus, only characters of the title can be effectively extracted.

According to an aspect of the present invention, in the case that a color gradually varies, only when color information of adjacent pixels is compared, since the colors of the adjacent pixels are similar, these pixels are assigned the same label. When these pixels are traced, the difference of colors cumulates. Thus, pixels with different colors may be assigned the same label. However, according to the present invention, since color information of a pattern that has been assigned a label can be compared, the labeling process can be performed corresponding to the cumulated value of the difference of colors. Thus, when an area whose color gradually varies is assigned a label corresponding to the compared result of the color information of the adjacent pixels, pixels with different colors can be prevented from being assigned the same label.

According to an aspect of the present invention, a threshold value is assigned for a labeling process corresponding to the color difference between adjacent pixels in an area represented by a particular color. Thus, since an input image is printed by halftone printing method, even if the input image is represented in the same color, it may be detected as a set of different colors depending on a read resolution. In this case, an area with the same color can be accurately extracted. Thus, a part of a pattern can be prevented from being dropped or lost from an area represented as the same color in the input image.

According to an aspect of the present invention, a color generated by the halftone printing method is virtually generated on a computer. The variation of a color by the halftone printing method can be distinguished without need to analyze the variation of the color by the halftone printing method using a real printed document.

According to an aspect of the present invention, a color difference table that stores luminance values of colors and the color difference between adjacent pixels corresponding to the luminance values in each read resolution of the print model is generated. Thus, regardless of a resolution of a device that reads data from a real printed document, a threshold value for determining whether or not colors that are read from a real printed document are the same can be easily obtained.

According to an aspect of the present invention, the read resolution of the print mode is estimated for an input image. Thus, a real printed document that is read by a device can be handled with a print model virtually generated on a computer. The labeling process can be performed with a threshold value generated with a print model to the real printed document that is read by the device.

According to an aspect of the present invention, a resolution of which a luminance value of a color and a color difference registered in the color difference table optimally confirms to the entire input image is estimated as a read resolution of the print model of the input image. Thus, for a real printed document that is read by a device, an optimum threshold value generated by a print model is applied to the entire input image so as to perform the labeling process.

According to an aspect of the present invention, a resolution of which a luminance value of a color and a color difference registered in the color difference table optimally confirms to a local area of the input image is estimated as a read resolution of the print model of the local area of the input image. Thus, in an input image that is read by a device from a real printed document, for an area that exceeds a predetermined threshold value of the entire input image, the labeling process can be performed for the area with a threshold value optimum for the area. Consequently, the accuracy of the labeling process can be improved.

According to an aspect of the present invention, a read resolution of the print model is a fixed value. Thus, the model resolution estimating process of a real printed document can be omitted. Consequently, the process can be performed at high speed.

According to an aspect of the present invention, label images can be categorized as a group. Thus, a character area extracted by the labeling process can be categorized as a character string area. Consequently, a title can be effectively extracted.

According to an aspect of the present invention, a label image is categorized as the same group corresponding to color information and geometry information of an enclosing rectangle of the label image. Thus, when a headline area with the same color is extracted from an input color image, a pattern is extracted from a limited area of the input color image. A pattern that is apart from a headline area can be removed from an object to be categorized. In addition, a small pattern such as noise and a large pattern such as a background that is not the headline characters can be omitted from an object to be processed. Consequently, the speed of the extracting process for the headline area can be improved. Since a labeled pattern is represented by an enclosing rectangle, a complicated pattern composing a character or the like can be represented in a simple shape. Thus, the storage capacity for the pattern can be decreased. In addition, when the relation of positions of patterns is obtained, the process can be simplified.

According to an aspect of the present invention, representative colors of the patterns included in enclosing rectangles are compared and categorized as groups. Thus, patterns labeled can be compared as enclosing rectangles. When patterns are categorized as a group corresponding to color information, it is not necessary to compare each pixel that composes the patterns. Thus, since the number of elements to be compared can be decreased, the process can be performed at high speed.

According to an aspect of the present invention, another enclosing rectangle present in a predetermined range of a considered enclosing rectangle is categorized as a group. Thus, when a title area or the like is extracted from an input image, the range of an enclosing rectangle to be categorized as a group can be limited to a range suitable for the title area. The grouping process can be omitted for an area that protrudes from the title area. Consequently, the process can be preformed at high speed.

According to an aspect of the present invention, rectangle numbers included in each of vertical and horizontal coordinates in a predetermined range of a considered enclosing rectangle are extracted. Thus, another enclosing rectangle in the predetermined range of the considered enclosing rectangle can be effectively searched.

According to an aspect of the present invention, rectangle numbers of enclosing rectangles are stored in the order of coordinate values. Rectangle numbers are searched in the ascending order of the coordinate values. Rectangle numbers having an equal coordinate value are related to the coordinate value. Thus, when an area for storing a rectangle number of an enclosing rectangle is prepared for each coordinate value, the storage capacity corresponding to enclosing rectangles that are present in a predetermined range of a considered enclosing rectangle is required. In contrast, according to the present invention, since coordinate values corresponding to real enclosing rectangles are stored, the storage capacity can be decreased.

According to an aspect of the present invention, two enclosing rectangles are categorized as the same group when the two enclosing rectangles are present in a predetermined range of a considered enclosing rectangle and the color difference of the representative colors of the two enclosing rectangles is smaller than a color difference obtained from the color difference table. Thus, when a title area or the like is extracted from an input image, a range of enclosing rectangles to be categorized can be limited to a range suitable for the title area. When enclosing rectangles are compared and patterns are categorized as a group with color information, the variation of a color in the reading operation of a real printed document can be considered. Thus, the process can be preformed at high speed. In addition, the reading accuracy is improved.

According to an aspect of the present invention, a label image is categorized as a group corresponding to the thickness of a pattern of the label image. Thus, since characters with different thicknesses can be categorized as different groups, when a title or the like is extracted from an input image, only a character string composed of characters with the same thickness can be extracted as a title. Thus, the extracting accuracy of the title can be improved.

According to an aspect of the present invention, the thickness of the pattern is obtained corresponding to the ratio of the area of the pattern and the contour length of the pattern. Thus, the thickness of the pattern can be accurately obtained.

According to an aspect of the present invention, a pixel that has already been searched as the contour of the pattern is not searched. Thus, a pixel that becomes a contour of a pattern can be prevented from being re-extracted. Consequently, the speed of the contour tracing process can be improved.

According to an aspect of the present invention, an enclosing rectangle that exceeds a predetermined range of the character size is deleted from the group of the enclosing rectangles. Thus, even if a pattern of a figure, a picture or the like is present in the vicinity of a title, and the pattern of the figure or picture is categorized as a group of characters that composes the title, the pattern of the figure or picture can be removed from the group. Thus, the accuracy for extracting the title can be improved.

According to an aspect of the present invention, a character string is extracted corresponding to the arrangement of enclosing rectangles. Thus, an area of which enclosing rectangles are irregularly disposed and an area of which enclosing rectangles are regularly disposed can be distinguished. Consequently, an area of which enclosing rectangles are regularly disposed can be treated as a title area. Thus, only the title area can be effectively extracted.

According to an aspect of the present invention, characters with different sizes are categorized as different groups. Consequently, when a title or the like is extracted from an input image, only a character string composed of characters with the same size can be treated as a title. Thus, the extracting accuracy for a title can be improved.

According to an aspect of the present invention, it can be determined whether or not enclosing rectangles in a group are arranged in a row. A group of enclosing rectangles arranged in a row can be treated as a title area. Thus, a title can be effectively extracted from an input image.

According to an aspect of the present invention, the representative color of a group is calculated corresponding to the representative color of patterns of a group. Thus, corresponding to all colors of a title area, the color of a title can be calculated. The influence of color difference in a local area of the title area can be alleviated. Consequently, the extracting accuracy for the title area can be improved.

According to an aspect of the present invention, adjacent enclosing rectangles of a group can be combined corresponding to the representative color of the group. Thus, even if characters composing the same title are categorized as different groups due to a slight color difference, these characters can be categorized as the same group. Consequently, a title area can be effectively extracted.

According to an aspect of the present invention, adjacent enclosing rectangles of a group are combined when the difference of the sizes of the enclosing rectangles is in a predetermined range and the difference of representative colors of the enclosing rectangles in the group is in a predetermined range. Thus, when enclosing rectangles of a group are combined, only characters that compose the same title can be effectively combined.

According to an aspect of the present invention, a pixel of an original image is re-extracted in the range of enclosing rectangles of the group corresponding to the representative color of the group. Thus, even if characters composing a title include a sonant letter or a semi-sonant letter and the sonant letter or the semi-sonant is dropped from the group of the title due to a local color difference of the title area, the color of the sonant letter or the semi-sonant letter can be compared with the entire color of the title area so as to re-extract the sonant letter or the semi-sonant letter. Consequently, the extracting accuracy for the title can be improved.

According to an aspect of the present invention, an enclosing rectangle of a pattern that has been re-extracted and that is larger than a predetermined threshold value is added to the group. Thus, when a sonant letter or a semi-sonant letter is re-extracted from the title area, even if a thin noise with the same color as the title is present in the title area, only the noise can be deleted. Consequently, the extracting accuracy for the title can be improved.

According to an aspect of the present invention, the output order of patterns in a group is determined corresponding to the areas of enclosing rectangles categorized as the group, the positions thereof, and the relation of the positions thereof. Thus, even if a plurality of title alternatives are extracted from an input image, the likelihood of a title can be evaluated. Consequently, title alternatives can be output in the order of the maximum likelihood of the title.

According to an aspect of the present invention, a binary pattern is generated with a label image in enclosing rectangles categorized as a group. Thus, a pattern extracted from a color image can be effectively recognized.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A pattern extracting apparatus, comprising:

color difference calculating means for calculating the color difference between adjacent pixels of an area represented with a predetermined color;

threshold value assigning means for assigning a threshold value corresponding to the color difference;

labeling means for assigning a label to a pixel adjacent to a pixel represented with the predetermined color corresponding to the threshold value;

print model generating means having meshes of basic colors, basic color dots being disposed at lattice points of the meshes, the meshes being rotated and superimposed on each other, the sizes of the basic color dots being varied, so as to generate a color as a print model; and color difference table generating means for generating a color difference table that stores luminance values of colors generated by said print model generating means and the color difference between adjacent pixels corresponding to the luminance values in each read resolution of the print model.

2. The pattern extracting apparatus as set forth in claim 1, further comprising:

a model resolution estimation processing unit for estimating the read resolution of the print mode for an input image.

3. The pattern extracting apparatus as set forth in claim 2, wherein said model resolution estimating processing unit estimates a resolution of which a luminance value of a color and a color difference registered in the color difference table optimally confirms to the entire input image as a read resolution of the print model of the input image.

4. The pattern extracting apparatus as set forth in claim 2, wherein said model resolution estimating processing unit estimates a resolution of which a luminance value of a color and a color difference registered in the color difference table optimally confirms to a local area of the input image as a read resolution of the print model of the local area of the input image.

5. The pattern extracting apparatus as set forth in claim 2, wherein said model resolution estimation processing unit causes a read resolution of the print model to be a fixed value.

6. The pattern extracting apparatus comprising:

color difference calculating means for calculating the color difference between adjacent pixels of an area represented with a predetermined color;

threshold value assigning means for assigning a variable threshold value corresponding to the color difference; and labeling means for assigning a label to a pixel adjacent to a pixel represented with the predetermined color responsive to the variable threshold value;

grouping means for categorizing label images labeled by said labeling unit as a group corresponding to the thickness of a pattern of the label image wherein said grouping means has:
- contour tracing means for obtaining the contour length of the pattern;
- area calculating means for obtaining the area of the pattern; and
- thickness calculating means for obtaining the thickness of the pattern corresponding to the ratio of the area of the pattern and the contour length of the pattern.

7. The pattern extracting apparatus as set forth in claim 6, wherein said contour tracing unit searches a second pixel that is the contour of a pattern with a first pixel that is the contour of the pattern in such a manner that the second pixel is searched from eight pixels that are adjacent to the first pixel and that are adjacent to a source pixel of the first pixel.

* * * * *